(12) United States Patent
Reik et al.

(10) Patent No.: US 6,591,705 B1
(45) Date of Patent: Jul. 15, 2003

(54) TRANSMISSION

(75) Inventors: Wolfgang Reik, Bühl (DE); Reinhard Berger, Bühl (DE); Gunter Hirt, Lichtenau-Scherzheim (DE); Martin Brandt, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/602,862

(22) Filed: Jun. 23, 2000

Related U.S. Application Data

(63) Continuation of application No. PCT/DE98/03801, filed on Dec. 22, 1998.

(30) Foreign Application Priority Data

Dec. 23, 1997 (DE) .......................... 197 57 557

(51) Int. Cl.⁷ .................................. F16H 3/30
(52) U.S. Cl. ..................... 74/343; 74/335; 74/345
(58) Field of Search ................... 74/335, 329, 340, 74/343, 345, 356, 745, 339

(56) References Cited

U.S. PATENT DOCUMENTS

| | | | | |
|---|---|---|---|---|
| 3,906,817 A | * | 9/1975 | Kreitzberg | 74/745 |
| 4,579,015 A | * | 4/1986 | Fukui | 74/329 |
| 4,616,521 A | * | 10/1986 | Akashi et al. | 74/335 |
| 4,957,016 A | * | 9/1990 | Amedei et al. | 74/335 X |
| 4,958,095 A | | 9/1990 | Uchida et al. | |
| 5,099,969 A | * | 3/1992 | Ohtake | 477/86 |
| 5,251,503 A | * | 10/1993 | Morris et al. | 74/335 X |
| 5,267,157 A | | 11/1993 | Churchill et al. | |
| 5,337,848 A | | 8/1994 | Bader | |
| 5,429,005 A | * | 7/1995 | Fukui et al. | 74/335 X |
| 5,588,327 A | * | 12/1996 | Downs et al. | 74/335 |
| 5,603,241 A | * | 2/1997 | Umeyama | 74/335 X |
| 5,603,242 A | * | 2/1997 | Krieger | 74/335 |
| 5,839,989 A | * | 11/1998 | Saito et al. | 74/335 X |
| 6,019,698 A | * | 2/2000 | Lawrie et al. | 74/335 X |

FOREIGN PATENT DOCUMENTS

| | | |
|---|---|---|
| DE | 35 27 390 A1 | 2/1987 |
| DE | 37 37 192 A1 | 7/1988 |
| DE | 44 26 260 A1 | 2/1995 |
| DE | 195 04 847 A1 | 9/1995 |
| DE | 196 27 980 A1 | 1/1997 |
| DE | 196 37 001 A1 | 3/1997 |
| EP | 0412 069 A1 | 2/1991 |
| EP | 0492 152 A1 | 11/1991 |
| EP | 0542 349 A1 | 5/1993 |
| EP | 0800 949 A2 | 10/1997 |

* cited by examiner

Primary Examiner—Rodney H Bonck
Assistant Examiner—Ha Ho
(74) Attorney, Agent, or Firm—Darby & Darby

(57) ABSTRACT

A shiftable gear transmission has a plurality of gear pairs with free gears that can be engaged to one of the shafts by means of shift clutches and fixed gears that are permanently locked to one of the shafts. A start-up clutch arranged at the input side of the transmission couples and uncouples the torque flow. At least one of the shift clutches is a power-shift clutch with the ability to transmit a greater amount of torque than the other shift clutches. The start-up clutch and the power-shift clutch are controlled by at least one actuator unit.

16 Claims, 61 Drawing Sheets

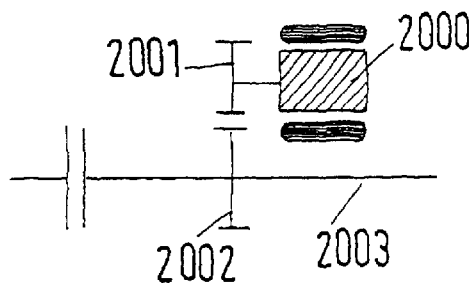
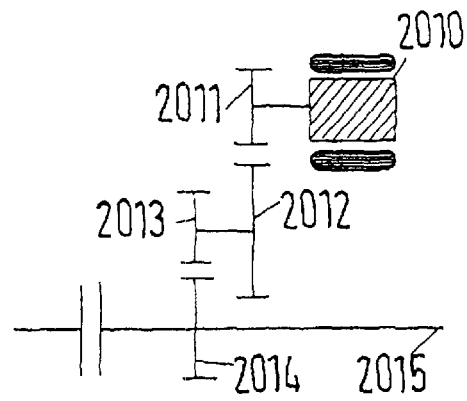
Fig. 50a    Fig. 50b
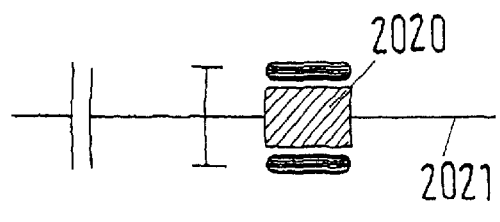
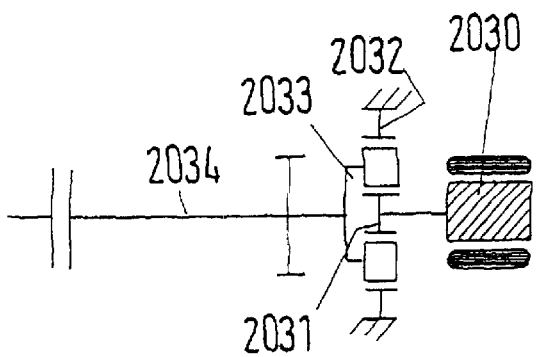
Fig. 50c    Fig. 50d
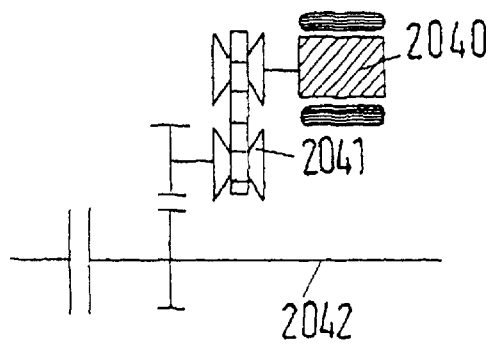
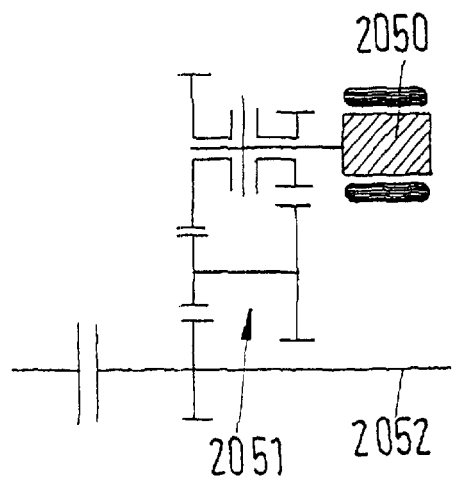
Fig. 50e    Fig. 50f

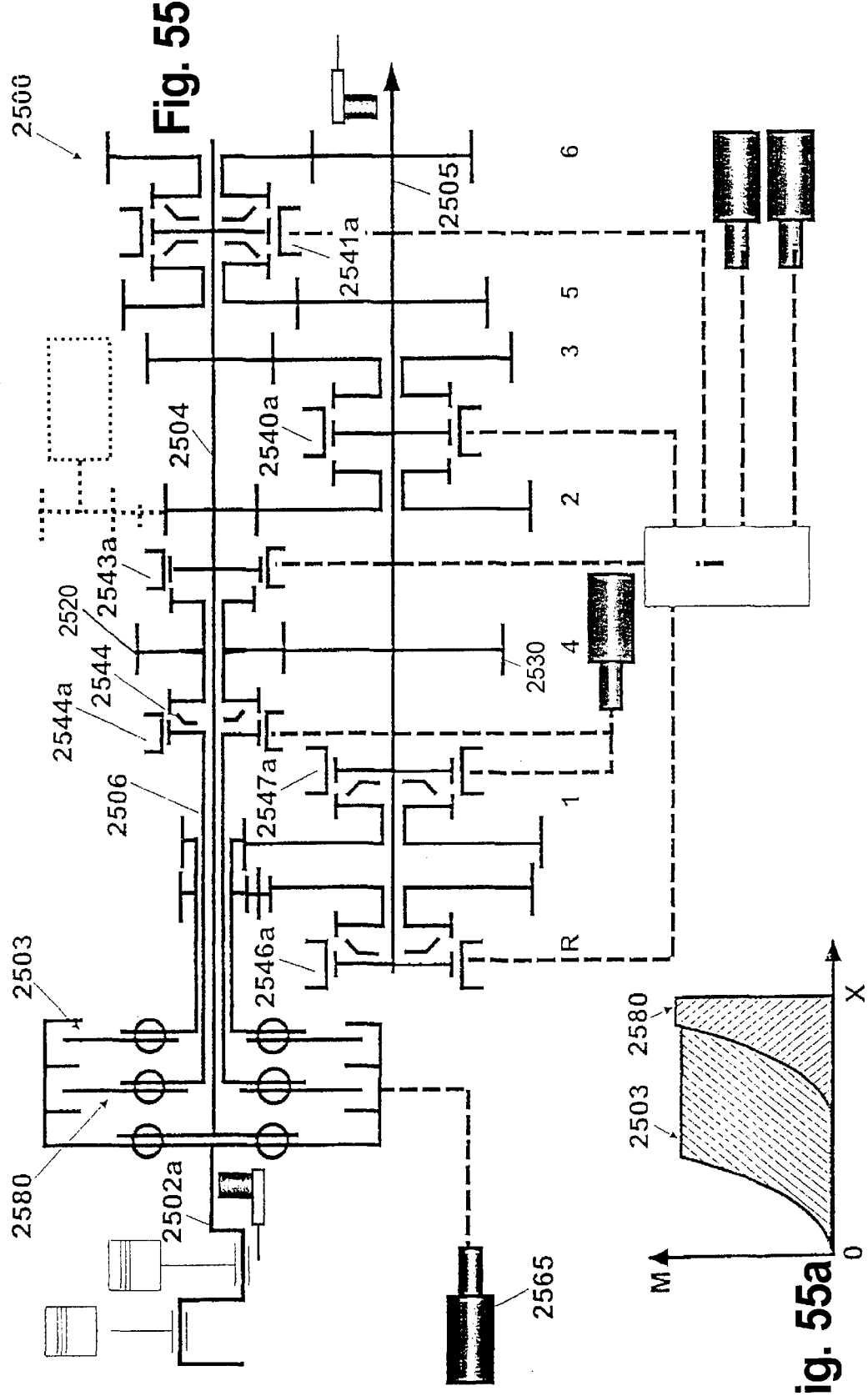

TRANSMISSION

This is a continuation of International Application No. PCT/DE98/03801 filed Dec. 22, 1998.

BACKGROUND OF THE INVENTION

The invention relates to a transmission, specifically a speed-changing gear transmission, with at least an input shaft and an output shaft and in some cases a countershaft, with a plurality of gear pairs comprising free gears that can be brought to a rotation-locked engagement with a first shaft by means of clutches and fixed gears that are permanently rotation-locked to a second shaft, and with a start-up clutch arranged at the input side of the transmission to couple and uncouple the flow of torque.

Transmissions of this kind are generally known in the field of motor vehicles. They suffer from the drawback that they cannot be shifted under load. In other words, vehicle traction is interrupted every time the transmission is shifted to change gear ratios.

OBJECT OF THE INVENTION

It is therefore the object of the present invention to provide a transmission according to the foregoing general description which can be shifted under load and at the same time has an uncomplicated design with regard to its constituent elements.

SUMMARY OF THE INVENTION

To meet the foregoing objective, the invention introduces the concept that at least one of the clutches is designed as a high-torque clutch, such as a power-shift clutch, and that the start-up clutch and the power-shift clutch can be actuated by at least one actuator unit.

In this arrangement, it can be of practical advantage if it is possible to engage the power-shift clutch while the start-up clutch is at least partially engaged.

Likewise, it is useful if it is possible to engage the power-shift clutch at a time when the start-up clutch is already engaged. The term "to engage" in this context means to increase the amount of torque that can be transmitted by the clutch.

It is advantageous, if at least one free gear can be connected to a shaft by means of a first clutch and/or a power-shift clutch.

It is further useful if two of the free gears can be connected to a shaft by means of a first clutch and/or a power-shift clutch.

It is likewise practically suitable if the free gear of the highest gear-ratio of the transmission can be connected to a shaft by means of a clutch and/or a power-shift clutch.

In a further embodiment, it is also of practical benefit if the clutch by which at least one free gear is coupled to a shaft is a form-locking clutch.

It is also suitable if the clutch by which at least one free gear is coupled to a shaft is a friction clutch.

It is further beneficial if the clutch by which at least one free gear is coupled to a shaft has an interposed synchronizer device.

It is also practical, it the power-shift clutch is a friction clutch. In, particular, it is practically suitable if the start-up clutch is a friction clutch.

It is advantageous if the start-up clutch is arranged in a space within a bell housing.

It also practically suitable if at least one power-shift clutch is arranged in a space within a bell housing.

It is further practical if the start-up clutch and at least one power-shift clutch are dry-friction clutches.

It is likewise of practical benefit if the start-up clutch is arranged inside the transmission housing.

Also practical is an arrangement where at least the power-shift clutch is inside the transmission housing.

It is also advantageous if the start-up clutch and/or at least one power-shift clutch is a friction clutch.

It is further advantageous if the start-up clutch is a hydrodynamic torque converter with or without a converter-lockup clutch.

In another embodiment, it is practical if the actuator for the start-up clutch and at least one power-shift clutch is energized by a pressure medium and has a pressure-medium supply and at least one valve controlling the supply of pressure medium to the slave cylinders, each of the two clutches being equipped with one slave cylinder.

According to a further concept of the invention, it is practical if the actuator for the start-up clutch and at least one power-shift clutch is electro-mechanically driven, with the possibility of arranging a speed-magnifying or speed-reducing gear box in series after an electric motor or electric magnet.

In accordance with a further concept of the present invention, it is practical if the actuator of the clutches that are used for gear-shifting is a pressure-powered actuator with a pressure-medium supply and at least one valve controlling the supply of pressure medium to the slave cylinders, each of the clutches being equipped with one slave cylinder.

According to another concept of the invention, it is practical if the actuator of the clutches that are used for gear-shifting is electro-mechanically driven, with the possibility of arranging a speed-magnifying or speed-reducing gear box in series after an electric motor or electric magnet.

In accordance with a further concept of the invention, it is practical if the transmission comprises an electro-mechanical energy converter serving as starting motor of the engine of the vehicle and/or as generator serving to produce and recuperate electrical energy from kinetic energy.

It is advantageous if the electromechanical energy converter drives or can be driven by way of a fixed gear of the transmission.

In accordance with a further concept of the invention, it is advantageous if the electromechanical energy converter drives or can be driven by the engine of the vehicle by way of a flywheel.

Under a further concept according to the invention, it is practical if the electromechanical energy converter drives or can be driven by way of the input shaft of the transmission.

It is practical for the electromechanical energy converter to have a stator and a rotor in coaxial alignment with the transmission input shaft.

It is practical for the electromechanical energy converter to have a stator and a rotor that are aligned in relation to an axis which runs essentially parallel to the transmission input shaft.

It is further practical for the electromechanical energy converter to have a stator and a rotor that are aligned coaxially to the transmission input shaft in an arrangement where the rotor has a rotation-locked connection with a flywheel or with an element that is connected to the transmission input shaft.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing in which

FIGS. 50a through 50f represent schematic views of arrangements shown in cross-section;

FIGS. 52 through 56 represent further schematic views of embodiments of a transmission according to the invention; and FIGS. 54a and 55a represent diagrams associated with the embodiments of FIGS. 54 and 55, showing the amounts of torque transmitted by the start-up clutch and by the power-shift clutch as a function of the degree of clutch engagement.

DETAILED DESCRIPTION OF THE INVENTION

Figure 1:
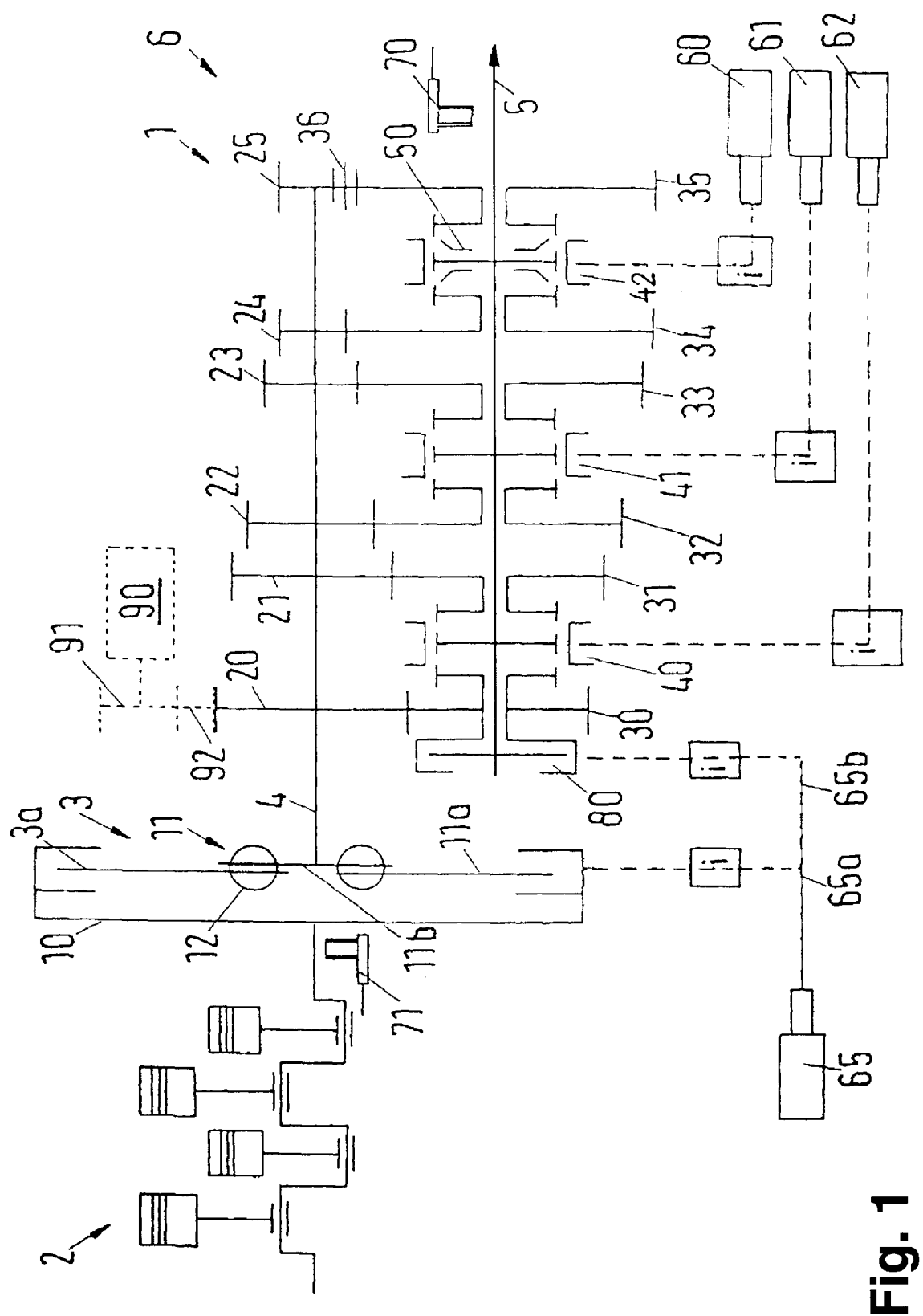
FIG. 1 represents a schematic view of a transmission.

FIG. 1 gives a schematic view of a motor vehicle transmission 1, arranged in series after a prime mover unit 2 such as a motor or a combustion engine, and a start-up or shift clutch 3 such as, e.g., a friction clutch. The transmission 1 has an input shaft 4, a countershaft 5 and, in some cases, an additional output shaft 6. In the embodiment of FIG. 1, the countershaft is also functions as output shaft. In another embodiment according to the invention, it is advantageous if a separate output is provided in addition to the input shaft 4 and the countershaft 5.

Between the engine 2 and the transmission 1 there is a flywheel 10 on which the friction clutch 3 is arranged with its pressure plate and clutch cover. Also, in place of a rigid flywheel 10, the arrangement can include a dual-mass flywheel in which two inertial masses are rotatable in relation to each other against the reactive forces generated, e.g., by energy-storing elements interposed between the inertial masses.

A rotary oscillation damper 11 is arranged between the driven plate 3a and the transmission input shaft 4. The rotary oscillation damper comprises at least two disc-shaped components 11a, 11b that are rotatable in relation to each other against the reactive forces generated, e.g., by energy-storing elements 12 interposed between the inertial masses. A preferred arrangement includes friction facings in the radially outer part of the driven plate.

The shafts, such as the input shaft, output shaft and, in some cases, the countershaft, are rotatably supported by bearings inside a transmission housing, centered with respect to the radial direction and, in some cases, retained axially by bearings. However, the bearings are not specifically represented in the drawing.

The input shaft 4 and output shaft 5 are arranged essentially in parallel alignment to each other. In another embodiment, it is also possible for the output shaft to be arranged coaxially with the input shaft, likewise supported and centered by bearings within the transmission housing.

In an advantageous embodiment, the start-up or shift clutch 3 is arranged, e.g., as a wet friction clutch, e.g., inside a transmission housing. In another advantageous embodiment, the clutch 3 is arranged, for example, as a dry friction clutch, for example inside a bell-shaped clutch housing between the engine 2 and the transmission 1.

The fixed gears 20, 21, 22, 23, 24 and 25 are connected to the input shaft 4 of the transmission 1 through an axially and rotationally fixed attachment. The fixed gears 20 through mesh with gears 30, 31, 32, 33, 34 and 35, such as free gears, which are seated without rotational constraint on the countershaft 5 and can be rotationally locked to the countershaft 5 by means of clutches. The reverse idler gear 36 is arranged between gears 25 and 35 to reverse the sense of rotation. The gear combination 25, 35, 36 thus transmits the torque flow in reverse gear. The gear pair 24, 34 transmits the torque flow in first gear; the pair 23, 33 transmits the torque flow in second gear; the pair 22, 32 transmits the torque flow in third gear; the pair 21, 31 transmits the torque flow in fourth gear; and the pair 20, 30 transmits the torque flow in fifth gear. In a further advantageous embodiment, the free gears 30 to 35 can also be arranged on the input shaft, and the fixed gears can be arranged on the countershaft. In another embodiment, each of the shafts can carry free gears as well as fixed gears.

The gears 30, 31 can be brought into form-locking engagement with the countershaft 5 by axial movement of the clutch 40 which may be of the sliding-sleeve type. Likewise, the gears 32, 33 can be brought into form-locking engagement with the countershaft 5 by axial movement of the sliding sleeve 41; and the gears 34, 35 can be brought into form-locking engagement with the countershaft 5 by axial movement of the sliding sleeve 42. It is understood that only one gear at a time is engaged to the countershaft 5 by means of a sliding sleeve, because the form-locking engagement between a gear and the shaft is made by moving a sliding sleeve in one axial direction or the other, where each of the sliding sleeves is arranged between two gears.

As illustrated, the transmission 1 is spatially structured into three component groups, each of which comprises two gear pairs with a clutch, such as a sliding sleeve, arranged between them. The first component group, A, comprises the gear pairs 20, 30 and 21, 31, and the sliding sleeve 40. The second component group, B, comprises the gear pairs 22, 32 and 23, 33, and the sliding sleeve 41. The third component group, C, comprises the gear pairs 24, 34 and 25, 35, the reverse idler gear 36, and the sliding sleeve 42.

The clutches 40, 41 and/or 42 can be advantageously configured as form-locking clutches such as dog clutches. Also, in another advantageous embodiment, the clutches can be friction clutches with conical or plane friction surfaces in a circular, ring-shaped arrangement of one or more friction surfaces such as a laminar-disc clutch. In a further embodiment, the clutches may comprise a synchronization device with one or more synchronizer ring 50. It is likewise possible to have clutches that are combinations of friction clutches and form-locking clutches.

As FIG. 1 illustrates, the gear pairs of first and reverse gear with the additional reverse idler gear constitute the first component group within the transmission, the gear pairs of second and third gear constitute the second component group, and the gear pairs of fourth and fifth gear constitute the third component group. Transmissions of a different component-group structure are also possible within the scope of the invention.

The sliding sleeves 40, 41 and 42 for shifting the gears of the transmission 1 are shifted between their different axial positions by means of actuator units 60, 61, 62. Each of the actuators acts on the associated sliding sleeve through a connection such as a rod linkage, a hydraulic line, a rope pull, a Bowden cable, or a selector shaft. The actuator unit may be energized by an electric motor, electromagnet, and/or a pressure device such as a hydraulic unit. Concerning this aspect, reference is made to DE 44 26 260, DE 195 04 847, DE 196 27 980, and DE 196 37 001. The present invention is also related to these earlier patent applications in a broader sense. They are herewith expressly included by reference in the disclosure of the present patent application.

At least one of the connections between actuator and sliding sleeve can comprise a motion transmitting device i.

The scope of transmissions according to the invention also includes, for example, four-speed transmissions with four forward gears and a reverse gear, or six-speed transmissions with six forward gears and a reverse gear, without restricting the general applicability of the concepts of the invention.

An rpm sensor 70 serves to measure the rpm rate at the output of the transmission, i.e., the rpm rate of the counter-shaft 5 in the specific case of FIG. 1. A further rpm sensor may be provided to measure the rpm rate of the input shaft 4. An rpm sensor 71 serves to measure the rpm rate of the engine. An electronic control unit serves to control the actuation of the start-up/shift clutch and of the gear-shifting clutches of the transmission. The electronic control unit comprises a memory and a computer unit. Based on input signals, the electronic control unit generates control signals to control the actuators. The rpm rates of the shafts can also be calculated on the basis of measured rpm rates and known rpm ratios of other shafts.

A clutch 80, such as a power-shift clutch, is connected to one of the gears 30 through 34 so that, when the clutch 80 is engaged, it couples the gear to the shaft 5. The clutch 80 can be actuated, i.e., engaged and disengaged, by means of the actuator 65 through the connection 65b. In advantageous arrangements, the clutch 80 is actuated either by a separate actuator or by the same actuator as the start-up or shift clutch 3, the latter being actuated, i.e., engaged and disengaged, by means of the actuator 65 through the connection 65a.

It is of practical advantage if the clutch 80 is arranged at the axial end of the countershaft 5 adjacent to clutch 3. In another advantageous embodiment it is practically suitable for the clutch 80 to be arranged at the axial end of the countershaft 5 located on the far side from clutch 3.

It is a further advantageous feature of the transmission that an electromechanical energy converter such as a starter motor, generator, or starter/generator 90 of the engine can drive the shaft 4 through a gear of the transmission such as, e.g., one of the gears 20 through 24. It is also possible to use one of the gears of the transmission to drive an electromechanical energy converter such as a generator. It is particularly advantageous if the starter motor and the generator are incorporated together in a combined electromechanical energy converter such as a starter/generator. Thus, the electromechanical energy converter can, in addition to starting the engine, have a further mode of operation where it adds torque to the output of the transmission and thereby supplements the drive power of the engine. In suitable arrangements, it is also possible to use the electromechanical energy converter alone for driving the vehicle at least over short time intervals when the demand for torque or power is low. In a further embodiment or as an example of an application of the invention, the electromechanical energy converter can be used to convert a part of the kinetic energy of the vehicle into electrical energy and, for example, store the electrical energy in a battery. This mode of operation can occur when the engine 2 is running in a drag mode. The term "drag mode" in this context means that the engine takes on a braking function, e.g., when coasting downhill and/or when decelerating the vehicle. A vehicle equipped with a transmission according to the invention thus has the advantages of conserving fuel and reducing the emission of pollutants. Also, the electro-mechanical energy converter can provide an increased level of torque during transmission shifts.

The electro-mechanical energy converter 90 according to FIG. 1 can be driven, e.g., by a gear and can be arranged parallel to the transmission input shaft or the transmission output shaft. Interposed between a fixed gear, e.g., gear 20, and the pinion gear 91 of the electromechanical energy converter, there can be an intermediate gear 92. It is also possible to drive the electromechanical energy converter through a belt or chain. To transmit torque from and to the electromechanical energy converter and to reduce or magnify the rpm rate, there can be a continuously variable rpm converter, a gear box with discrete rpm ratios, or a shiftable or fixed-ratio gear box.

Furthermore, it is also possible to arrange the electro-mechanical energy converter coaxially with the transmission input shaft.

The subject of the invention is a transmission 1 that shifts under load or has the capability to be shifted under load. The way in which the shifting under load is made possible or is being performed is to brake the combustion engine 2 including the input shaft 4 by means of the power-shift clutch 80 against the drive train of the vehicle. Thus, a part of the kinetic energy of the engine 2 is converted into kinetic energy of the vehicle.

According to the invention, at least one clutch actuator is provided to act on the start-up or shift clutch 3 as well as on the power-shift clutch 80. It is advantageous, if the start-up clutch 3 is at least partially engaged while the power-shift clutch is being actuated. In another embodiment, it is practical for the start-up clutch to be completely engaged.

The device according to the invention offers the particular advantages of using uncomplicated transmission structures and a low number of actuators.

The advantages of this transmission include: Highly comfortable shifting because there is almost no interruption in the load; compact length because it may be possible to leave out some of the synchronizers; low weight; high efficiency.

With the device according to the invention, the kinetic energy of the engine during a transmission shift is not dissipated by braking but is used as part of the motive power to drive the vehicle. The motor is braked against the drive train. Thus, there is no longer an interruption in the tractive force.

This is particularly advantageous in up-shifts under a tractive load. It is also of advantage in down-shifts under a reverse torque load, i.e., in a coasting phase, because in this case the kinetic energy of the vehicle is used to increase the rpm rate of the engine.

The load-shifting transmission 1, also called power-shift transmission, is a dual-shaft transmission with spur gears. A friction clutch 3 between the motor 2 and the input shaft 4 serves as start-up clutch. A spring/damper system 11 is preferably integrated into the clutch disc to attenuate rotary oscillations. However, the spring/damper system can also be integrated in a dual-mass flywheel.

The free gears can be arranged on the input shaft or on the countershaft. The free gears can be brought into engagement with the shaft through a clutches or sliding sleeves. Sliding sleeves engage the countershaft 5 with the free gears, e.g., by means of dog clutches. The form-locking clutch for first or reverse gear can be combined with a friction clutch such as a synchronizer, as indicated in FIG. 1 by the synchronizer ring 50 for first and reverse gears. The clutches 40, 41, 42 are actuated by at least on actuator.

A high-torque friction clutch 80, such as a power-shift clutch, connects the free gear 30 of a high gear, e.g., of the fifth gear, with the shaft 5. A clutch actuator 65 acts on the power-shift clutch 80 as well as on the start-up clutch 3. The displacement travel of the clutch actuator is apportioned in such a way that the power-shift clutch 80 can be engaged only after the start-up clutch 3 has been engaged.

The system further comprises an electronic control unit with a microprocessor for the electronic control of the transmission and the clutches, an rpm-measuring system, an electronic throttle control or engine intake system and an electronic engine control system for the combustion engine, a manually operable gear-selector element such as a lever, switch or the like to shift gears manually and/or automatically, and an indicator display in the vehicle cabin to indicate the currently engaged gear level.

It is further advantageous to provide an electro-mechanical energy converter that can be used as starter or generator with the added possibility of using it as decelerator or supplemental source of motive power.

To set the vehicle in motion, a low gear (i.e., first or second gear) is selected in the transmission. The start-up clutch 3 is engaged by means of an actuator 65 while the engine 2 is directed by depressing the accelerator pedal to build up torque to accelerate the vehicle. The start-up process is concluded when the start-up clutch is no longer slipping. In this state, the engine torque is transmitted through the engaged clutch and the selected gear to the output shaft 5.

The shifting process is in all cases initiated either by the driver or by the automatic control.

In an up-shift under engine traction, the clutch actuator begins to perform a controlled engagement of the power-shift clutch 80 while the start-up clutch 3 remains engaged. The greater the torque transmitted through the power-shift clutch 80, the smaller is the torque load on the respective clutch 40, 41 or 42 of the currently engaged gear. When the torque transmitted through the clutch of the currently engaged gear has decreased essentially to zero, its engagement is disconnected. The torque transmitted through the slipping power-shift clutch 80 decelerates the rpm rate of the combustion engine along with the input shaft of the transmission, whereby the kinetic energy of the engine is reduced. The torque transmitted through the slipping power-shift clutch 80 is taken up by the drive train, so that part of the kinetic energy of the engine 2 is delivered to the vehicle. Thus, the torque on the drive train is maintained during gear synchronization, i.e., the transmission shifts under load.

Having reached a synchronous rate of rotation, the respective clutch 40, 41 or 42 of the new gear level is engaged under actuator control. At the same time, the power-shift clutch 80 is disengaged. The new gear-level is operational, and the shifting process is concluded.

Shortly before reaching the synchronous rpm rate, the clutch torque and the engine torque are controlled in such a manner that engine acceleration is reduced to only a low level and that the engine essentially ceases to accelerate at the point of synchronization. At this point, the clutch of the new gear is brought into engagement. If the start-up clutch is engaged, the power-shift clutch is taken out of engagement.

The power-shift clutch 80 is preferably integrated in the free gear of the highest gear, but it can also be arranged to work with the free gear of a lower gear. In this case, the higher gears cannot be shifted under load. In return, shifts between lower gears (i.e., shifting into a gear that is lower than the gear equipped with the power-shift clutch) will cause less of a drop in tractive power during the shifting process.

At the start of an up-shift under power, engine torque is increased. At the same time, torque is shifted to the power-shift clutch so that the synchronizer clutch of the currently active gear can be disengaged. Subsequently, the torque transmitted through the power-shift clutch can be reduced and the engine can be accelerated. Shortly before reaching the synchronized rpm rate, the power-shift clutch is engaged again, the engine is slowed down, and the new gear is brought into engagement. The power-shift clutch is taken out of engagement and the new gear takes over in transmitting the torque flow.

Down-shifts require an increase in the rpm rate of the engine. In this case, the dynamic momentum of the vehicle is used to increase the kinetic energy of the engine. Engine torque is reduced in a controlled manner. When the torque transmitted through the current gear has been decreased to essentially zero, the respective clutch 40, 41 or 42 of the current gear is taken out of engagement. At this point, engine torque is increased, and the engine along with the transmission input shaft is accelerated. When the engine has reached the synchronous rpm.rate of the new gear, the engine torque is briefly lowered and the respective clutch 40, 41 or 42 of the new gear is brought into engagement. Now, control over the engine torque is resumed by the driver.

Down-shifts under traction can be made more comfortable, if the power-shift clutch 80 is arranged at the high gear, because a part of the engine torque that is intended for the acceleration of the engine is introduced into the drive train. While this lengthens the time interval for synchronization, it avoids an otherwise total interruption of in the torque flow.

If the transmission has a second power-shift clutch arranged with the lowest gear, the engine can be accelerated by the drive train when down-shifting in a coasting mode of the vehicle. This has the effect of decelerating the vehicle during the synchronization process, because the kinetic energy of the vehicle is directed into the engine. Thus, the down-shift in a coasting mode, likewise, is performed under load. Instead of a power-shift clutch, it would be feasible to use a high-torque locking synchronizer such as a dual-cone synchronizer.

Figure 2:
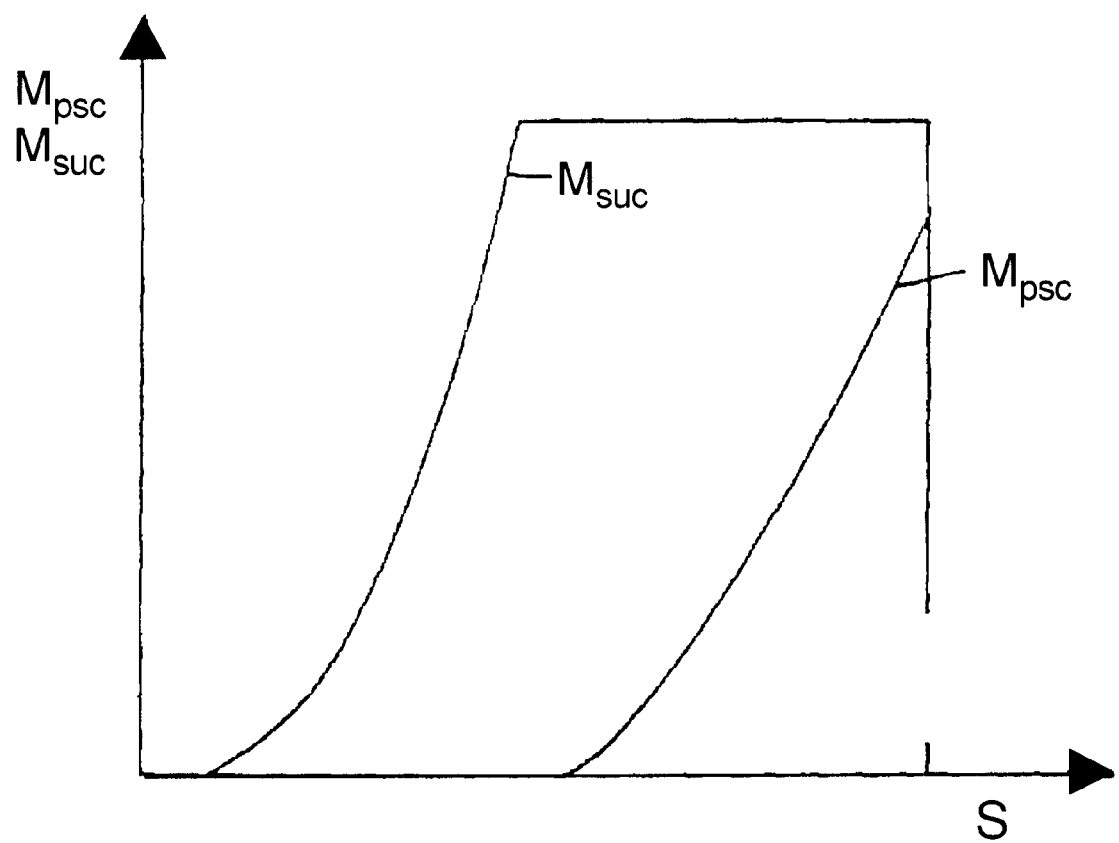
FIG. 2 represents a diagram.

FIG. 2 shows a characteristic curve representing the respective amounts of torque $M_{suc}$ and $M_{psc}$ that can be transmitted by the start-up clutch 3 and the power-shift clutch 80 as a function of the displacement s of the actuator 65.

The amounts of torque that can be transmitted through the clutches 3 and 80, respectively, are a function of actuator displacement. In the first part of the displacement range, the torque that can be transmitted by the power-shift clutch is zero, while the amount of torque that can be transmitted by the start-up clutch is increasing. At the point where the start-up clutch 3 is essentially engaged and the amount of torque that can be transmitted is independent of the further displacement of the actuator, the power-shift clutch 80 can be engaged. The respective engagement phase is represented by the characteristic $M_{psc}$ in FIG. 2.

Figure 3A:
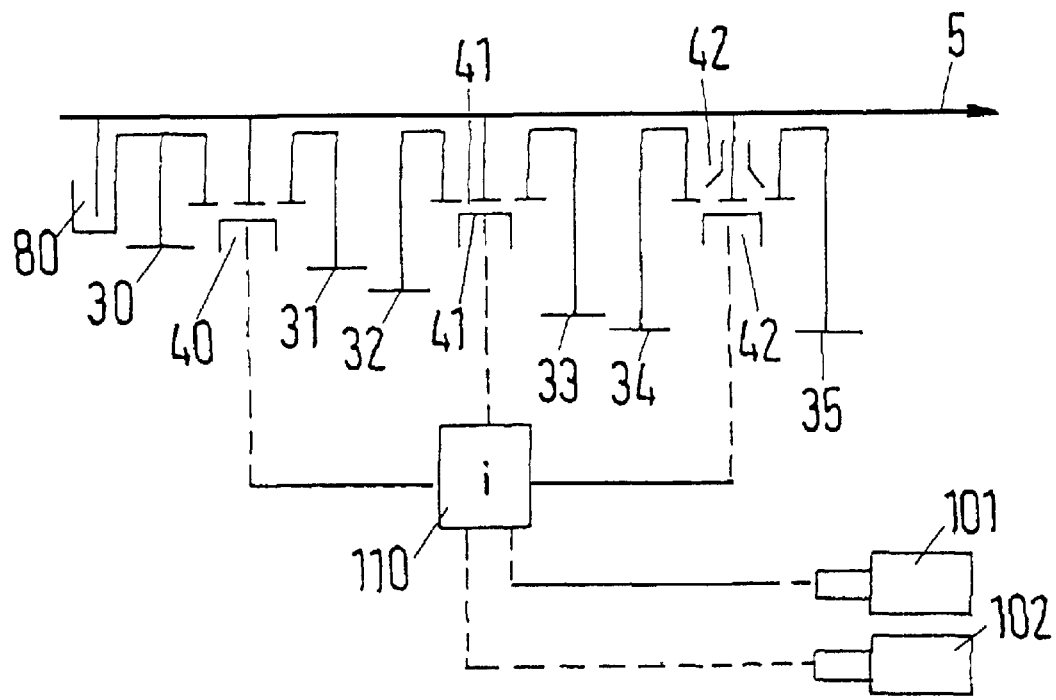
FIG. 3a represents part of a schematic view of a transmission.
Figure 3B:
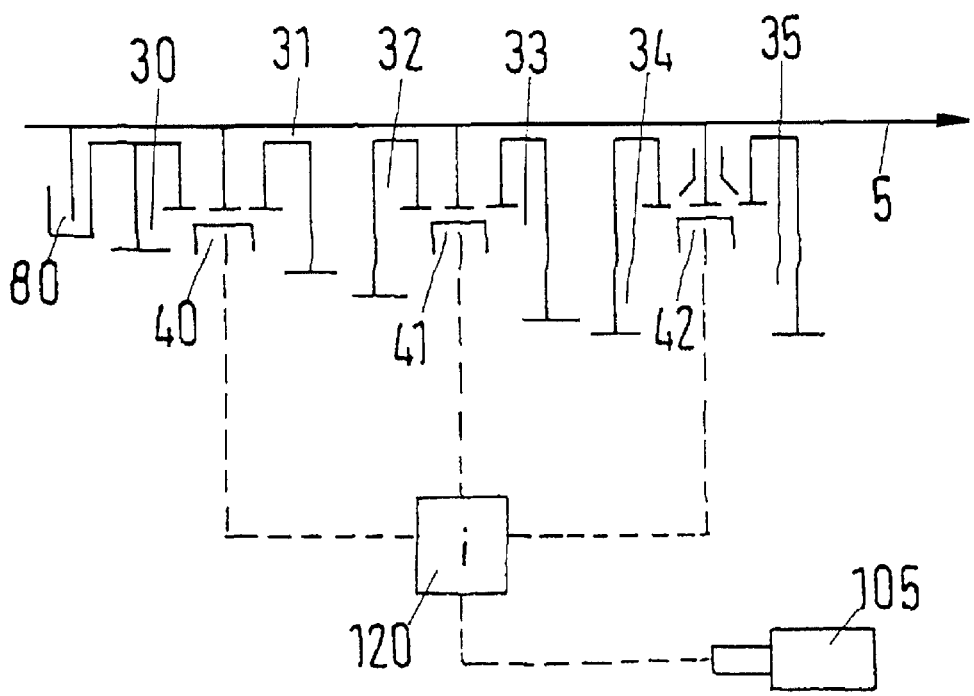
FIG. 3b represents part of a schematic view of a transmission.

FIGS. 3a and 3b show parts of embodiments incorporating inventive modifications of the embodiment of FIG. 1. The features of the transmission that are omitted from the FIGS. 3a and 3b are comparable to the corresponding features of FIG. 1.

The embodiment of FIG. 3a has two actuators for selecting the gear that is to be engaged. The actuators serve to select and act on the respective sliding sleeve or clutch 40, 41 or 42 and to move the sliding sleeve in the appropriate direction as needed to couple the selected one of the gears 30 to 35 to the shaft 5. The arrangement includes a mechanism between the actuators 101 and 102 such as a central selector shaft 110 or a plurality of shafts or rods for selecting and axially displacing the sliding sleeve by means of the actuators. With a central selector shaft, the selection of the sliding sleeve can be performed, e.g., by rotating the shaft, and the axial displacement can be effected by pulling or pushing the shaft. The reverse arrangement is equally possible.

In an embodiment with at least two selector rods, one actuator can serve to select the rod and associated sliding sleeve to be actuated, while the other actuator can serve to pull or push the selected rod.

In an embodiment with at least two selector shafts, one actuator can perform the selection of the sliding sleeve by rotating one of the shafts, and the other actuator can perform the axial displacement of the selected sliding sleeve by rotating the shaft.

FIG. 3b illustrates an embodiment comprising a single actuator 105 for selecting the gear that is to be engaged. The actuator performs the functions of selecting and actuating the appropriate sliding sleeve or clutch 40, 41 or 42 and moving it in the appropriate direction as required to couple the selected one of the gears 30 to 35 to the shaft 5. In this arrangement, a mechanism 120 such as a selector cylinder is interposed between the actuator 105 and the sliding sleeves, which allows the actuator to perform both the selection and the axial displacement of the sliding sleeve. A selector cylinder is a rotatable cylinder with grooves that are engaged by pins of the sliding sleeves so that, when the cylinder is rotated, the pins are guided by the grooves to axially displace the sliding sleeves and thereby shift the gears in serial sequence.

Figure 4A:
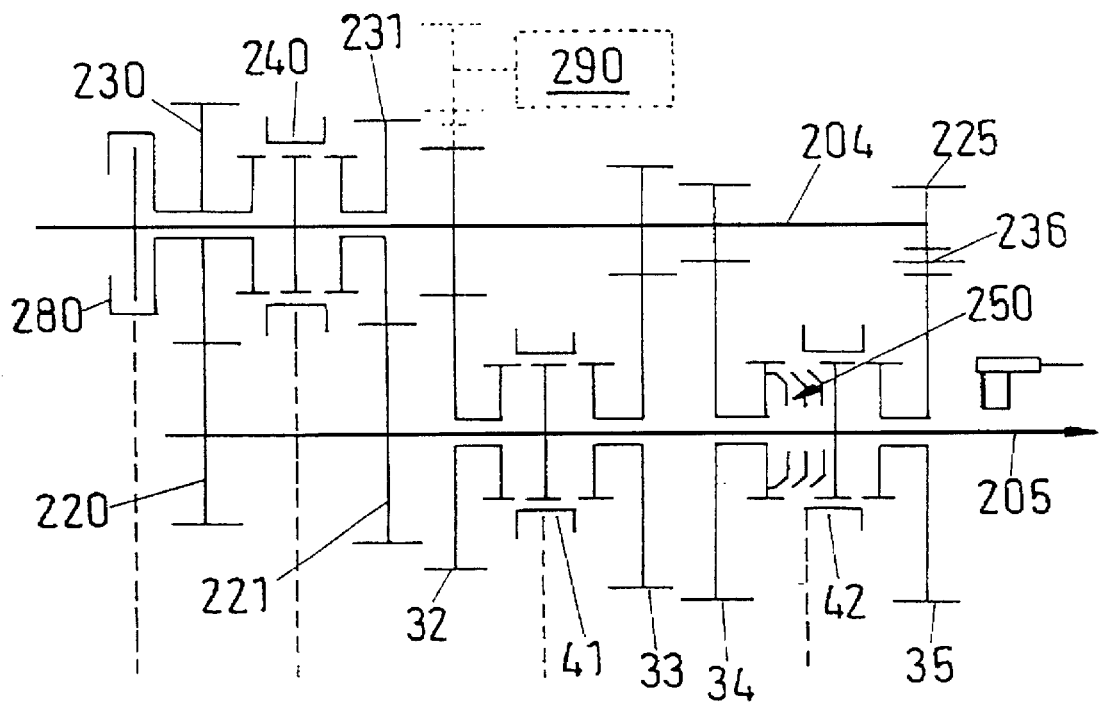
FIG. 4a represents part of a schematic view of a transmission.

FIG. 4a shows a portion of an embodiment of a transmission according to the invention, where the free gears 230, 231 of fourth and fifth gear are arranged rotatably on the shaft 204, representing an input or driving shaft, and can be brought into rotation-locked engagement with the shaft 204 by axially shifting the sliding sleeve or clutch 240. The power-shift clutch 280 is likewise arranged on the input shaft. The fixed gears 220 and 221 of fourth and fifth gear are mounted by a rotationally fixed connection on the output shaft or countershaft 205. The free gears 32 to 35 are arranged on the shaft 205 while the corresponding fixed gears are mounted on the shaft 204.

The synchronization of first gear between gear 34 and the sliding sleeve 42 is configured as a multi-cone synchronizer 250, e.g., as a dual-cone clutch.

In the embodiment of FIG. 4a, the electromechanical energy converter 290, such as a starter/generator or starter motor or generator, drives a fixed gear of the third-gear set. It can also be configured to drive a fixed gear of another gear set.

Figure 4B:
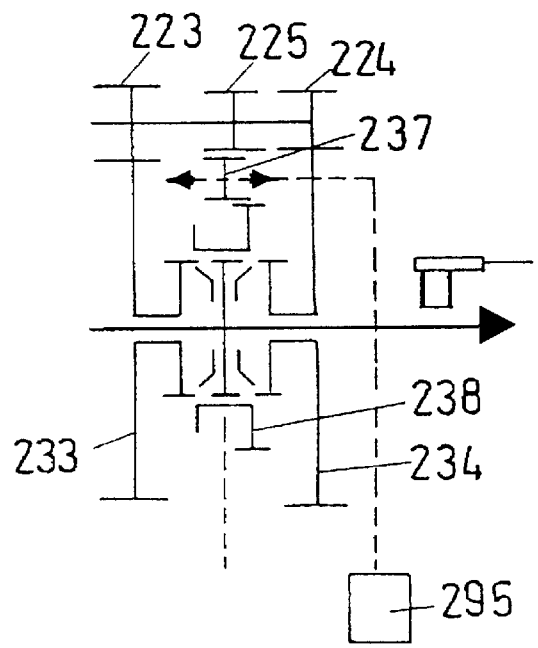
FIG. 4b represents part of a schematic view of a transmission.

FIG. 4b illustrates a portion of a transmission according to the invention comprising a reverse-gear arrangement with a fixed gear 225 rotationally locked on the input shaft, an axially movable reverse idler gear 237 and a sliding sleeve 238 that is rotationally locked to the output shaft and configured as a gear with an external toothed profile. To engage the reverse gear, the axially movable reverse idler gear 237 is moved axially by means of an actuator 295, whereby a form-locking engagement is established between the gears 225, 237 and 238.

Figure 5A:
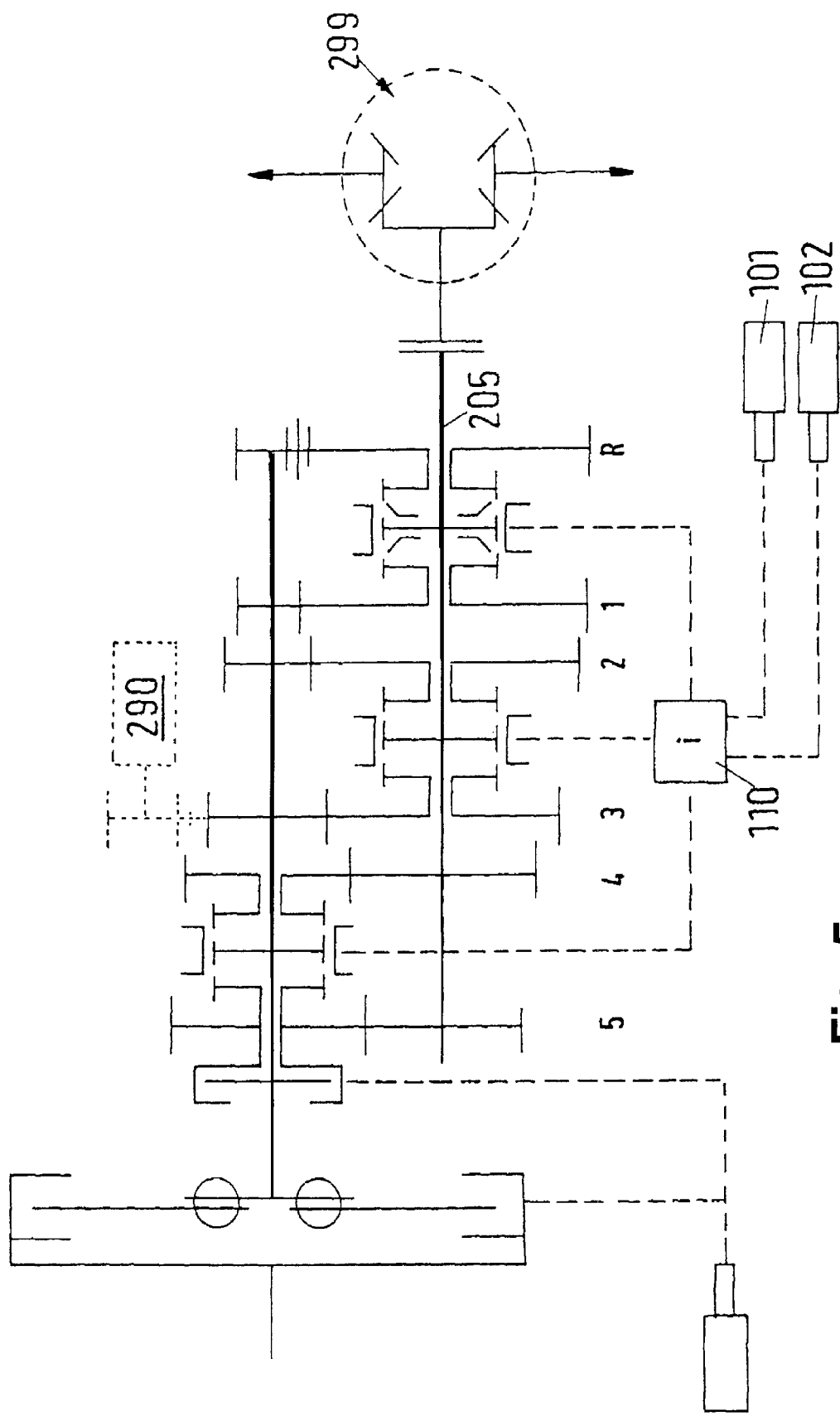
FIG. 5a represents a schematic view of a transmission.
Figure 5B:
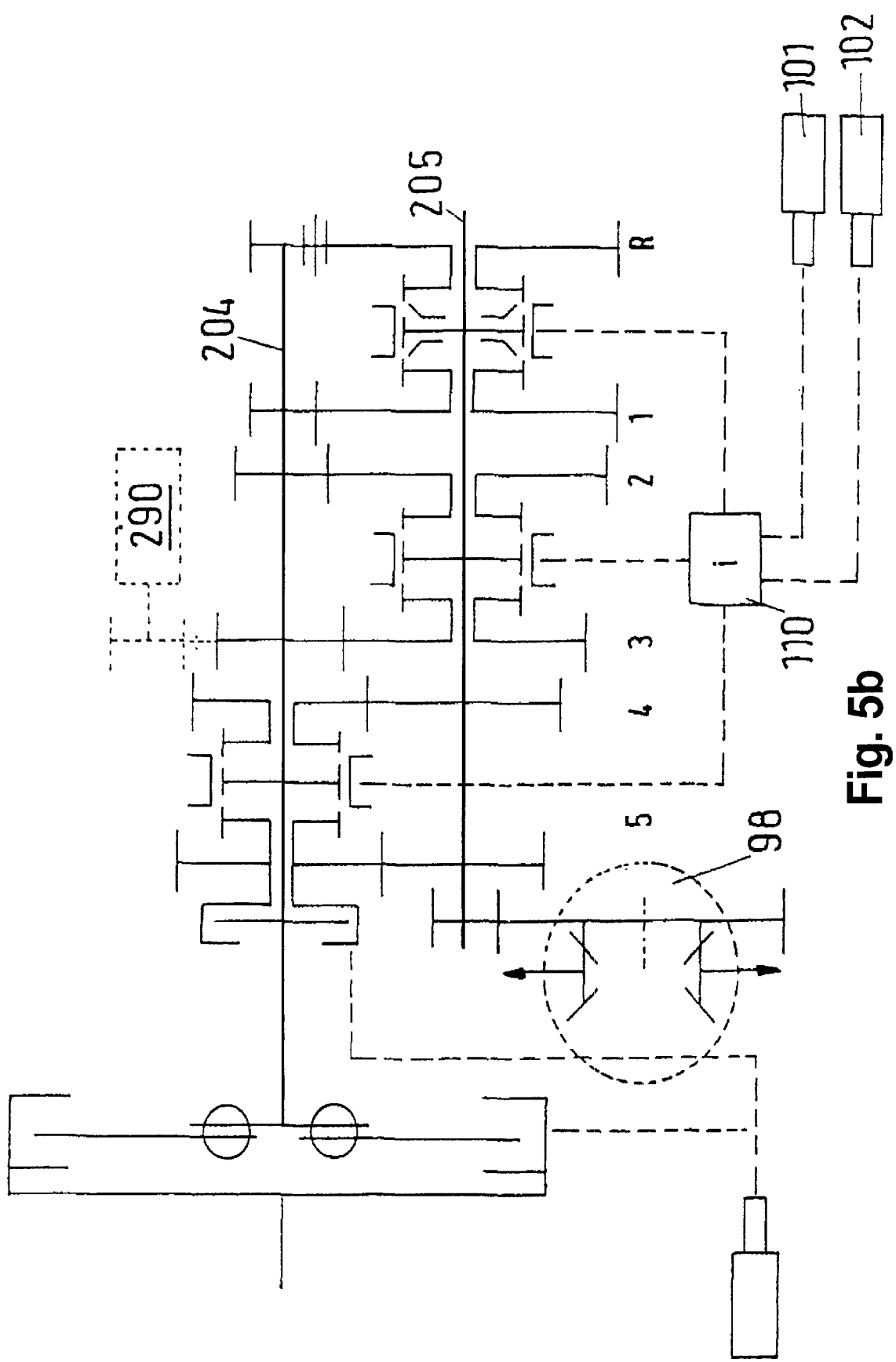
FIG. 5b represents a schematic view of a transmission.

FIGS. 5a and 5b illustrate embodiments of a transmission according to the invention including a differential 299, 298 arranged in series after the output shaft 205. In FIG. 5a, the differential 299 of the output shaft or countershaft 205 is arranged at the axial end of the torque-flow path that is farthest from the engine and the start-up clutch. In FIG. 5b, the differential 298 of the output shaft or countershaft 205 is arranged at the axial end of the torque-flow path next to the engine 2 and the start-up clutch.

Figure 6:
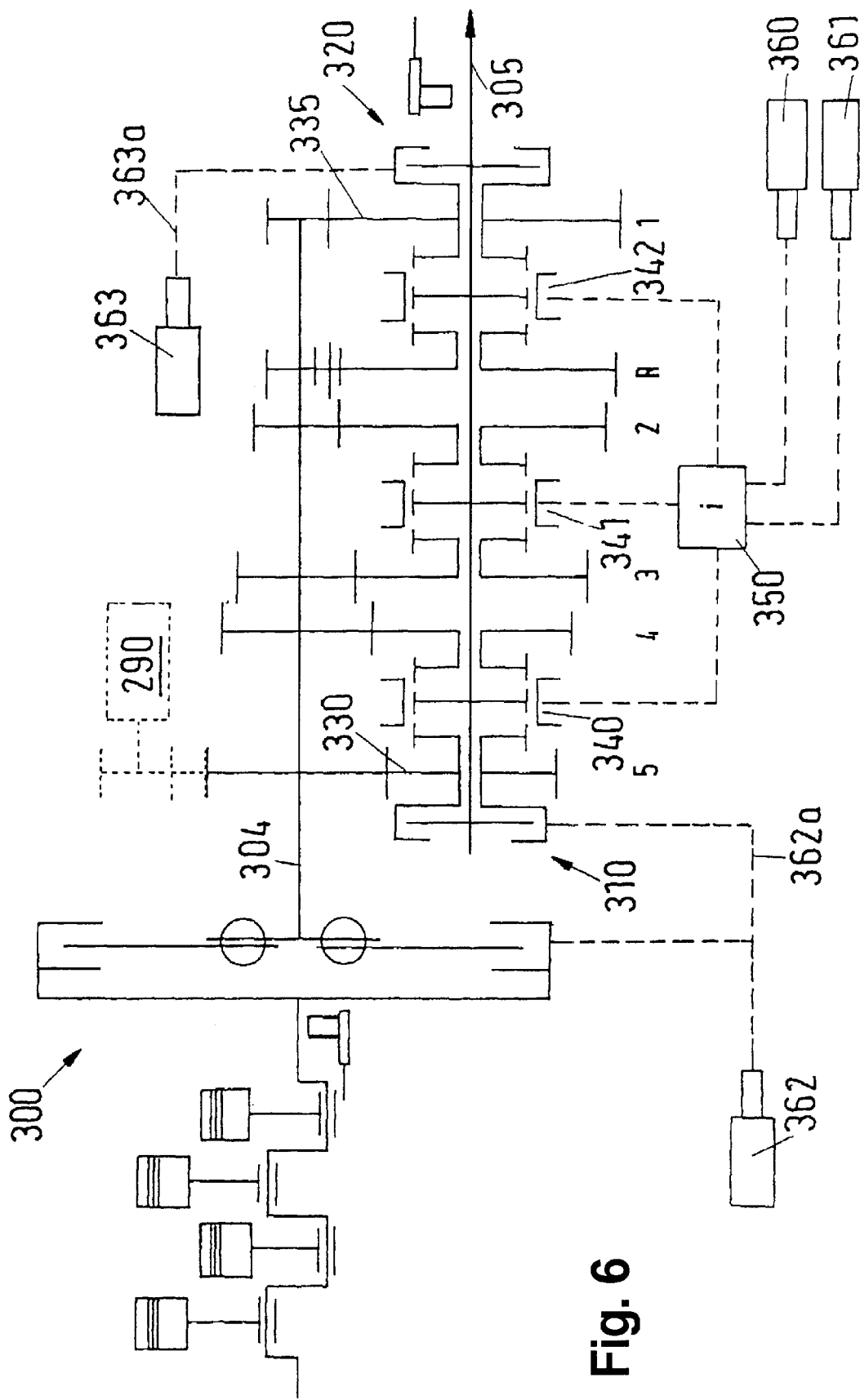
FIG. 6 represents a schematic view of a transmission.

FIG. 6 illustrates an embodiment of a transmission 300 with essentially the same basic layout as the transmission of FIG. 1, using two actuators 360, 361 as in FIG. 3a for the clutches or sliding sleeves to shift gears. The actuators 360, 361 shift or actuate the clutches or sliding sleeves 340, 341, 342 through a mechanism 350 in which the selection between the sliding sleeves is performed, e.g., by actuator 360 and the shifting of the selected sliding sleeve is performed by actuator 361.

A power-shift clutch 310 such as, e.g., a friction clutch, is associated with the free gear 330 of the fifth gear. By engaging the power-shift clutch 310, the free gear 330 is brought into a rotation-locked engagement with the shaft 305. Furthermore, a second power-shift clutch 320 such as, e.g., a friction clutch, is associated with the free gear 335 of the first gear. By engaging the power-shift clutch 320, the free gear 335 is brought into a rotation-locked engagement with the shaft 305. Thus, either one of the clutches 310 or 320 can be engaged for shifting the transmission under load, i.e., without an interruption in the tractive force, as has already been described above. Actuators 362 and 363 with motion-transmitting devices 362a and 363a are provided for actuating the clutches 310 and 320. The motion-transmitting devices can be rod mechanisms, Bowden cables, hydraulic connections with master and slave cylinders, or the like. The actuators can be driven by electric motors that may be geared up or down by a gear box. There are also advantageous embodiments in which hydraulic actuators are used.

Figure 7A:
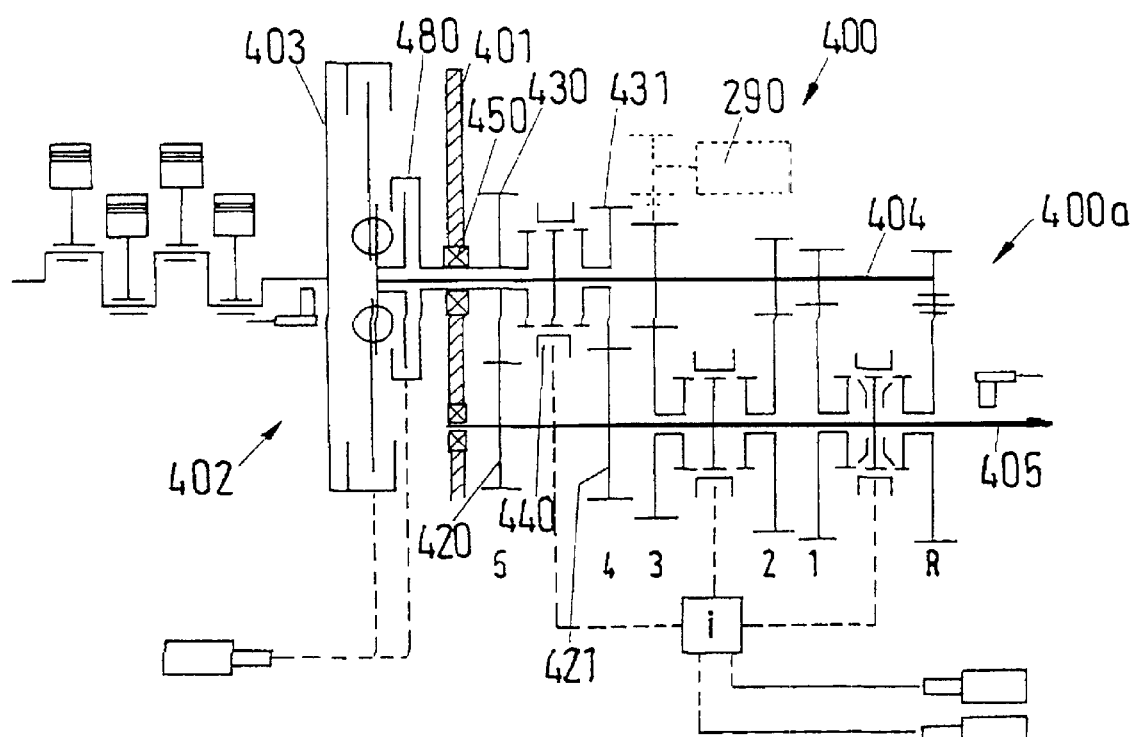
FIG. 7a represents a schematic view of a transmission.
Figure 7B:
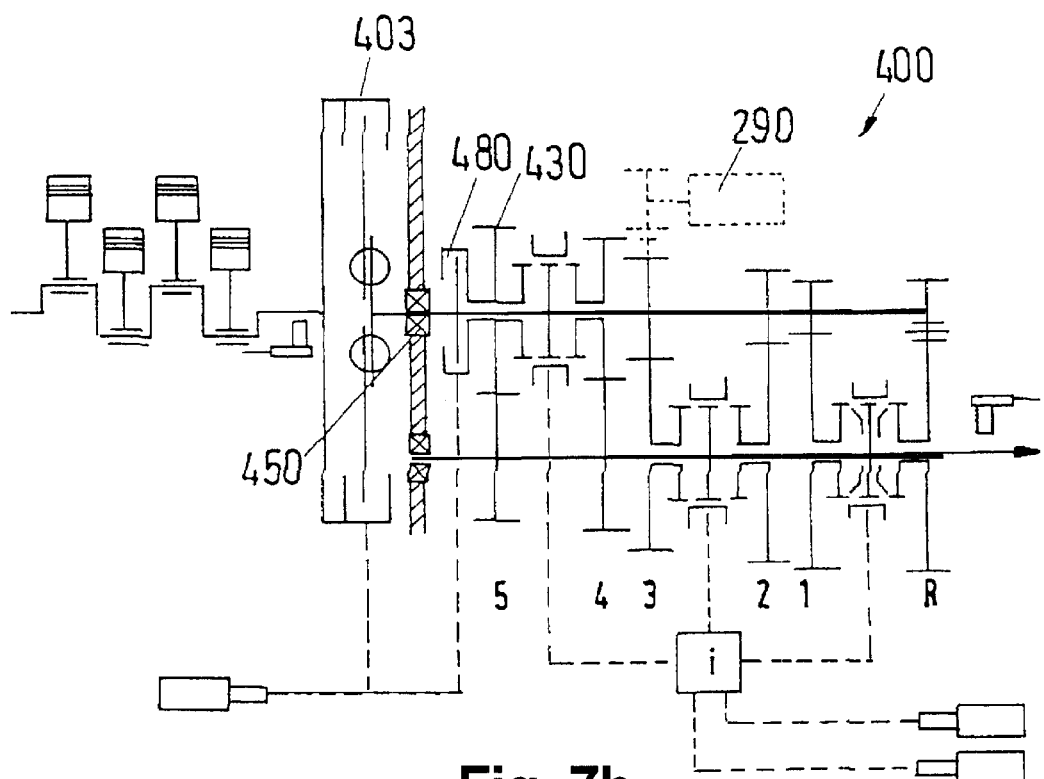
FIG. 7b represents a schematic view of a transmission.

FIGS. 7a and 7b illustrate embodiments of transmissions 400 where the start-up clutch 403 is arranged in a bell housing next to the transmission outside of the closed transmission housing 401. The bell housing, which is mounted on the engine shaft, is half open, with the open side partially delimited by another bell-shaped housing the latter being part of the transmission. Thus, the space between the two bell housings is closed off except for minor openings. In the embodiment of FIG. 7a, the power-shift clutch 480 connecting the free gear 430 to the shaft 404 is arranged inside the clutch bell in the space 402. The connection to the free gear is made by way of a hollow shaft that passes through an opening in the transmission housing. The transmission shaft 404, surrounded by the hollow shaft, extends likewise past the opening in the transmission housing. The two clutches 403 and 480, both located in the space 402 outside the transmission housing, are configured advantageously as friction clutches, specifically dry friction clutches. The shaft 404 and the hollow shaft from the clutch 480 to the free gear 430 are advantageously supported by bearing means 450 installed in the transmission housing.

In the embodiment of FIG. 7b, the power-shift clutch 480 for the engagement of the free gear 430 to the shaft 404 is arranged inside the transmission housing in the space 400a. A hollow shaft connects the power-shift clutch 480 to the free gear. The clutch 403 is arranged in the space 402 and is configured preferably as a friction clutch, specifically a dry friction clutch. The power-shift clutch 480 is arranged inside the transmission housing and is preferably a wet friction clutch, specifically a laminar-disc clutch. The shaft 404 is advantageously supported by bearing means 450 in the wall of the transmission housing.

In different embodiments, the power-shift clutch 80 (as well as 480) can be associated with a different free gear belonging to a different speed. Preferably, the power-shift clutch is arranged to work with the highest gear of the transmission.

In the case where the power-shift clutch 80 is connected or arranged to work with the free gear 30 of the highest gear set, all up-shifts can be performed under load when the vehicle is in a traction mode. If the power-shift clutch is arranged to work with the free gear of a lower speed (e.g., third or fourth gear), then the respective higher gear levels cannot be shifted under load. However, as an advantage of the latter arrangement, the transient drop in the tractive force during the shift is less pronounced in the remaining power-shifted gears. The power-shift clutch 80, like any of the free gears, can be arranged either on the input shaft 4 or on the countershaft 5. However, the preference is for arranging the power-shift clutch on the input shaft 4. In a further advantageous embodiment, the power-shift clutch is arranged on the countershaft.

Preferably, the power-shift clutch 80 is arranged in the transmission housing in a place close to the bell housing of the clutch or even immediately at the bearing of the input shaft.

The power-shift clutch can be arranged within the oil-lubricated domain of the transmission or in the bell housing of the clutch.

The design choices for the spatial arrangement or sequence of the gears are not restricted, because with the automated operation of the transmission it is not necessary for the gears to be arranged in sequence as would be the case with a manual transmission. This provides the advantage that, in contrast to a manual transmission, two gears working on the same sliding sleeve do not have to be sequentially paired.

For down-shifting under load in a coasting mode of the vehicle, one could in principle also use a high-torque locking first-gear synchronizer between the sliding sleeve and the free gear. In a system of this kind, the locking synchronizer provides part of the torque, with the engine providing the rest of the torque, for synchronizing the input shaft and the engine. Thus, the tractive force is not completely interrupted as a part of the torque is applied to the drive train of the vehicle comprising the drive shaft and the driven wheels.

Advantageous choices for the power-shift clutch are:
wet-running clutch,
dry-running clutch,
disc clutch,
cone clutch with one or more conical friction surfaces,
clutch with one friction surface,
clutch with two friction surfaces,
clutch with several friction surfaces (e.g., a laminar-disc clutch).

The clutches or sliding sleeves for coupling the free gears to the shaft can be configured as
form-locking clutches such as dog clutches,
friction clutches.

In order to optimize the efficiency of the transmission, it is especially advantageous if the engagement of the clutches and sliding sleeves for coupling the free gears to the shaft can be maintained without using additional outside energy. This requirement can be met by using form-locking clutches. To maintain the engagement of a friction-based clutch without using energy, it is advantageous to use energy-storing elements such as, e.g., springs to press the friction surfaces against each other. It is also possible to use spline couplings or spring-tensioned friction clutches.

The mating parts of form-locking clutches can have different tooth profiles such as, e.g.: smooth with rounded corners, convex claw, Berliet claw or repelling claw.

It can be advantageous to equip the first and/or the reverse gear with a synchronization that has synchronizer rings. In another embodiment, it can be practical if at least individual gears are equipped with a synchronization that has synchronizer rings.

Transmissions with a countershaft can have different arrangements of the free gears 30 to 35 and clutches 40 to 42. The free gear of each transmission ratio can be arranged either on the input shaft or on the countershaft. Accordingly, the power-shift clutch, too, can be on one or the other of the shafts in different embodiments.

The transmission can be configured as a four-speed transmission, five-speed transmission, or also as a six-speed transmission or other multiple-speed transmission.

An advantageous embodiment of the inventive transmission can be arranged in transverse orientation at the front of the vehicle. Another embodiment can have an advantageous arrangement with lengthwise orientation at the front of the vehicle. Other advantageous configuration of a drive train incorporating the inventive transmission are likewise conceivable.

The actuators 60, 61, 62, 65, 101, 102, 105 and/or 363 in different embodiments can be configured advantageously with electric motors providing a rotary motion of an output element, electric motors with a linear mode of motion such as linear magnets, rotary hydraulic actuators such as gear pumps or vane pumps, linear hydraulic actuators such as pistons, piezo-electric actuators, and thermo-mechanical actuators.

The actuators can incorporate motion-transmitting devices between the motors and the actuating elements, such as: levers, ramps, cam drives, spindles, worm gears, spur gears, planetary gear sets, etc., as well as pneumatic or hydraulic devices with master and slave cylinders, or pressure-operated devices in general.

To transmit the kinetic action to the controlled element one of the following motion-transmitting devices can be employed: adjustable or self-adjusting transfer devices such as levers, pull ropes, rods, slides, ramps, cam drives, etc., as well as hydrostatic devices such as master/slave cylinders with or without sniffle bores, hydrodynamic devices, pneumatic devices.

The actuators for performing the gear shift and for selecting the gear to be engaged can also be combined through interposed mechanisms such as 110 of FIG. 3a. This allows the shifting of more gear-shift pairs than the number of actuators provided. Examples for this are mechanisms corresponding to the H-shaped shifter pattern or a selector cylinder that allows any given number of shift levels to be shifted with one actuator.

The clutch, e.g., the start-up clutch 3 or the power-shift clutch 80, can be configured as a conventional push or pull clutch which, when it is not being actuated, is kept engaged by the pre-tensioning force of an energy-storing device. Furthermore, the clutch can be a force-reduced, self-adjusting clutch which adjusts itself automatically, e.g., to compensate for the wear on the friction facings. In another embodiment, the clutch can also be a compressively actuated clutch, meaning that the actuator actuates the clutch at least partially or supplies at least part of the required force to engage the clutch.

It is advantageous to use a torsional oscillation damper in the drive train, e.g., with a spring/damper unit 11 between the start-up/shift clutch and the engine. This damper can be incorporated in the clutch disc or in a dual-mass flywheel.

The sensors 70, 71, which can be rmp sensors, measure the rpm rates of the engine and the transmission. However, the drive-train rpm rate could also be calculated from the wheel rpm rates. It can furthermore be of practical advantage if an rmp sensor is arranged at the input shaft of the transmission.

It is further within the scope of the invention that the automobile transmission according to the invention can be equipped with:

a control unit with a microprocessor and associated signal-processing, electronics, control logic, signal amplifiers, data-bus systems, and related devices;

indicator systems such as warning lights, acoustic warning devices, gear-level indicator, and related devices;

operating elements such as a gear shift knob, switch, and related devices;

programs with a selector element, e.g., to choose between automatic or manual shifting, winter operating mode, sport operating mode, driver recognition, and other functions;

an engine control such as, e.g., a cruise-control feature, to control the fuel input into the combustion engine by electronic, electromechanical, or other means;

sensors for measuring rpm rates at the engine, the wheels, etc., for detecting whether the doors and the hood are shut, and other measuring and detecting functions;

data communication and control signal communication between the transmission control unit and the control unit of the combustion engine.

An embodiment of the transmission as described above can also incorporate an electromechanical energy converter such as a starter motor, generator, starter/generator, decelerator/auxiliary-drive unit. It is advantageous to use an electro-mechanical energy converter that performs the functions of starting the engine, generating the electricity for the electric systems on board the vehicle, and possibly serving as an electrical brake with energy recuperation where surplus electrical energy is used again for motive power. It is also advantageous to use the electromechanical energy converter to help in synchronizing the transmission; and another advantageous use is to stop the rotation of the transmission input shaft when the vehicle is standing still. With some embodiments, this can eliminate the need for synchronizer rings in first and reverse gear. It is also advantageous to engage the electromechanical energy converter specifically to supply torque to the drive train during shift phases for the purpose of smoothing the temporary gaps in the torque-flow that occur during gear shifts.

The electro-mechanical energy converter can interact with the engine through the flywheel. In the case of a dual-mass flywheel, the electromechanical energy converter can act on either the primary or secondary flywheel. In another embodiment, it is advantageous if the electromechanical energy converter interacts or connects with the transmission input shaft in either a coaxial or radially offset arrangement. The electro-mechanical energy converter can drive the combustion engine or the input shaft directly or through an interposed transfer mechanism. The transfer mechanism can have a constant or variable transmission ratio. It can be of a type that is shiftable between a plurality of fixed ratios, or it can have a continuously variable transmission ratio. The transmission ratio may be controlled, e.g., by a centrifugal regulating device or by means of an actuator.

The rotary motion of the electromechanical energy converter can be transmitted to the engine shaft or the input shaft of the transmission through the following transfer means:

toothed profiles (spur gears, bevel gears, etc.);

chain/belt transmissions (chains, V-belts, cog belts, etc.);

hydraulic transmissions (pump/motor, etc.);

friction-based transmissions, such as friction-wheel drives, toroidal friction drives, and planetary-ball friction drives.

Among other observations, there are two ways to start the engine with the electromechanical energy converter. The latter either accelerates the engine directly, or the electromechanical energy converter alone is first accelerated to gain momentum before it turns over the engine, e.g., after a clutch has been engaged. The latter kind of starting suggests itself with the start-up clutch, after the electromechanical energy converter has first accelerated the transmission input shaft.

Figure 8:
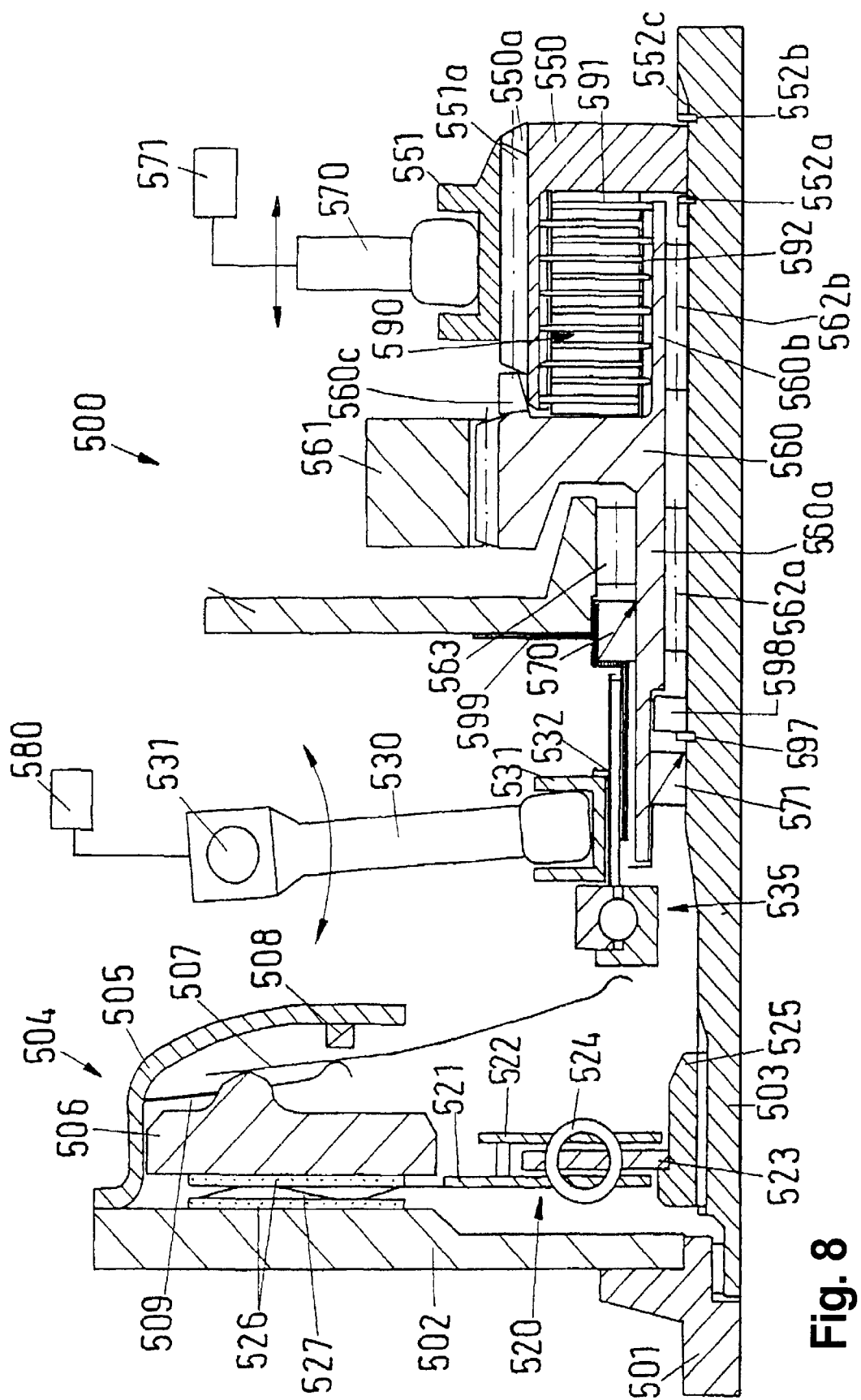
FIG. 8 represents part of a schematic view of a transmission.

FIG. 8 illustrates a portion of a transmission 500 configured in accordance with the invention. The start-up clutch 504 is mounted on a flywheel 502 that has a rotationally fixed connection to an engine output shaft 501. The clutch consists of a clutch cover 505, a pressure plate 506, a diaphragm spring 507, a ring-shaped resting support 508 such as a fulcrum ring attached to the cover, and a diaphragm spring 509 that pushes the diaphragm spring 507 axially against the resting support or fulcrum ring. In this arrangement, the diaphragm spring 507 at a radially outer location presses against a ring-shaped protuberance of the pressure plate and at a radially inner location against the ring-shaped resting support 508. The resting support 508 can consist of a plurality of parts with an arrangement where the at least two parts can be rotated in relation to each other, thereby effecting an adjustment of the supporting contact area in the axial direction.

Also shown in FIG. 8 is a clutch disc 520 consisting essentially of a driven plate 521 and a damper cover plate 522, both of which are configured as circular discs, connected to each other at their outer radius through a connection that holds them at an axial distance from each other. A flange 523 projects radially between the driven plate and the damper cover plate, with energy-storing elements 524 being arranged to absorb forces between the driven and damper cover plates on the one hand and the flange on the other. The driven and damper cover plates on the one hand and the flange on the other are rotatable in relation to each other, against the restoring force of the energy-storing elements 524. At its inner radius, the flange 523 has a rotationally fixed connection to a hub 525 through a spline profile. The driven plate 521 has a ring-shaped portion at its outer radius that consists of two friction linings 526 with an interposed friction-lining cushion 527 consisting of spring segments. The friction linings enter into frictional contact with the corresponding friction areas of the flywheel 502 and the pressure plate 506 of the clutch 504.

A clutch-actuating lever 530, swiveling on a fulcrum 531, serves to actuate the clutch. At the radially inner end, the lever 530 is engaged in a receiving element 531 of U-shaped cross-section which, in turn, is mounted on an axially movable tubular carrier 532. The receiving element 531 can be ring-shaped. At its axial end portion, the tubular carrier 532 carries the outer bearing ring of the clutch release bearing 535. The outer bearing ring surrounds the radial outside of the inner bearing ring. On one axially facing side, the inner bearing ring has a contact area that acts on the tongues of the diaphragm spring to engage and disengage the clutch 504. If the lever 530 in FIG. 8 is rotated clockwise, the clutch will become disengaged. The tubular carrier 532 is guided by a guide 599. In addition, the arrangement includes an axial support 598 and a snap ring 597 for an axial support 598.

The hub 525 is rotationally constrained on the transmission input shaft 503 by means of a spline profile.

The transmission 500 has a transmission housing 500a which, among other functions, separates the housing bell of the clutch from the interior space of the transmission. The transmission input shaft 503 passes through an opening in the wall of the transmission.

The free gear 560 is supported and centered on the transmission input shaft 503 by means of bearings 562a and 562b. At the same time, a bearing 563 is interposed between the free gear 560 and the transmission housing. The free gear 560 has a sleeve-shaped axial extension 560a which on its outside receives the bearing 563 and on its inside receives the bearing 562a.

Extending in the other direction, the free gear 560 has a sleeve-shaped axial extension 560b which on its inside receives the bearing 562b. The seal 570 is arranged between the housing 500a and the sleeve-shaped axial extension 560a to seal off the bearing 563. The seal 571 is arranged between the transmission input shaft 503 and the sleeve-shaped axial extension 560a to seal off the bearing 563. The seal 570 can also be interposed between the housing and the guide.

The external tooth profile of the free gear 560 meshes with the fixed gear 561. A flange 550 is rotationally and axially fixed on the transmission input shaft 503. The flange has an internal tooth profile engaging an external tooth profile 552c of the shaft 503 for a rotationally fixed connection, while the axial fixation is made by means of two snap rings or retaining rings 552a, 552b received in ring grooves of the shaft 503. The flange 550 has an external tooth profile 550a at the outer radius, which is engaged by the internal tooth profile 551a of the sliding sleeve 551 for an axially non-constrained but rotationally fixed connection.

The free gear 560 has an axially oriented tooth profile 560c formed in the area of its outer radius on the side facing away from the inside wall of the transmission housing. The tooth profile 560c comes into form-locking engagement with the sliding sleeve 551, when the latter is moved axially towards the free gear 560. This form-locking engagement between the sliding sleeve and the free gear establishes a form-locking connection between the shaft 503 and the fixed gear 561 by way of the free gear 560. The axial displacement of the sliding sleeve 551 occurs by means of the lever 570, configured, e.g., as a selector fork, which engages an essentially U-shaped receiving element on the outside of the sliding sleeve. To perform the axial displacement, the sliding sleeve is pushed by means of the lever 570 through the force of an actuator 571 controlled by a control unit.

The motion of the lever 530 is effected through an actuator 580.

There is furthermore a power-shift clutch provided to bring the flange 550 and the free gear 560 into frictional engagement. The power-shift clutch 590 is designed as a friction clutch or laminar-disc clutch with an arrangement of laminar discs, of which at least some individual laminar discs 592 are rotationally constrained at the outer radius by an axially projecting portion of the flange 550, and other individual laminar discs 591 are rotationally constrained at the inner radius by the sleeve-shaped axial extension 560b of the free gear 560, with the outside-constrained laminar discs 592 and the inside-constrained laminar discs 591 arranged in alternating sequence. The laminar discs are comprised of friction-lining carriers faced with friction linings, usually on both sides. The outside-constrained laminar discs have recesses or projections or projecting elements at their outer radius, and the inside-constrained laminar discs have recesses or projections or projecting elements at their inner radius, for a form-locking engagement with recesses or projecting elements of, respectively, the axially projecting portion of the flange 550 or the sleeve-shaped axial extension 560b of the free gear 560. If the lever 530 is moved counterclockwise, the side surface of the inner release-bearing ring that faces away from the clutch pushes against the end of the sleeve-shaped axial extension 560a and moves the latter in the axial direction, whereby the laminar discs are brought into contact with each other to provide a frictional connection between the free gear and the shaft.

Figure 8A:
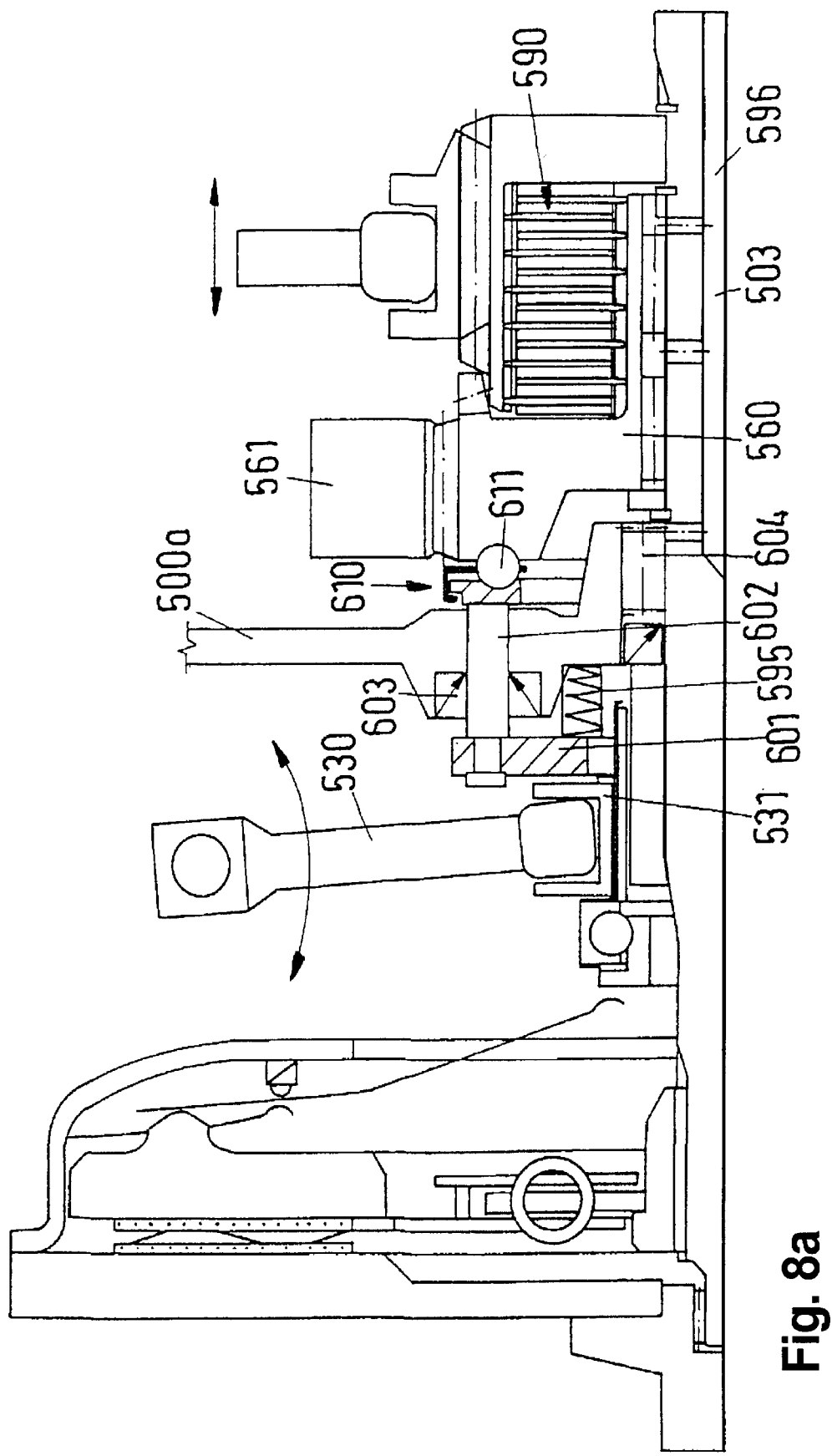
FIG. 8a represents part of a schematic view of a transmission.

FIG. 8a illustrates an embodiment of the transmission according to the invention where the lever causes the axial displacement of laminar-disc clutch by means of bolts 602 passing through openings in the wall 500a, rather than by means of a sleeve-shaped axial extension 560a of the free gear 560. The U-shaped receiving element for the lever 530 is connected to a disc-shaped element 601 which, in turn, has a form-locking connection with at least one bolt 602. In the illustrated embodiment, the bolts are riveted to the disc. In another embodiment, the bolts are welded or screwed into the disc. The shaft 503 has bore holes 596. Furthermore, the arrangement includes an energy-storing device 595 such as a spring.

An axial thrust bearing 610 is arranged at the end of the bolts 602 inside the transmission housing 500a. The thrust bearing pushes against the free gear 560 by means of roller bodies 611 so that, when the laminar-disc clutch 590 is actuated, the axial force is transmitted from the lever 530 to the laminar disc set by way of the disc-shaped element 601, the bolts 602, the axial thrust bearing 611, and the free gear 560.

Figure 9:
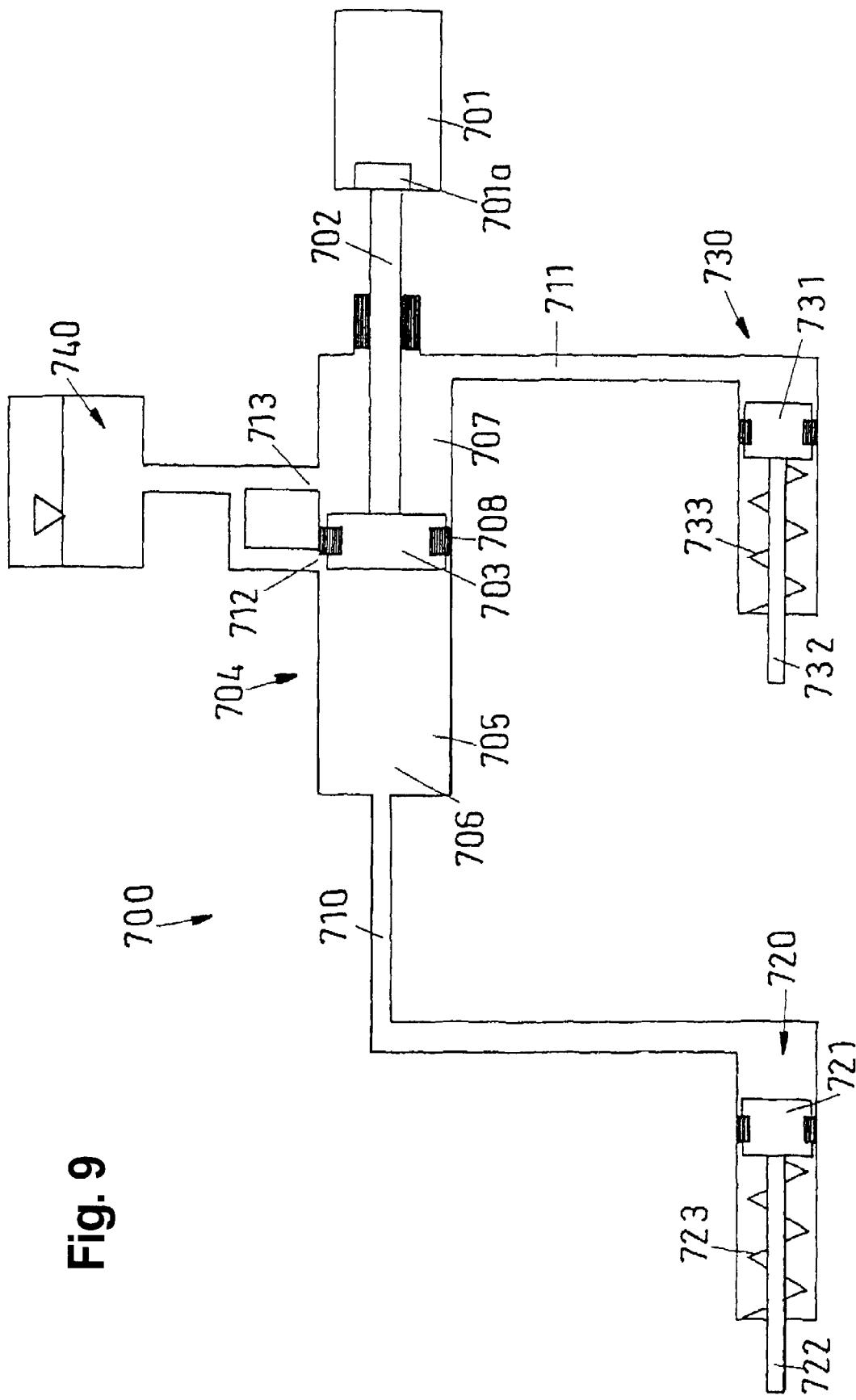
FIG. 9 represents part of a schematic view of a transmission.

FIG. 9 gives a schematic representation of an embodiment 700 where the start-up clutch and the power-shift clutch are hydraulically actuated. An actuator 701 driven, e.g., by an electric motor followed by a gear box 701a with a push rod 702 moves a piston 703 of a master cylinder 704. The piston 703 has a range of axial movement within an interior space 705 of the master cylinder 704. The piston 703 divides the interior space 705 into a spatial domain 706 located axially in front of the piston and a spatial domain 707 located axially behind the piston. The spatial domain 706 of the master cylinder is connected to a slave cylinder 720 by way of a fluid connection 710 such as a hydraulic conduit. The spatial domain 707 of the master cylinder is connected to a slave cylinder 730 by way of a fluid connection 711 such as a hydraulic conduit.

When the piston 703 is moved past the sniffle bore hole 712 in the axial direction towards the hydraulic conduit 710, the seal 708 will close off the spatial domain 706 and, as the piston 703 continues to move in the same direction, the slave cylinder piston 721 is pushed axially, acting through a piston rod 722 on a lever that disengages the start-up clutch. When the piston 721 subsequently moves in the opposite direction, the clutch will return to the engaged condition. The slave cylinder has an energy-storing device 723 interposed between the piston and one axial end wall of the cylinder, so that the return force of the energy-storing device helps to retract the piston 721 from the disengaged position of the clutch. As the piston 703 is moved back past the sniffle bore 712, the spatial domain 706 returns to the pressure-free condition due to the open passage to the compensation reservoir 740.

When the piston 703 is moved past the sniffle bore hole 713 in the axial direction towards the hydraulic conduit 711, the seal 708 will close off the spatial domain 707 and, as the piston 703 continues to move in the same direction, the slave cylinder piston 731 is pushed axially, acting through a piston rod 732 on a lever that disengages the power-shift clutch. When the piston 731 subsequently moves in the opposite direction, the clutch will return to the engaged condition. The slave cylinder has an energy-storing device 733 interposed between the piston and one axial end wall of the cylinder, so that the return force of the energy-storing device helps to retract the piston 731 from the disengaged position of the clutch. As the piston 703 is moved back past the sniffle bore 713 (in the direction towards the hydraulic conduit 710), the spatial domain 707 returns to the pressure-free condition due to the open passage to the compensation reservoir 740.

Figure 9A:
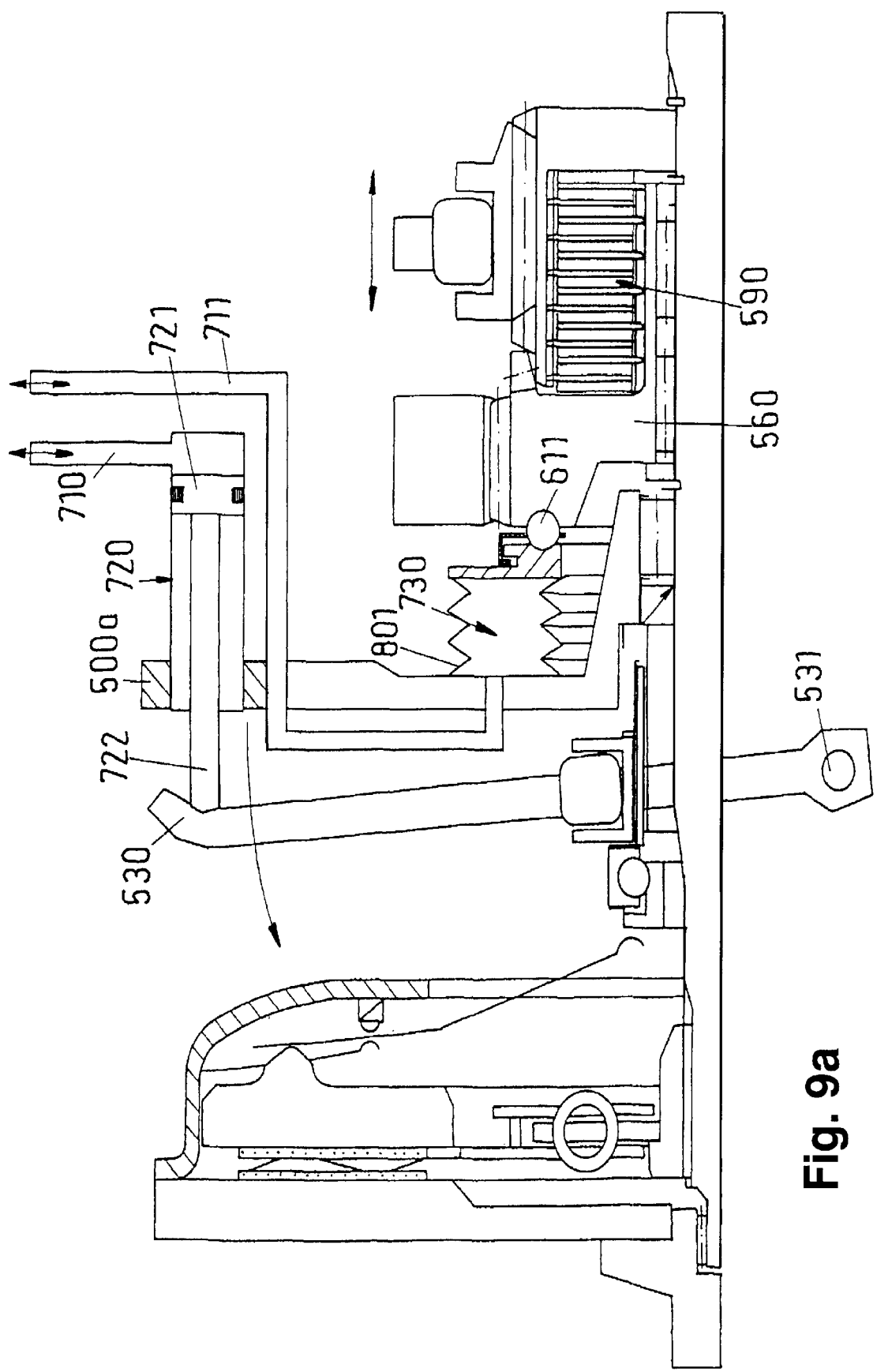
FIG. 9a represents part of a schematic view of a transmission.

FIG. 9a illustrates an embodiment where the slave cylinders 720 and 730 are arranged inside the transmission. The slave cylinder 720 is mounted in an opening of the transmission housing wall 500a. The piston rod 722 passes through an opening in the housing and acts against the clutch-release lever 530 that is rotatably supported by the fulcrum 531. The slave cylinder 720 receives hydraulic fluid through a fluid connection 710, such as a hydraulic conduit, from the master cylinder.

The slave cylinder 730 in the embodiment of FIG. 9a is a bellows arranged inside the transmission at the housing wall 500a. The hydraulic conduit 711 passes from the outside through an opening in the wall 500a and delivers hydraulic fluid to the compartment inside the bellows 801. The space enclosed by the bellows and containing the hydraulic fluid is ring-shaped. Interposed coaxially between the bellows and the free gear 560 is an axial thrust bearing 611 to transmit the force of the bellows to the laminar clutch 590 by way of the free gear 560.

The slave cylinder 720 is held in a seat in the housing wall 500a with the piston rod 722 projecting from the transmission housing through an opening in the latter. The piston rod 722 acts on the clutch-release lever 530 that is rotatably supported by the fulcrum 531. The slave cylinder 720 receives hydraulic fluid through a fluid connection 710, such as a hydraulic conduit, from the master cylinder.

A further concept of the invention relates to transmissions such as speed-shifting gear transmissions with an input shaft and an output shaft, and in some cases a countershaft, with a plurality of gear pairs, each of which has a fixed gear and a free gear. The fixed gear is connected through a rotational constraint to a first shaft, and the free gear, by means of a sliding sleeve, can be brought into form-locking engagement with the second shaft, whereby a shift from one gear ratio to another is effected. Sets of two gear pairs with a sliding sleeve between them are arranged as functional groups. The gear pairs are designed so that by engaging different gear pairs out of a plurality of shiftable gear pairs, the transmission will have different ratios of rotation between input shaft and output shaft.

A further development of the preceding concept of the invention incorporates all of the features just described, but is further distinguished by the fact that in at least some of the aforementioned functional groups, the two gear pairs of a set have gear ratios that are not adjacent ratios in an ascending sequential order of the available ratios of the transmission that they belong to.

Transmissions of this kind are generally known in the field of automotive technology. They have discrete gear ratios between input and output that are shiftable in a sorted pattern following an ascending sequence of gears from first to fifth or sixth, and a reverse gear. The first gear usually serves to put the vehicle in motion from a standstill and for parking maneuvers, while the higher gears are used for traveling. These transmissions are structured into functional groups, where each group has two gear pairs with a sliding sleeve between them. The gear pairs of a group have gear ratios that are different from each other but are adjacent in the sequential order of ratios of the transmission that they belong to. For example, the gear pairs of first and second gear with a sliding sleeve between them are arranged as a functional group within the transmission. The shifting from first to second gear is performed by moving the sliding sleeve from the side of the first-gear pair to the side of the second-gear pair. To shift into a gear other than first and second, the sliding sleeve between the pairs of first and second gear is set to its midway position and another sliding sleeve, e.g., the sleeve between third and fourth gear, is actuated. In manual transmissions, the shifting process is normally performed through the shifting and selecting movement of a shift lever where, e.g. in a shift between first and second gear, the sliding sleeve is moved from one position to the other by the lengthwise movement of the shift lever in the shift path between first and second gear.

Particularly in transmissions that can be actuated in an automatic mode where the displacement of the sliding sleeves is controlled by means of an actuator with a drive source, but also in manually shiftable transmissions, automated actuation is relatively slow for transmissions with sequential gear patterns as described above, because the disengaging of the first gear and engaging of the second gear, for example, have to be performed sequentially. With automated transmissions, the gear levels can be selected by the driver and communicated to the control unit by means of an operator-control element that is actuated by the driver, or alternatively, the gear levels can be selected automatically by means of a program or process that is implemented in the control unit, wherein the selection is based on engine torque, rpm rate of the transmission, or rpm-rate characteristics of the engine, with gear shifts being initiated and carried out when the engine torque, the transmission-rpm rate and/or the engine-rpm rate reaches a programmed threshold level.

The task set for the present invention was to provide a transmission that belongs to the kind introduced at the beginning, but would be distinguished by the capability of changing gears significantly faster. The advantage is that in transmissions with a lapse in traction during shifts, the time intervals when the tractive force is interrupted are made as short as possible and the driver does not perceive the interruption in the tractive force as uncomfortable.

The invention solves this problem through an arrangement in which at least some of the aforementioned functional groups have gear pairs with ratios that are not adjacent in the sequential order of all of the gears of the transmission that they belong to. The term "sequential order" means the sequence of the forward gears 1, 2, 3, 4, 5, (6).

It is furthermore of practical advantage, if at least individual functional groups have gear pairs shiftable by a sliding sleeve with gear ratios that are not following each other directly in an ascending order of all of the gear levels of the transmission.

It is likewise practical if the gear pair for first gear is arranged in the same functional group together with one of the gear pairs of third to sixth gear or reverse gear.

It is also practical if the gear pair for second gear is arranged in the same functional group together with one of the gear pairs of fourth to sixth gear or reverse gear.

Also practical is an arrangement where the gear pair of third gear is combined in the same functional group with one of the gear levels one, five, six, or reverse.

It is likewise practical if the gear pair for fourth gear is arranged in the same functional group together with one of the gear pairs of the gear levels one, two, six, or reverse.

It is also practical if the gear pair for fifth gear is arranged in the same functional group together with one of the gear pairs of first to third gear or reverse gear.

It is further of practical benefit if the sliding sleeves of the individual functional groups are actuated by at least one actuating means.

It is advantageous if the at least one actuating means is connected to a manual manipulating element and gears can be shifted manually by means of the manipulating element.

It is practical if the at least one actuating means is connected to an actuating unit with a drive source and gears can be shifted in an automatic mode by the actuating unit.

Figure 10:
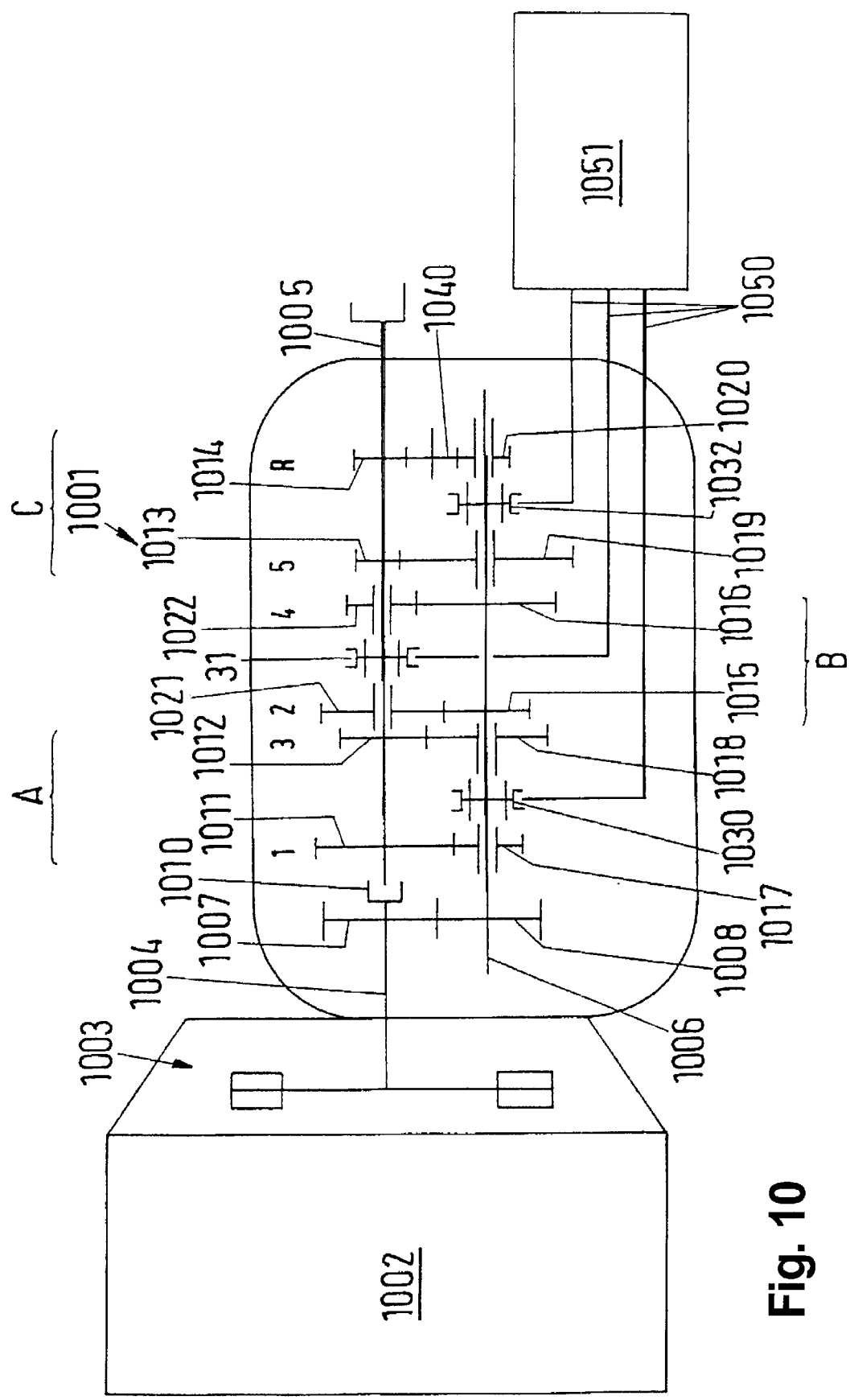
FIG. 10 represents a transmission.

FIG. 10 represents a schematic illustration of a transmission 1001 which follows a prime mover unit 1002, such as a motor or internal combustion engine 1002, and a clutch 1003, such as a friction clutch, in the drive train of a vehicle. The transmission has an input shaft 1004 and an output shaft 1005. The input shaft 1004 is rotatably supported by the bearing 1010 inside the transmission housing, radially centered and, if appropriate, restrained axially.

The input shaft 1004 and the output shaft 1005 are essentially in coaxial alignment, i.e., the axis of rotation of the output shaft is essentially an extension of the axis of the input shaft. The output shaft, likewise is supported and centered by a bearing inside the transmission housing.

The transmission 1001 further has a countershaft 1006. The countershaft 1006 is driven by the input shaft 1004 through the gear pair 1007, 1008. The gear 1007 is rotationally constrained on the input shaft, and the gear 1008 is rotationally constrained on the countershaft 1006.

The gears 1011, 1012 and 1013, 1014 are rotationally constrained on the output shaft 1005, while the gears 1015, 1016 are rotationally constrained on the countershaft 1006. The gears 1017, 1018 and 1019, 1020 are rotatably supported on the countershaft 1006, as are the gears 1021, 1022 on the output shaft 1005.

The gears 1017, 1018 can be brought into form-locking engagement with the countershaft 1006 by an axial displacement of the sliding sleeve 1030. Likewise, the gears 1019, 1020 can be brought into form-locking engagement with the countershaft 1006 by an axial displacement of the sliding sleeve 1032. Analogously, the gears 1021, 1022 can be brought into form-locking engagement with the output shaft 1005 by an axial displacement of the sliding sleeve 1031. At any given time, only one of the two gears in a group can be engaged because the form-locking engagement occurs by the sliding sleeve being either in one axial position or the other between the gears. As a rule, a transmission functions in such a manner that there is never more than one form-locking engagement between a sliding sleeve and a gear, because the engagement of a given gear determines a fixed transmission ratio between the output shaft and the countershaft.

As illustrated in FIG. 10, the transmission 1001 has three functional groups, each of which is constituted by two gear pairs with a sliding sleeve arranged between them. Group A contains the gear pairs 1011, 1017 and 1012, 1018, and the sliding sleeve 1030. Group B contains the gear pairs 1015, 1021 and 1016, 1022, and the sliding sleeve 1031. Group C contains the gear pairs 1013, 1019 and 1014, 1020, and the sliding sleeve 1032.

In the foregoing arrangement, the gear pair 1011, 1017 represents first gear, the gear pair 1021, 1015 represents second gear, the gear pair 1012, 1018 represents third gear, the gear pair 1022, 1016 represents fourth gear, the gear pair 1013, 1019 represents fifth gear, and the gear pair 1014, 1020 with the reverse idler gear 1040 represents reverse gear.

As is evident from FIG. 10, the gear pairs of first and third gear constitute the first functional group in the sense of the invention, and the gear pairs of second and fourth gear constitute the second functional group in the sense of the invention. Thus, gear pairs of non-adjacent gear levels, in relation to the ascending sequential order of gears, are assigned to groups in which the gear pairs of a given group share the same sliding sleeve.

The sliding sleeves 1030, 1031, 1032 for shifting the gears of the transmission 1001 are actuated by the actuating unit 1051, e.g., shifted between axial positions. Between the actuating unit 1051 and each of the sliding sleeves, there is a connection 1050 such as a rod linkage or a pull-rope or a bowden cable or a selector shaft. The actuating unit can have an electric motor and/or a pressure-based drive source such as, e.g., a hydraulic unit.

The arrangement of the gears with the grouping of 1, 3 and 2, 4 and 5, R represents one possible embodiment of the invention as applied to a five-speed transmission (five forward speeds and a reverse gear) Other possible groupings are shown in the following table. Each of the examples of the table has two groups of forward gears that are not adjacent in the sequential order.

| | | |
|---|---|---|
| 1, 3 | 2, 4 | 5, R |
| 1, 3 | 2, 5 | 4, R |
| 1, 4 | 2, 5 | 3, R |
| 1, 4 | 2, R | 3, 5 |
| 1, 5 | 2, 4 | 3, R |
| 1, R | 2, 4 | 3, 5 |

Other possible groupings according to the invention are listed in the following table. Each of the tabulated examples has one group of forward gears that are not adjacent in the sequential order.

| | | |
|---|---|---|
| 1, 3 | 2, R | 4, 5 |
| 1, 4 | 2, 3 | 5, R |
| 1, 5 | 2, 3 | 4, R |
| 1, 5 | 2, R | 3, 4 |
| 1, R | 2, 5 | 3, 4 |
| 1, 2 | 3, 5 | 4, R |

In analogy to the groupings tabulated, transmissions according to the invention can also have, e.g., four forward gears and a reverse gear, or six forward gears and a reverse gear, without limits on the general applicability of the inventive concepts.

With the design of transmissions according to the invention, there can be a partial time overlap between the individual gear-engaging and gear-disengaging phases. This means that there can be actuations occurring at least partially in parallel at some points in time.

Figure 11A:
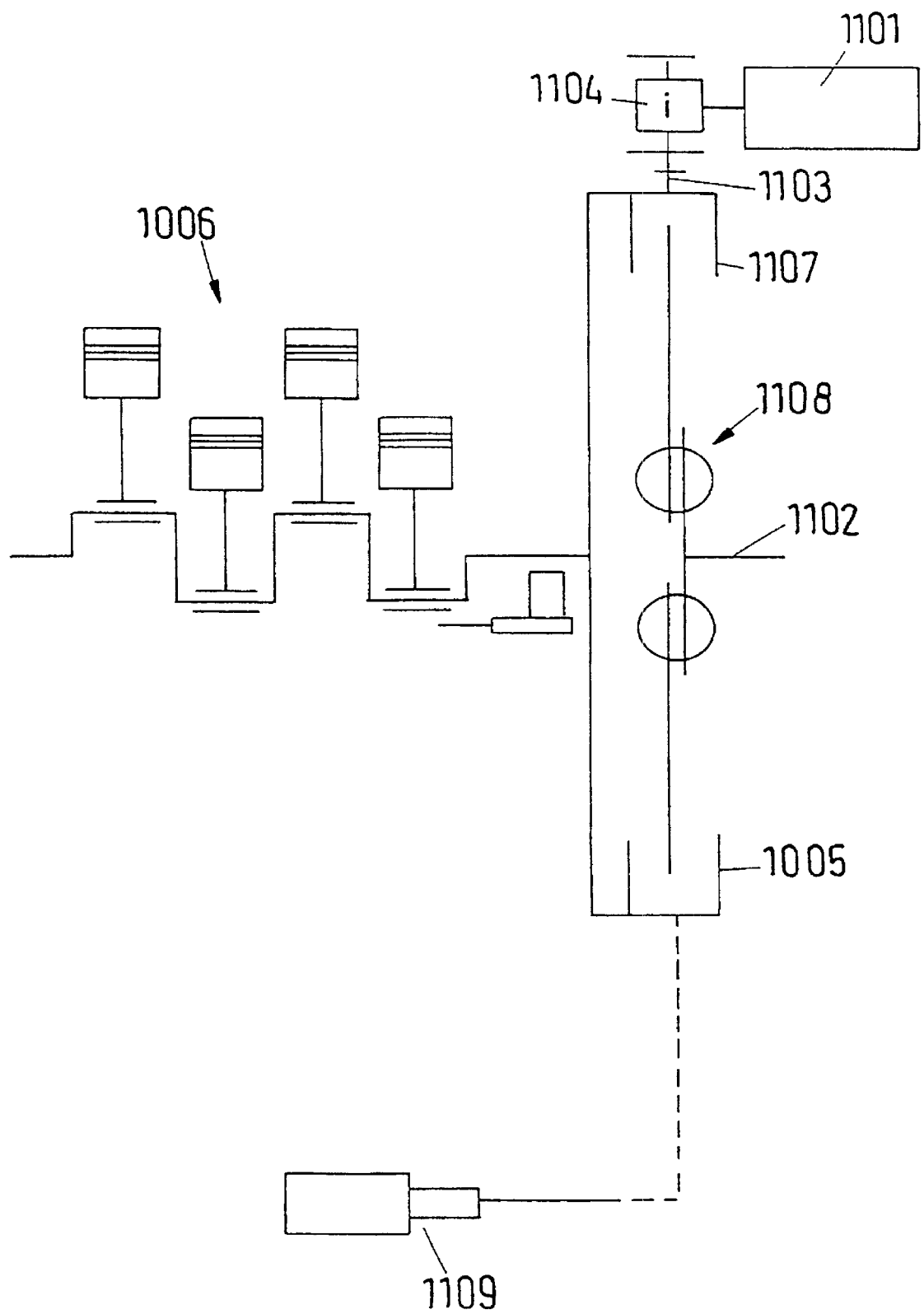
FIG. 11a represents part of a transmission.

FIG. 11*a* represents an embodiment of the invention where the electro-mechanical energy converter 1101 is arranged parallel to the transmission input shaft 1102, driving the flywheel 1105 of the internal combustion engine 1106 through an intermediate gear 1103, through a gearbox 1104, or directly, or through some other form of drive-transmitting connection. The gearbox can be arranged between the shaft of the electro-mechanical energy converter and the pinion gear of the latter. In addition, FIG. 11*a* includes a clutch 1107 with a damper 1108 as well as a clutch actuator 1109.

Figure 11B:
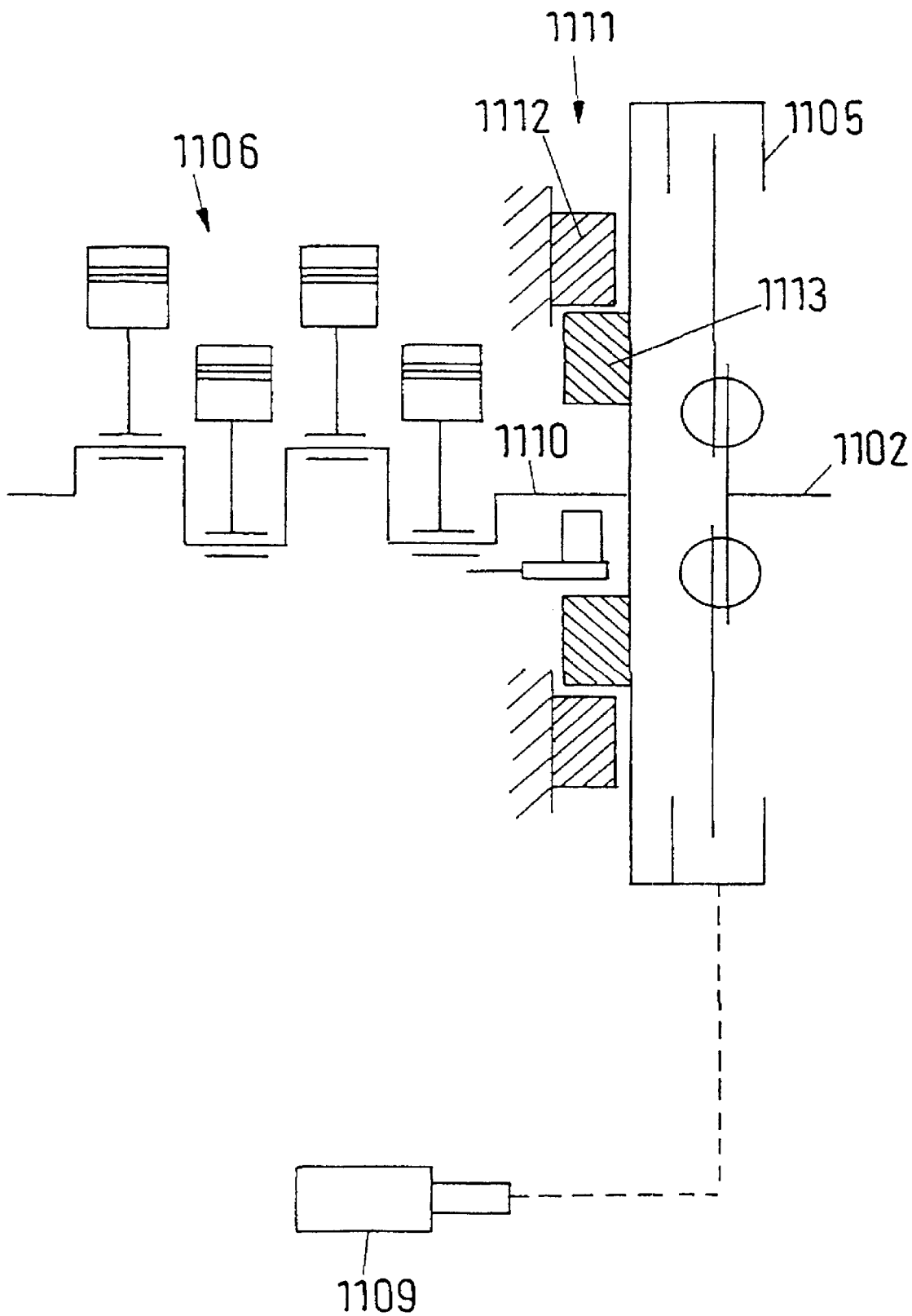
FIG. 11b represents part of a transmission.

FIG. 11*b* illustrates an embodiment of the invention where the electro-mechanical energy converter 1111, arranged coaxially with the engine output shaft 1110 and/or the transmission input shaft 1102, drives the flywheel 1105 of the internal combustion engine 1106, or has a drive-transmitting connection to the flywheel 1105. There is further a clutch 1107 with a damper 1108 as well as a clutch actuator 1109. The electro-mechanical energy converter 1111 consists of a stator 1112 mounted in a fixed condition in relation to the engine wall and a rotor 1113 mounted on a wall portion of the flywheel facing the engine. In a further inventive embodiment, the rotor can also be arranged and attached at the outer radius of the flywheel.

Figure 11C:
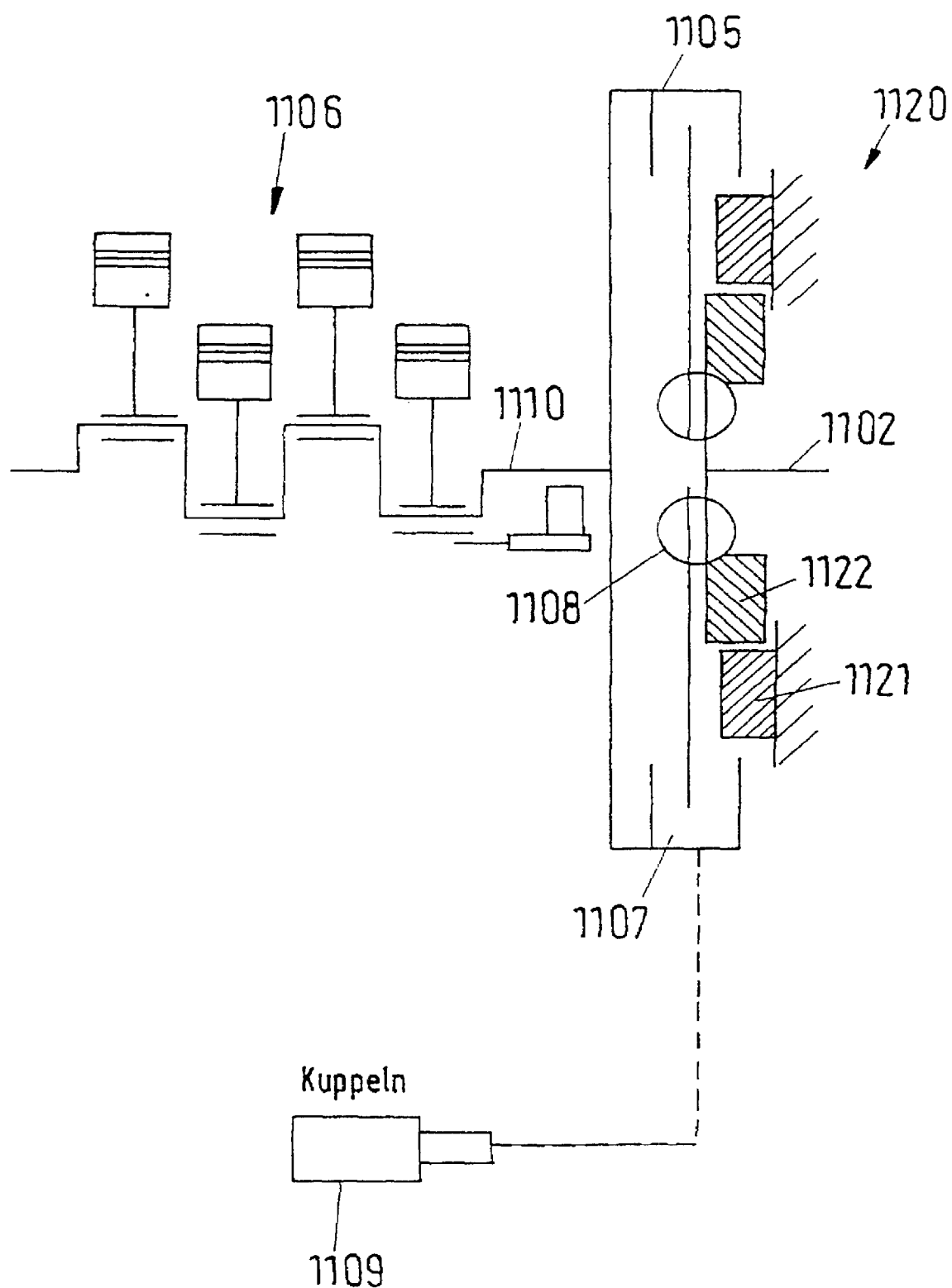
FIG. 11c represents part of a transmission.

FIG. 11*c* represents an embodiment of the invention where the electro-mechanical energy converter 1120, arranged coaxially with the engine output shaft 1110 and/or the transmission input shaft 1102, can drive the flywheel 1105 of the internal combustion engine 1106 or the transmission input shaft 1110, either directly or through a drive-transmitting connection. The drawing further illustrates a clutch 1107 with a damper 1108 as well as a clutch actuator 1109. The electro-mechanical energy converter 1120 consists of a stator 1121 mounted in a fixed condition in relation to the engine wall and a rotor 1122 with a rotationally fixed connection to the transmission input shaft. The latter connection can be effected, e.g., by means of the damper output parts. In a further embodiment according to the invention, the rotor can also be arranged at the outer radius of the flywheel.

Figure 12:
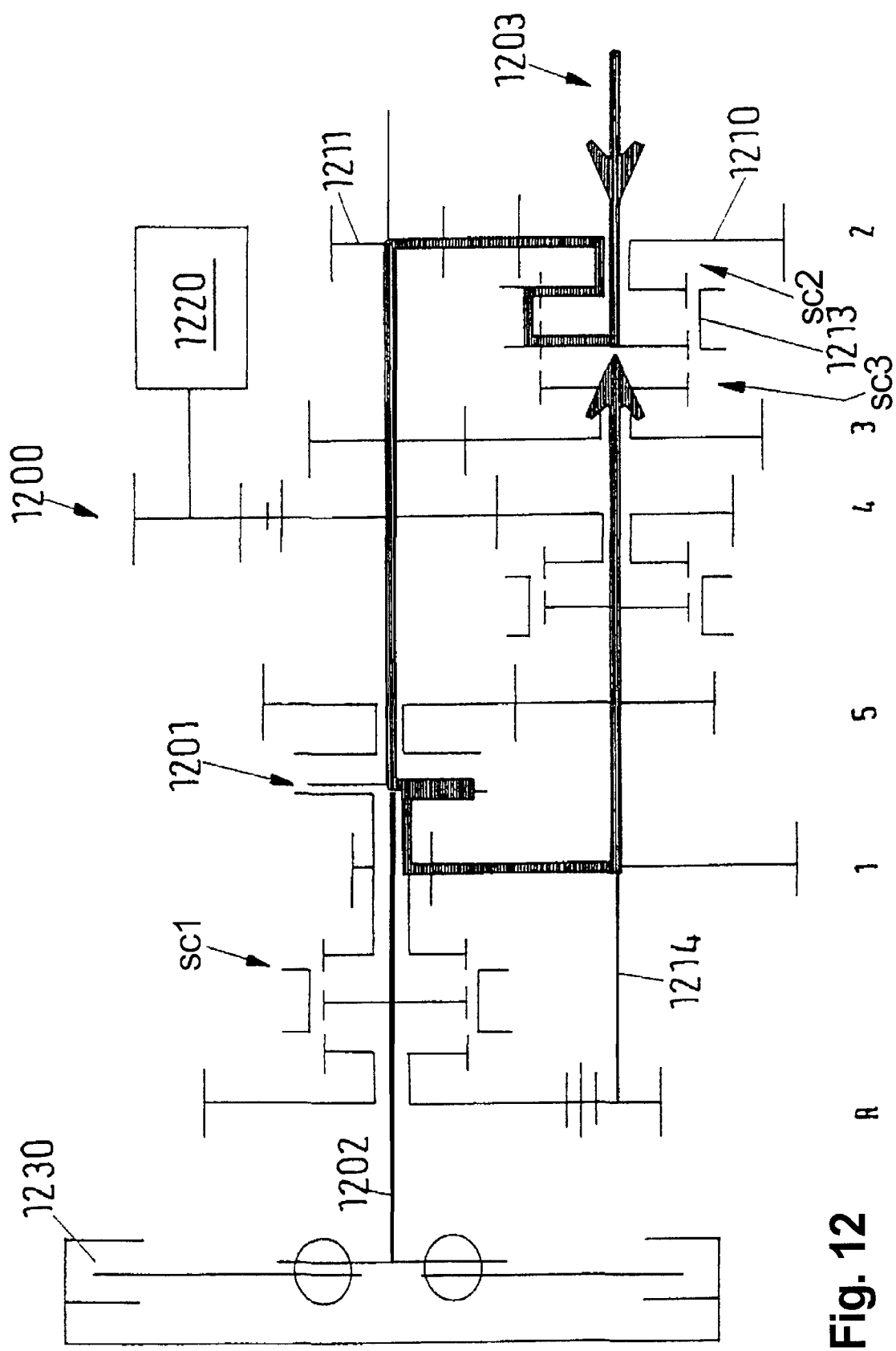
FIG. 12 represents a transmission.

FIG. 12 illustrates a transmission 1200 with a power-shift clutch 1201 for actuating or engaging first or fifth gear, preferably the highest of the gears. Thus, the power-shift clutch 1201 connects the vehicle engine through the transmission input shaft 1202 to the output shaft 1203. The power-shift clutch is preferably a friction clutch.

It is advantageous if a motion-blocking device that prevents a vehicle from unintentionally rolling away when parked on an incline can be realized in a cost-effective manner.

The transmission of FIG. 12 provides a safe way of immobilizing the parked vehicle by engaging a gear of the transmission where the respective gear group is not connected to the power-shift clutch. For example in FIG. 12, the second gear is engaged by shifting to the gear pair of free gear 1210 and fixed gear 1211. The free gear 1210 is rotationally locked to the shaft 1214 by means of the clutch 1213, e.g., a form-locking clutch. If subsequently the friction-based power-shift clutch 1201 is engaged, the first gear or another gear with a power-shift clutch is likewise engaged, so that the transmission is blocked and the output side of the drive train is thereby immobilized.

The preceding drawings illustrate the configuration of a power-shift transmission according to the invention, i.e., a transmission that can be shifted under load.

The advantages described above can be realized by incorporating an electro-mechanical energy converter in a power-shift transmission with a power-shift clutch at the transmission output side. It is particularly advantageous to use the electro-mechanical energy converter as a supplementary source of motive power during the gear-shifting phases and as a generator for recuperating electrical energy from kinetic energy. By employing an electro-mechanical energy converter in this manner, the loss in tractive force associated with a gear shift can be completely compensated even when shifting gears under a full torque load. Furthermore, the electro mechanical energy converter can be used in parallel with the power-shift clutch to control the magnitude of the output torque, particularly when shifting gears under a partial torque load. By using this concept, it is possible to realize a gear-shifting behavior with torque characteristics that are similar to the torque vs. rpm curves of continuously variable transmissions. In addition, the electro-mechanical energy converter can take on a supporting function in the critical phases of a gear-shifting process by applying a controlled amount of torque to the transmission output to ensure that the shift clutch that is to be opened is torque-free. The electro-mechanical energy converter can also play an active part in shortening the time needed for the synchronization process of the transmission.

The arrangement of a power-shift transmission with an integrated electro-mechanical energy converter as described here is represented schematically in FIG. 12. The transmission shown is a countershaft transmission with a power-shift clutch 1201 that can connect the first as well as the fifth gear to the transmission output, depending on which way the clutch 1201 is shifted. The electro-mechanical energy converter 1220, depending on its design, acts on the transmission input shaft either directly or through a gear box, e.g., through a gear stage or a belt or other rotary drive arrangement.

It is of advantage if the power that the electro-mechanical energy converter delivers to the transmission input can exceed the power of the combustion engine for short time intervals, with the long-term power-generating capacity being significantly lower. In other embodiments, it is practical if the electro-mechanical energy converter produces a lesser amount of power than the combustion engine.

If the electro-mechanical energy converter 1220 is included as a participating element in the shift process, it becomes possible to perform up-shifts under traction essentially without any let-up in the tractive force. The acceleration of the vehicle during gear-changing phases is maintained by the power-shift clutch 1201, as the latter delivers torque to the output side of the drive train during the time intervals when the transmission is being synchronized. As the power-shift clutch is arranged at the fifth gear of the transmission, the output torque drops to a reduced level during the phases when the previous gear level is being disengaged and the new gear level is brought into engagement. The degree to which the torque is lowered is commensurate with the relative difference in gear ratios between the gear level being disengaged and the gear level associated with the power-shift clutch. In the case of a shift from first into second gear, this corresponds to a reduction of the tractive force to 40% of the previous level. As the electro-mechanical energy converter acts on the transmission input shaft in parallel with the combustion engine, the torque of the electro-mechanical energy converter is made available to entirely compensate the aforementioned reduction in tractive force.

Figure 13A:
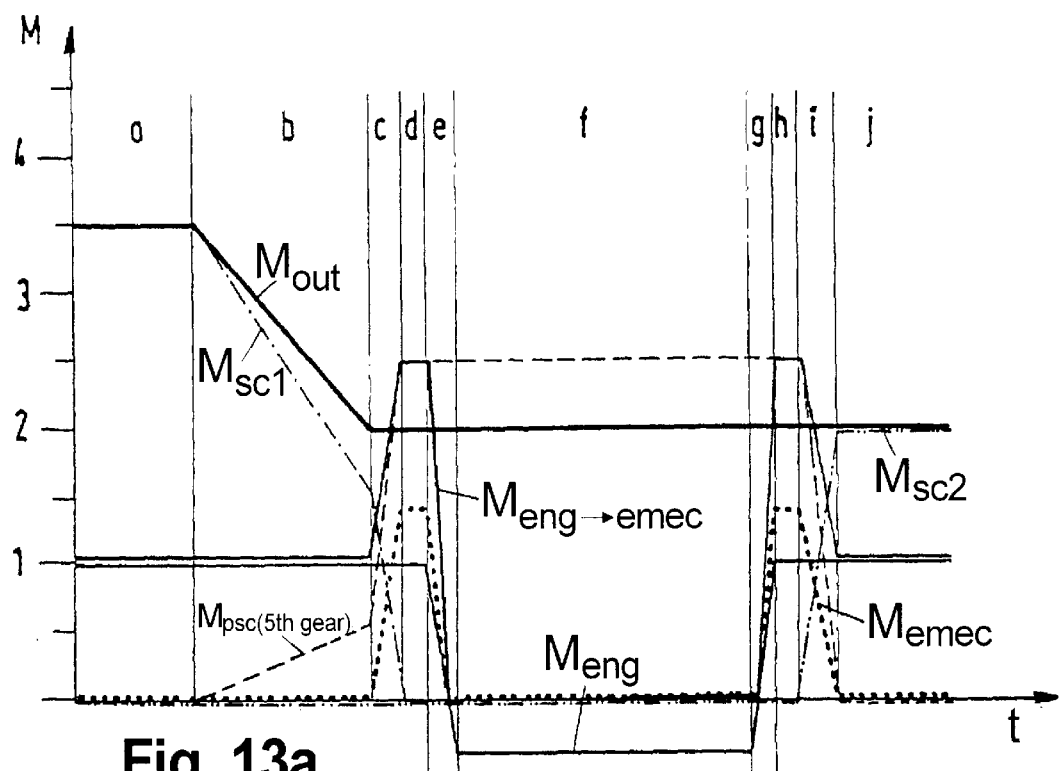
FIGS. 13a through 17b represent diagrams showing time profiles of torque levels and rpm rates.
Figure 13B:
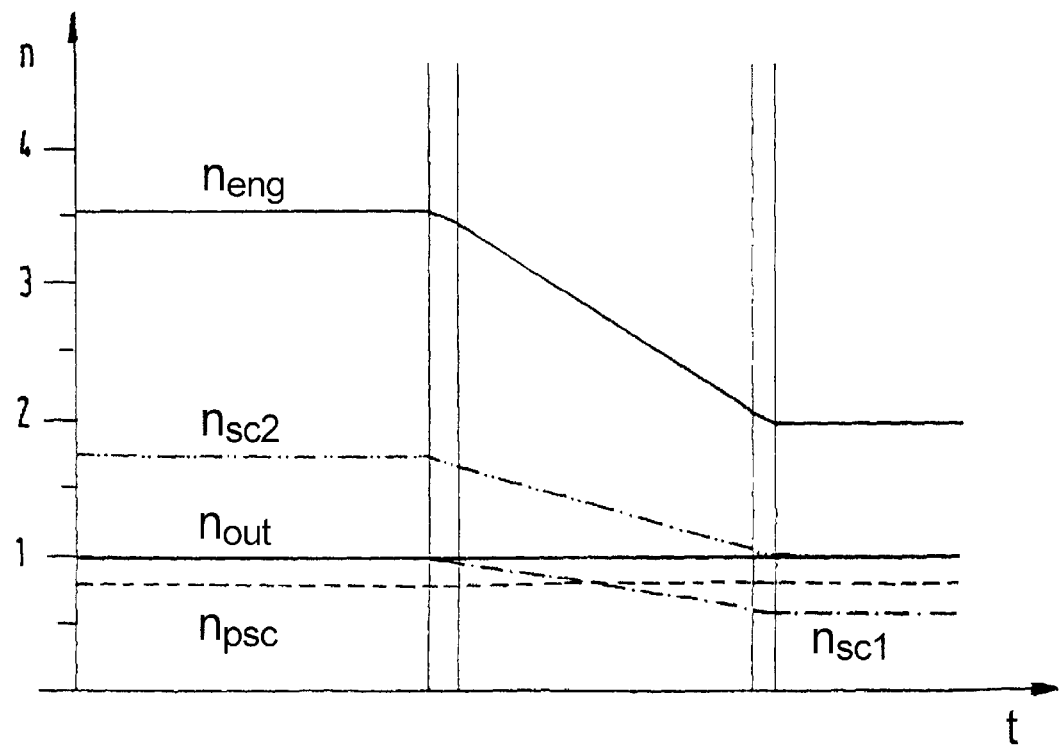

Following is a discussion of the phases in the process of shifting from first into second gear under full traction with the assistance of the electro-mechanical energy converter. The associated torque- and rpm diagrams are shown in FIGS. 13a and 13b. The start-up clutch 1230 remains engaged during the entire gear-shifting process.

The FIGS. 13a and 13b represent the torque M and the rpm rate n as functions of time. The time interval of the gear-shifting process is subdivided into the different individual time segments a, b, c, d, e, f, g, h, i, j, as follows:

Time Segment a:

This represents the conditions prior to the start of the gear-shifting process. The shift clutch of the first forward gear is engaged and transmits the maximum engine torque to the transmission output shaft. In a simplified model, the output torque is represented by the equation.

$$M_{out} = M_{eng} \times i_{sc1}$$

If the mass moments of inertia are taken into account, the foregoing equation needs to be expanded to $$M_{out} = M_{eng} \times i_{sc1} - \sum_i J_i \times \frac{d\omega_i}{dt}$$

wherein the mass moments of inertia $J_i$ and the angular velocities $\omega_i$ include, but are not limited to, the following:

| | | | | | |
|---|---|---|---|---|---|
| $J_{eng}$ | $\omega_{eng}$ | engine | $J_{in}$ | $\omega_{in}$ | input shaft |
| $J_{clu}$ | $\omega_{clu}$ | clutch | $J_{out}$ | $\omega_{out}$ | output shaft |
| $J_{cd}$ | $\omega_{cd}$ | clutch disk | $J_{fw}$ | $\omega_{fw}$ | flywheel |
| $J_{emec}$ | $\omega_{emec}$ | el.-mech. converter | | | |

The dimensionless factor $i_{sc1}$ represents the torque ratio of shift clutch sc1. Thus, if the mass moments of inertia are taken into consideration, the equation needs to include the summation term as shown above. In the following equations for rates of rotation and/or torques, the summation term, although not shown explicitly, will likewise be applicable in the manner shown above and would have to be included in a full, non-simplified mathematical representation.

Time Segment b:

This represents the beginning phase of the gear-shifting process. The power-shift clutch 1201 at the fifth gear is engaged by a controlled amount so that a torque level is set at the output shaft that corresponds to the torque level that will exist after completion of the gear-shifting process, i.e., $$M_{out}{}^{after} = M_{engine} \times i_{sc2}$$

The torque transmitted through the power-shift clutch is represented by the following equation, where $M_{in}$ is the torque acting on the transmission input shaft:

$$M_{psc} = \frac{M_{in} \times (i_{sc1} - i_{sc2})}{i_{sc1} - i_{psc}}$$

Time Segments c, d:

To allow the shift clutch of the currently active gear to be disengaged, the full amount of the torque $M_{in}$ at the transmission input shaft has to be transmitted to the output shaft. This condition is met by engaging the power-shift clutch at least partially, so that the transmitting of the torque is taken over by the power-shift clutch (psc) from the shift clutch (sc1) of the currently active gear. Because $i_{psc} < i_{sc2}$, the output torque is reduced to the amount $M_{in} = M_{engine} \times i_{psc}$. By using the electro-mechanical energy converter during this phase of the gear change, the loss in traction can be compensated. The torque $M_{emec}$ delivered by the electro-mechanical energy converter is increased for a short time interval so that the torque at the transmission input shaft 1202 is represented by the sum $M_{in} = M_{engine} + M_{emec}$. The input torque of the transmission can thereby be controlled so that the output torque remains at an even level during the shift. Because the torque flow now runs exclusively through the power-shift clutch, the shift clutch of the currently engaged gear becomes torque-free, so that it can be disengaged.

Time Segments e, f:

During an up-shift under traction, the combustion engine and the transmission input shaft have to be slowed down to a lower rpm rate in order to allow the shift clutch of the new, higher gear to be engaged at a synchronous rpm rate. The process of synchronization is strongly accelerated with the help of the power-shift clutch and a supporting engagement of the engine. The power-shift clutch continues to be engaged and to transmit torque to the transmission output shaft. The combustion engine is put into a reverse-torque condition where the engine and the transmission input are decelerated by the sum of the engine torque and power-shift clutch torque. The torque of the electro-mechanical energy converter is set to zero during this phase.

Figure 14A:
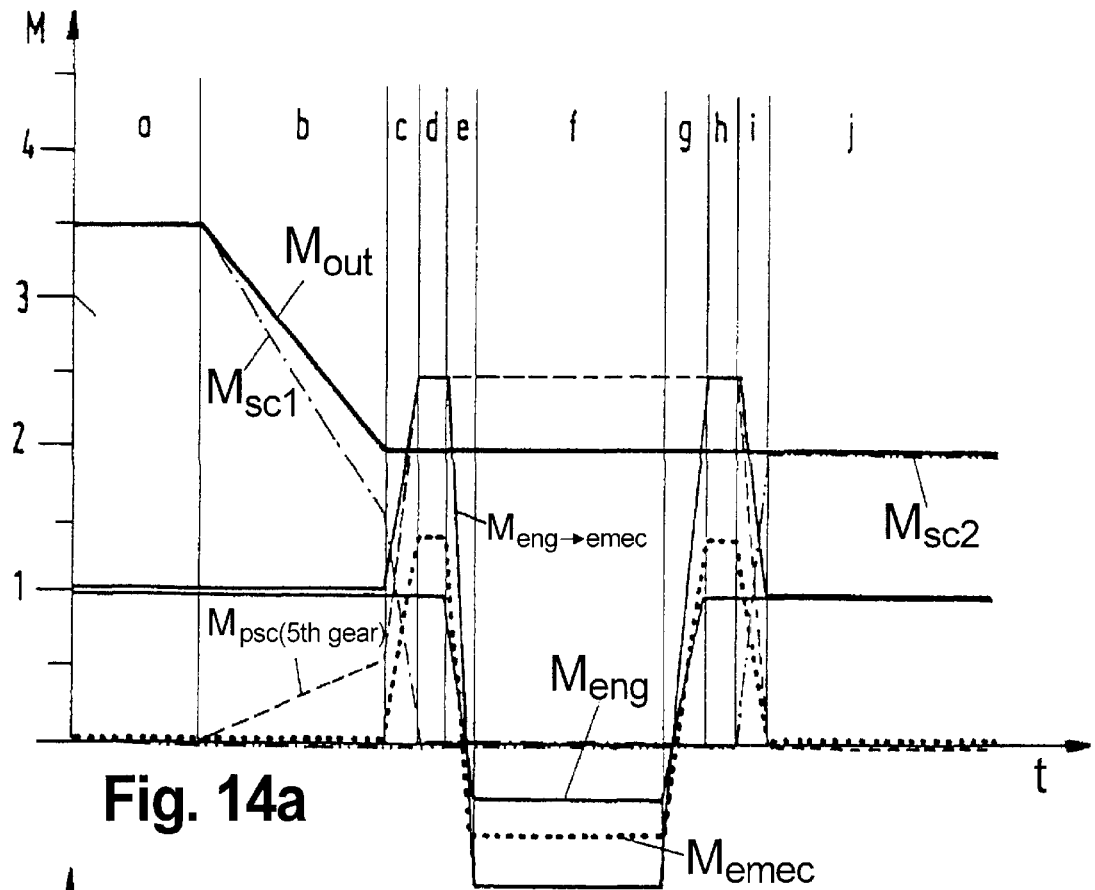
Figure 14B:
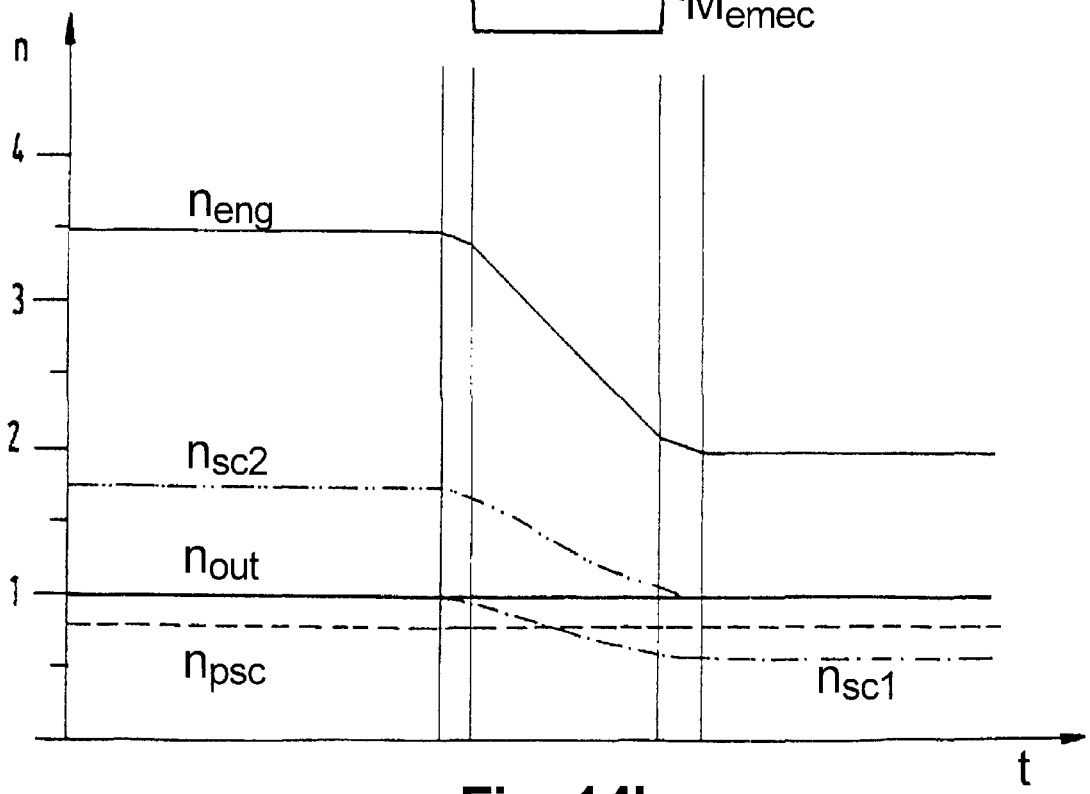
Figure 15A:
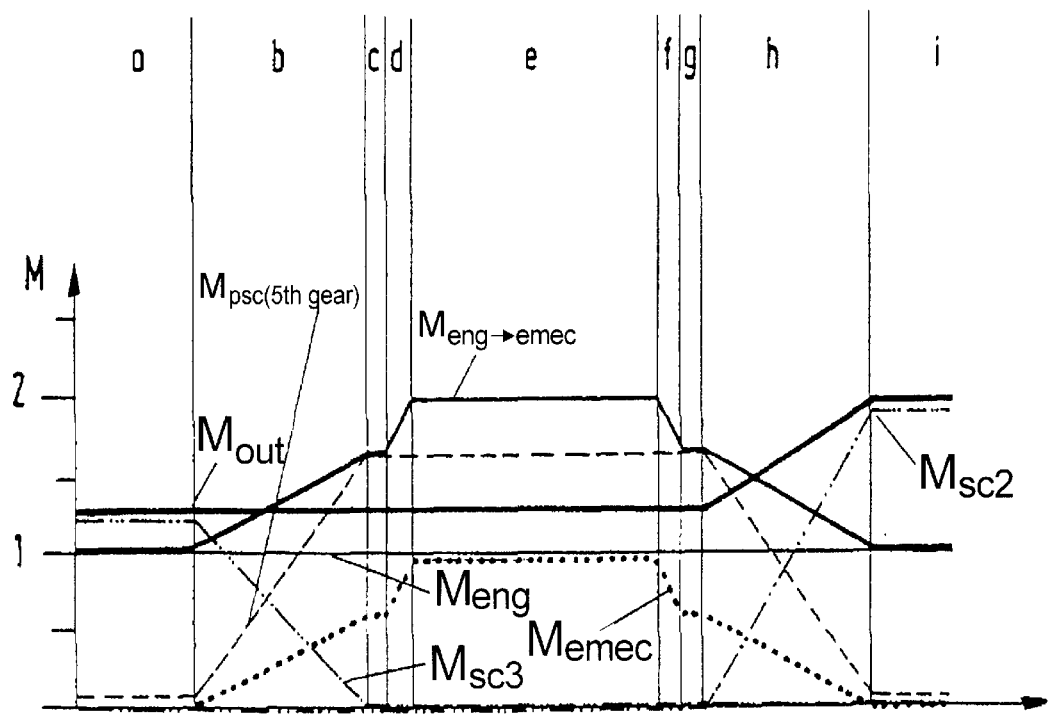
Figure 15B:
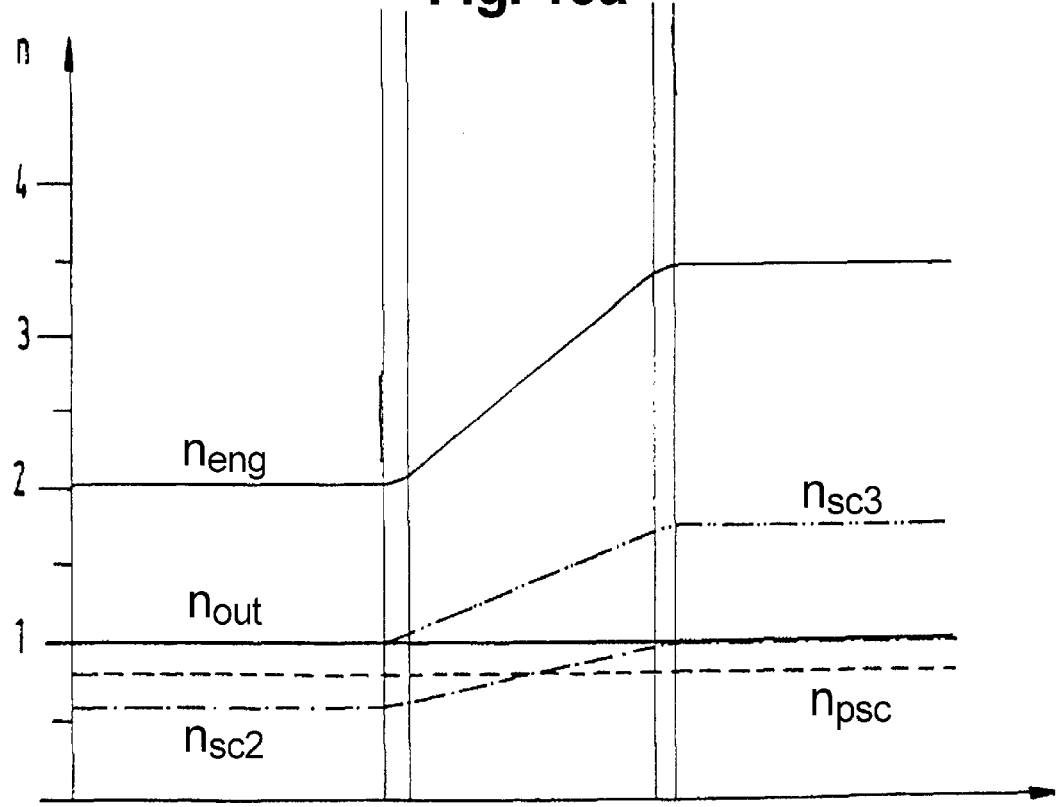
Figure 16A:
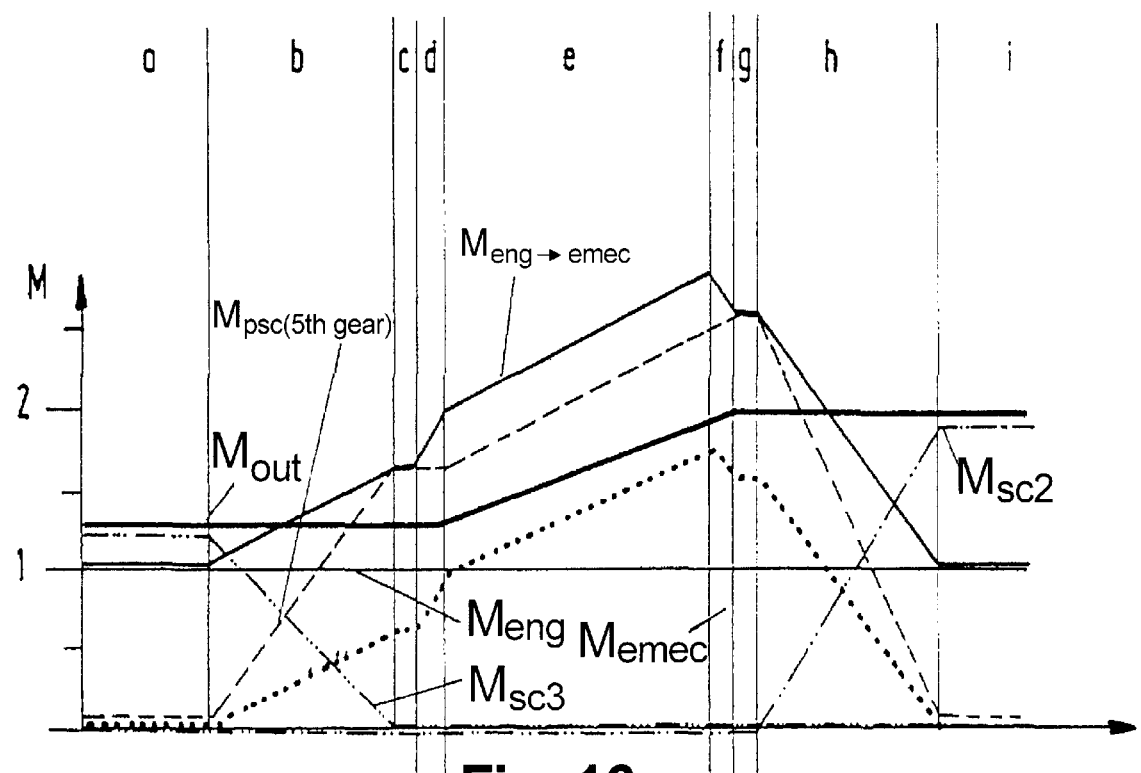
Figure 16B:
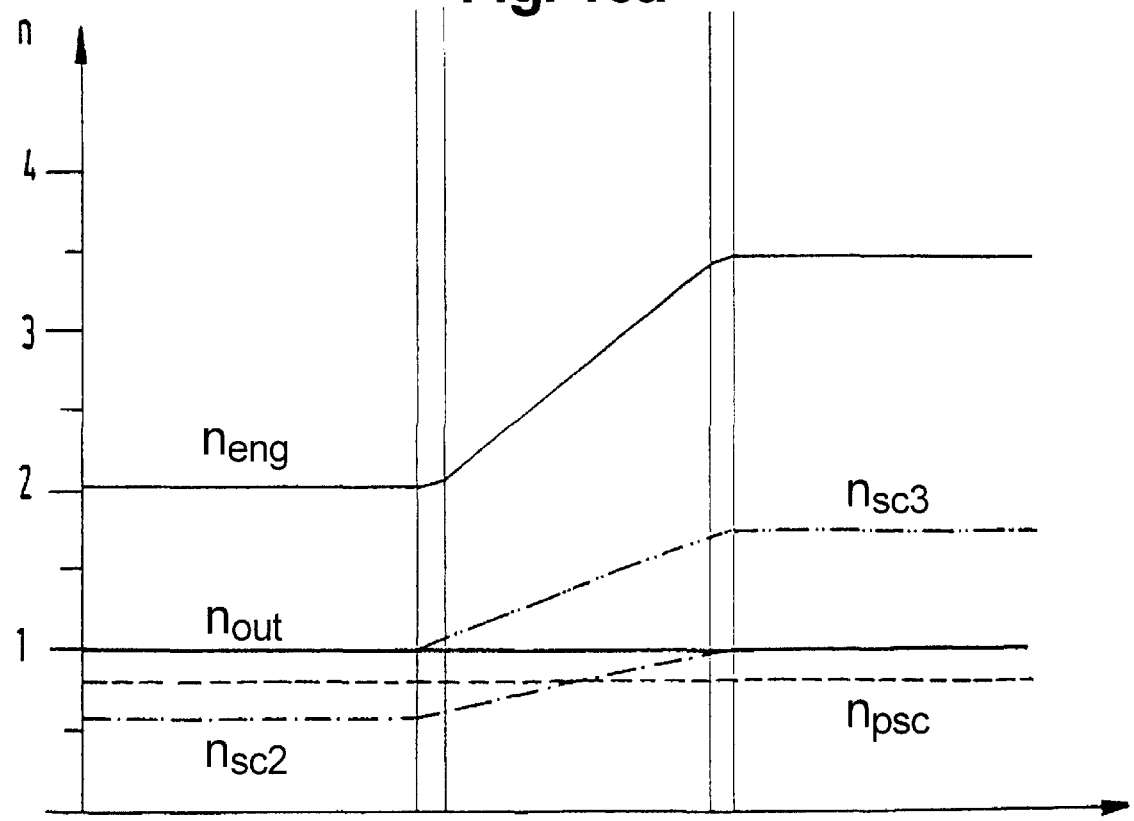

In another inventive version of the same concept, the active deceleration of the combustion engine and the transmission input shaft can also be effected by the electro-mechanical energy converter. In this mode of operation, the electro-mechanical energy converter would function as a generator, converting the kinetic energy of the combustion engine and the transmission input into electrical current. This represents an active method of shortening the synchronizing process. A strategy of this kind is illustrated in FIGS. 14a and 14b.

Time Segments g, h:

Shortly before the targeted rpm rate has been attained, the engine torque is raised to the level desired by the driver according to the state of the accelerator pedal, or to the maximum level. Furthermore, as the torque flows through the power-shift clutch acting at the fifth gear, the electro-mechanical energy converter has to work in parallel with the combustion engine, contributing a supplementary amount of torque in order to assure an even torque level at the output of the transmission. Because the entire torque flow of the transmission input shaft runs through the power-shift clutch to the output shaft, the shift clutch of the new gear to be engaged is torque-free, so that the engagement can be made at a synchronous rpm rate. The electro-mechanical energy converter provides a convenient means of controlling the rpm rate of the engine and the transmission input during this phase of the gear-changing process.

Time Segments i, j:

After the shift clutch of the new gear has been engaged, the torque of the electro-mechanical energy converter is turned down and the power-shift clutch is disengaged. The torque flow is passed smoothly from the power-shift clutch to the shift clutch of the new gear, at which point the gear-changing process is complete.

Down-shifts under full load can likewise be performed completely or partially without a cutback in tractive force by using the assistance of the electro-mechanical energy converter. The electro-mechanical energy converter in this case applies torque to the input of the transmission in parallel with the combustion engine. The torque is used on the one hand for accelerating the combustion engine together with the transmission input shaft to a synchronous rpm rate, and on the other hand, it is applied to the transmission output by way of the power-shift clutch and the fifth gear. The gear-change can be performed entirely without assistance from the engine nor from the start-up clutch. It is possible to use the combustion engine or the start-up clutch for assistance. The shifting strategies for down-shifts under full load are explained in the following paragraphs and illustrated in the diagrams of FIGS. 15a, 15b, and 16a, 16b.

Time Segment a:

This represents the conditions prior to the start of the gear-shifting process. The shift-clutch sc3 transmits the maximum amount of engine torque to the transmission output. The output torque is represented by the equation $M_{out}=M_{engine} \times i_{sc3}$.

Time Segments b, c:

The gear-shifting process is started. The first steps are to engage the power-shift clutch at the fifth gear and thereby take the load off the currently active gear. To prevent a drop in the output torque in this phase, it is necessary to apply torque from the electro-mechanical energy converter to the transmission input shaft in parallel with the combustion engine. At the point where the power-shift clutch is completely engaged, the amount of torque required from the electro-mechanical energy converter has to be raised to an amount $M_{emec}$ as expressed by the following equation in order to avoid a drop in traction.

$$M_{emec}=M_{engine} \times (i_{sc3}/i_{psc}-1)$$

As the entire amount of the torque flowing to the output is transmitted through the power-shift clutch, the currently active shift clutch is torque-free, allowing it to be disengaged.

Time Segments d–g:

When down-shifting under traction, the transmission input and the engine together have to be accelerated to a higher synchronous rpm rate. Since the engine is already delivering the maximum possible amount of torque (down-shift under full load), the energy required for synchronization can only come from the electro-mechanical energy converter (assuming that the torque transmitted to the output by the power-shift clutch is to remain at a constant level). Accordingly, the torque of the electro-mechanical energy converter is increased, and the transmission input and the engine together are accelerated to a higher rpm rate. The power-shift clutch is in a slipping condition at this time and transmits an amount of torque to the output that corresponds to the torque level prior to the start of the shifting process.

Before reaching the synchronous rpm rate, the torque of the electro-mechanical energy converter is reduced, on the one hand to ensure that there is no torque on the shift clutch that is to be engaged and on the other hand to allow the synchronous rpm rate to be reached safely and comfortably. At the point where the torque-free condition as well as the synchronous rpm rate have been attained, the shift clutch sc2 is brought into engagement.

Time Segments h, i:

At this point, the power-shift clutch is taken out of engagement, and the transmitting of the torque flow is taken over by the shift clutch sc2. At the same time, the torque of the electro-mechanical energy converter is turned down to zero. This completes the shifting process.

The foregoing discussion relates to up-shifts and down-shifts under full load, demonstrating how an electric motor working in parallel with the engine to deliver torque to the transmission input shaft compensates for the drop in traction during the gear-shifting intervals. The ability to adjust the torque at the transmission input rapidly and precisely offers the possibility of varying the output torque level in a controlled manner during gear shifts, thereby attaining torque characteristics for partial-load shifts that are comparable to the torque characteristics of continuously variable transmissions (CVTs). A preferred use for this possibility of controlling the torque is in automated shifts under partial load. As the electro-mechanical energy converter has the ability to apply not only additional tractive torque but also braking torque to the transmission input, the torque flow overall can be made smoother.

Figure 17A:
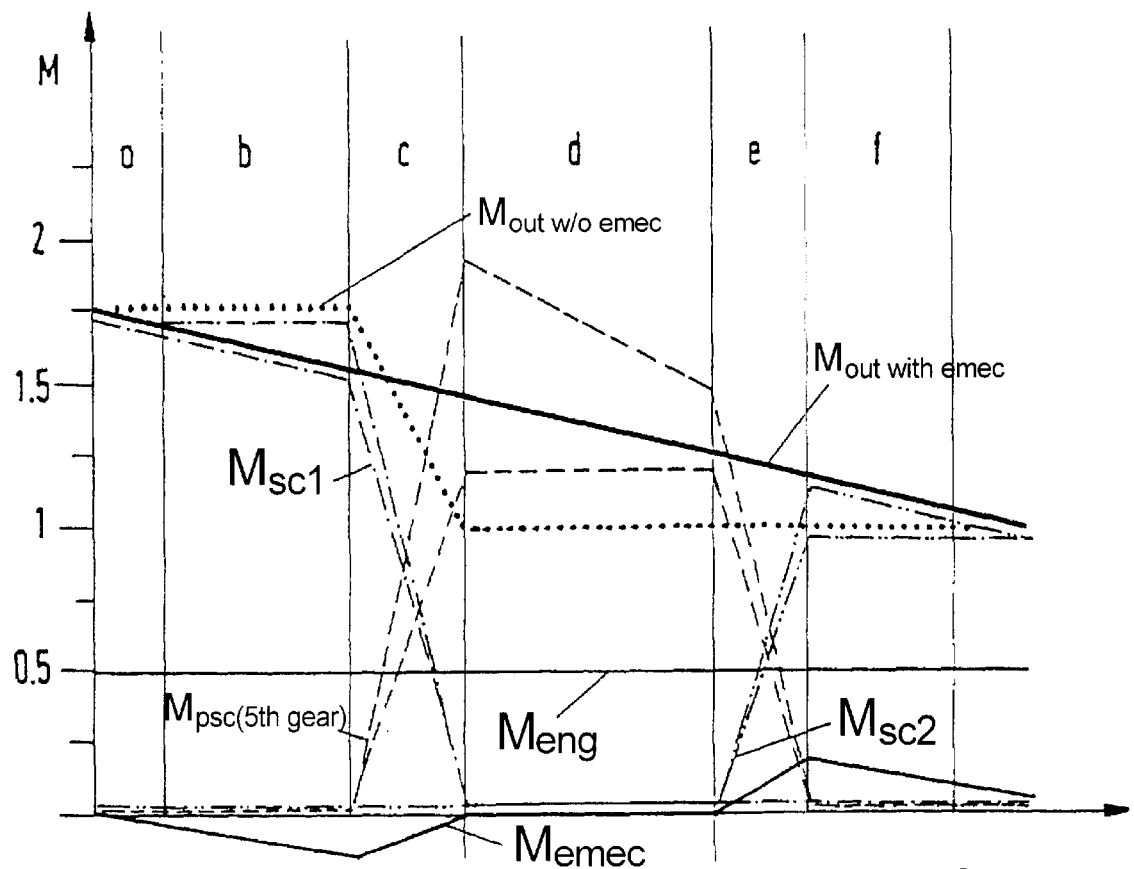
Figure 17B:
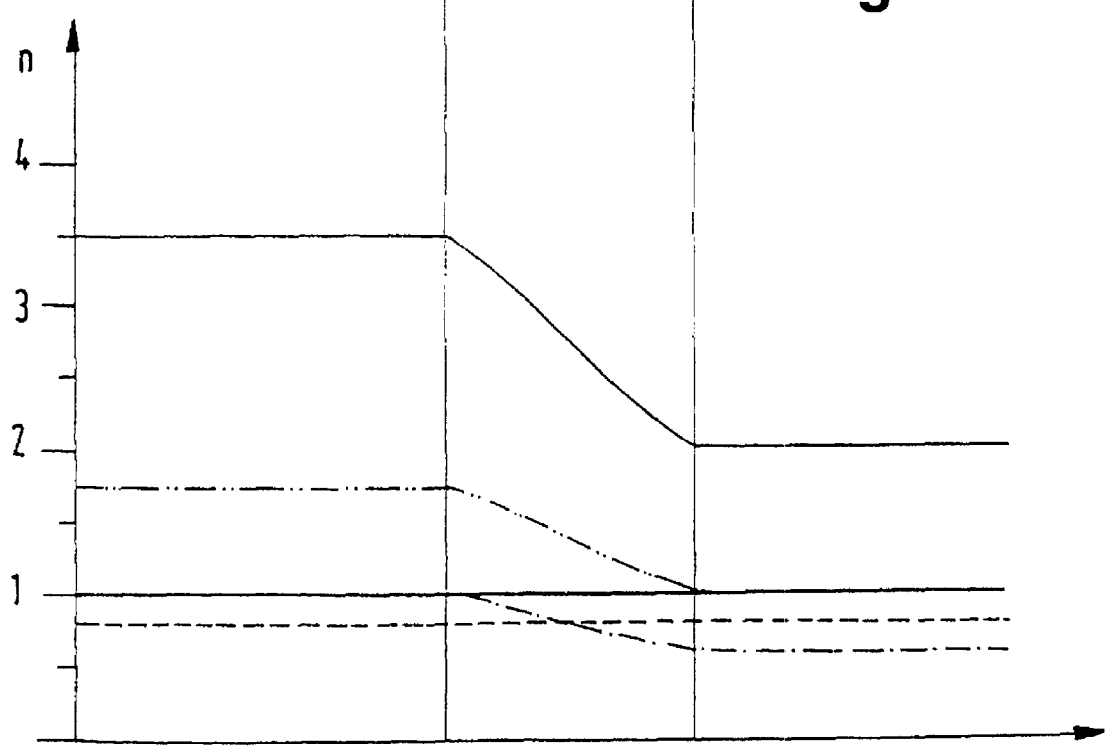

FIGS. 17a and 17b represent the torque levels and rpm rates during an up-shift under a partial load from first to second gear, where an electro-mechanical energy converter and a power-shift clutch are used in such a way that there is a continuous transition between the output torques before and after the gear shift. In the case of an up-shift under traction, the smoothing effect of the electro-mechanical energy converter is evident from the comparison of the output torque levels generated with and without the electromechanical energy converter represented by the full and dotted line, respectively.

The contribution of the electro-mechanical energy converter to the shift process includes braking (time segments b, c) as well as accelerating (time segments e, f) of the transmission input shaft. For the shifting strategy illustrated, it is not necessary to involve the engine control or the control of the start-up clutch. The kinetic energy released in the braking of the transmission input shaft at the beginning of the gear-changing process is converted into electrical energy by the electro-mechanical energy converter, which works as a generator in this instance. The electrical energy is temporarily stored, to be returned to the transmission input later in the gear-shifting process.

During gear shifts, the electro-mechanical energy converter performs the following functions:

deliver a supplemental amount of torque to the transmission input, i.e., accelerate as well as decelerate the transmission input shaft, compensate the drop in traction during the shift intervals;

redistribute energy, i.e., convert and store the kinetic energy removed from the transmission input at the beginning of a shift process, and return it again in the end phase of the shift process; adjust the output torque to resemble the smooth torque flow of a continuously variable transmission (CVT);

provide a torque-free condition for the shift clutches participating in the shift process;

control and regulate (synchronize) the rpm rate of the transmission input.

The invention further relates to a transmission, also referred to as power-shift transmission, in which a drop or interruption in the tractive force is filled in by coupling the engine to the drive train through a power-shift clutch and thereby decelerating the engine.

Figure 18:
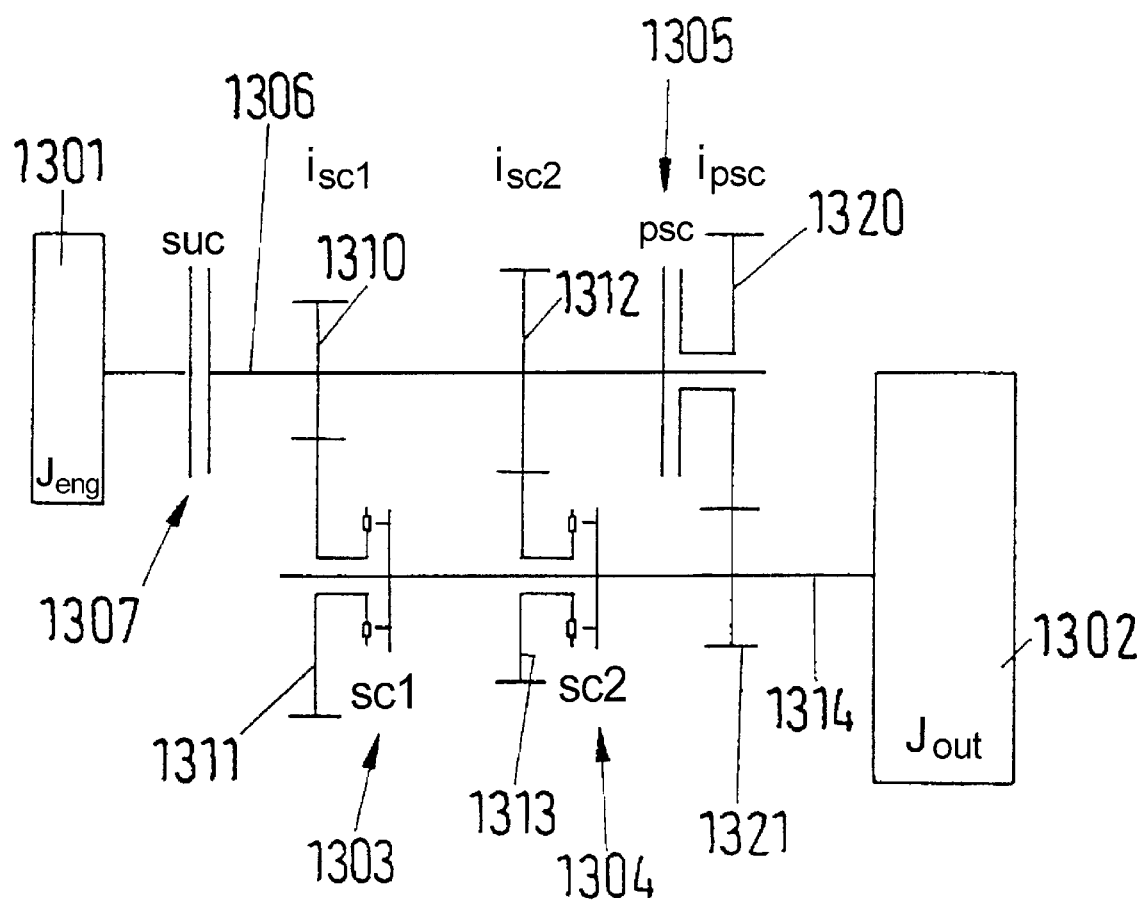
FIG. 18 represents a schematic view of a transmission.

FIG. 18 gives a schematic representation of a transmission with two masses, i.e., the engine mass 1301 and the vehicle mass 1302 (reduced to an effective output mass) and their corresponding moments of inertia $J_{eng}$ and $J_{out}$, respectively. In addition, there are two ratio levels, $i_{sc1}$ and $i_{sc2}$, that can be alternatingly engaged by means of two form-locking shift clutches 1303 and 1304 (sc1 and sc2) and a power-shift clutch 1305 (psc), shown as a friction clutch that is associated with a higher gear ($i_{psc}$) e.g., 5th gear. A further clutch, such as a start-up clutch 1307, is interposed between the motor mass 1302 and the input shaft 1306. The shift-ratio levels $i_{sc1}$ and $i_{sc2}$ are provided by means of the gear pairs 1310, 1311 and 1312, 1313, respectively, where each of the pairs has a fixed gear and a free gear. As an example, the fixed gears 1310 and 1312 are connected to the transmission input shaft, and the free gears 1311 and 1313 are connected with a countershaft or output shaft 1314. The power-shift clutch connects the transmission input shaft to the transmission output shaft by way of a gear pair 1320, 1321.

The following FIGS. 19 through 23 represent shift processes for up-shifts under traction, e.g., under full load. Illustrated are diagrams of torque M vs. time t, rpm rates n vs. time t, and the associated conditions of the clutches for an up-shift under full load. To simplify the diagrams, the torque curves M are standardized in relation to the maximum engine torque, and the rpm rates are standardized in relation to the output rpm rate. The following discussion relates to the torque and rpm diagrams of FIG. 19.

The time segment a represents the conditions before the shift process is started. At this time, the engine torque is at its maximum level ($M_{eng}$=1). Thus, the output torque for the currently engaged gear is $M_{eng} \times i_1$ with an order of magnitude of 3.5 in the present example. The output torque is transmitted through the shift clutch 1303 (sc1), while the power-shift clutch 1305 is disengaged, thus not transmitting any torque. Accordingly, the small symbolic representation of the transmission shows the torque flow taking the path through the shift clutch sc1.

The time segment b represents the torque vs. time in the beginning phase of the shift process. During this phase, the power-shift clutch 1305 is at least slowly being engaged. The start-up clutch 1307 remains engaged. As the power-shift clutch 1305 takes on an increasing amount of torque, the shift clutch 1303 receives a decreasing amount of torque. The relationship between the torques can be expressed by the equation:

$$M_{eng}=M_{psc}+M_{sc1}/i_{sc1}$$

The state where the power-shift clutch reaches the torque level at which the shift clutch becomes torque-free ($M_{sc1}$=0) can be expressed by the equations:

$$M_{psc}=M_{eng}M_{out}=M_{psc} \times i_{psc}=M_{eng} \times i_{psc}$$

At this point, the previously used shift level with the gears 1310, 1311 and the shift clutch 1303 can be taken out by disengaging the shift clutch 1303.

The foregoing equations demonstrate that it is practical if the output torque decreases to the level $M_{out}=M_{eng} \times i_{psc}$. It is also evident from the equations that the torque level can be influenced through the engine torque $M_{eng}$. It is of practical benefit if the engine torque $M_{eng}$ at this time is as large as possible, assuming a state of full load.

The time segment c represents the beginning of the synchronization phase between the engine and the new gear-shift level. As there is no longer a form-locking connection between the engine and the transmission output, the rpm rate of the engine can be controlled though the available torques, of which there are two, i.e., the torque of the engine itself and the torque of the power-shift clutch. It is advantageous to use the torque of the power-shift clutch as a comfort-controlling device, since it is proportionate to the output torque.

During the time segment c, the torque of the power-shift clutch is raised to a level where the output torque corresponds essentially to the torque level that will exist after the gear-changing process. At the conclusion of the gear-changing process under full load, the output torque will be at a level of, e.g., $M_{out}=M_{engmax} \times i_{sc2}=2$. In order to obtain this level of output torque, it is practical to raise the torque of the power-shift clutch 1305 to a value of $M_{psc}=M_{engmax} \times \phi_{2-p}$, where the factor $\phi_{2-p}$ is defined by the equation $$M_{psc} = M_{out}^{after} / i_{psc} = \frac{M_{eng\,max} \times i_{sc2}}{i_{psc}} = M_{eng\,max} \times \varphi_{2-p}$$

In the inventive embodiment, the torque of the power-shift clutch corresponds to 2.5 times the engine torque. The torque of the power-shift clutch decelerates the engine 1301. In order to complete the deceleration phase in the shortest time possible, it is advantageous to cut back the engine torque during the time segment c, e.g., to the maximum drag torque from the drive train. Thus, the two torques will have an additive effect in braking the engine. The result is a decrease of the rpm rate of the engine 1301, input shaft 1306, and the gear sets connected to it.

In the time segment d of the controlled gear-changing process, the output torque reaches and maintains its new level, e.g., $M_{psc}=M_{engmax} \times \phi_{2-p}$. The engine continues to be in braking mode at maximum drag torque, and the synchronization process is continued.

Next, in the time segment e, shortly before reaching the synchronous rpm rate, the engine torque $M_{eng}$ is raised again, whereby the rotary acceleration is reduced. At the lower rotary acceleration of the engine, it is easier to match the rpm rate, or more specifically, the rpm range, where the new gear level can safely be engaged.

Next, in the time segment f, the engine maintains a constant torque until the rpm rates between the input and output portions of the shift clutch sc2 have been almost equalized. At the point where the rpm rates are equal, the shift clutch sc2 is engaged or locked.

Subsequently, in the time segment g, the power-shift clutch 1305 is disengaged. The shift clutch sc2 is in locked engagement before the power-shift clutch is disengaged. Because the power-shift clutch is at this point still in a friction-slip mode, the output torque will at least partially break down. In special cases, e.g., under full load, it is even possible that a torque reversal may occur. This change or jump of the torque is caused by a change or jump in the system from a purely frictional engagement to the combination of frictional engagement and form-locking engagement.

In a transmission according to the invention, it is advantageous if the power-shift clutch is taken out of engagement at this stage of the process. It is advantageous to perform the disengagement rapidly. In another advantageous embodiment, it can be practical if the power-shift clutch is not completely disengaged but instead is set to a level of engagement where its torque-transmitting capacity is reduced.

Figure 19:
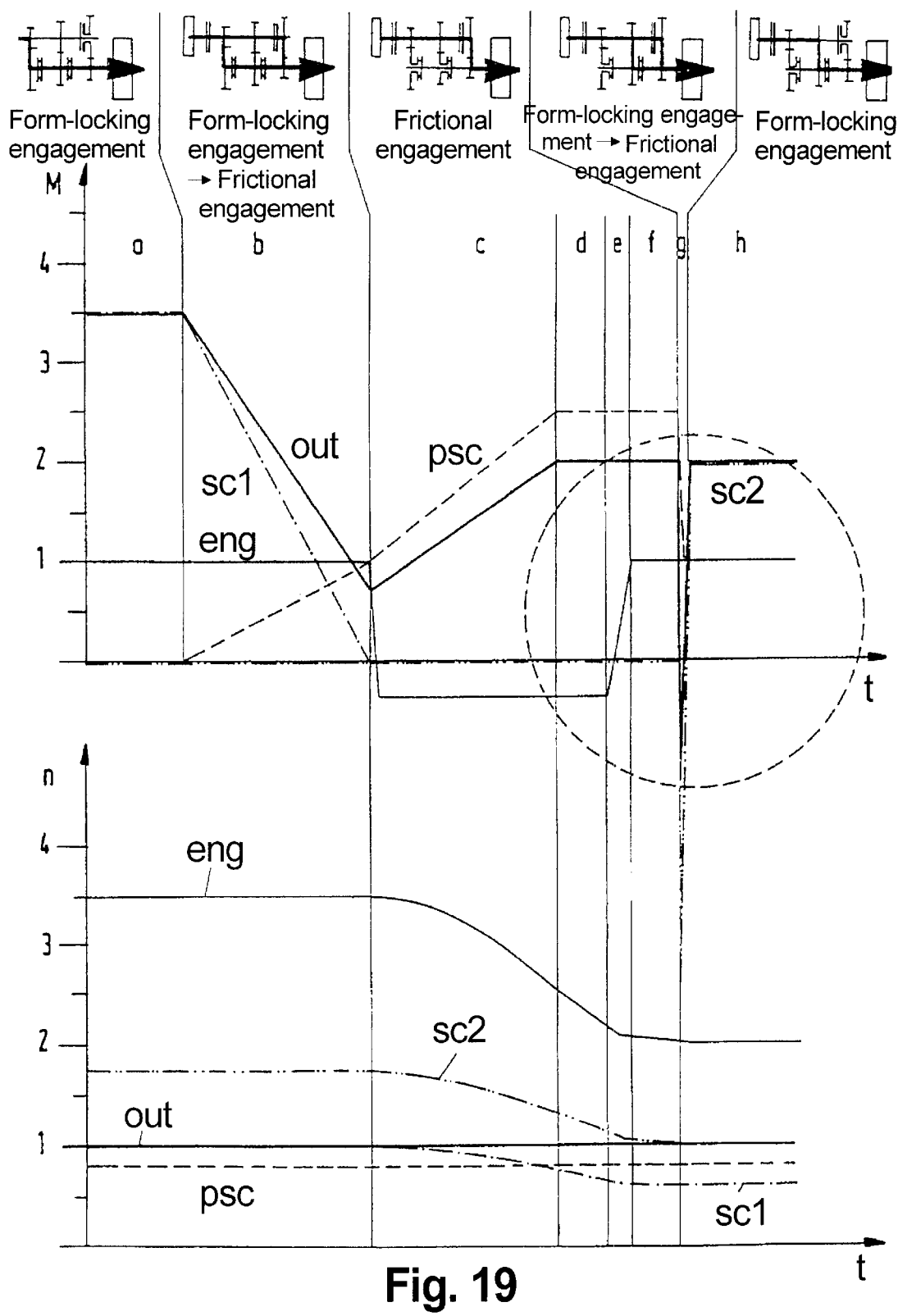
FIGS. 19 through 27 represent diagrams.

The following phase, time segment h in FIG. 19, represents the conditions after the gear-changing process has been completed. The engine torque $M_{eng}$ is at its maximum level ($M_{eng}$=1) and consequently, the output torque at the new gear level will be, in this example, $M_{out}=M_{eng} \times i_2=2$, which is now being transmitted through the shift clutch sc2.

Figure 20:
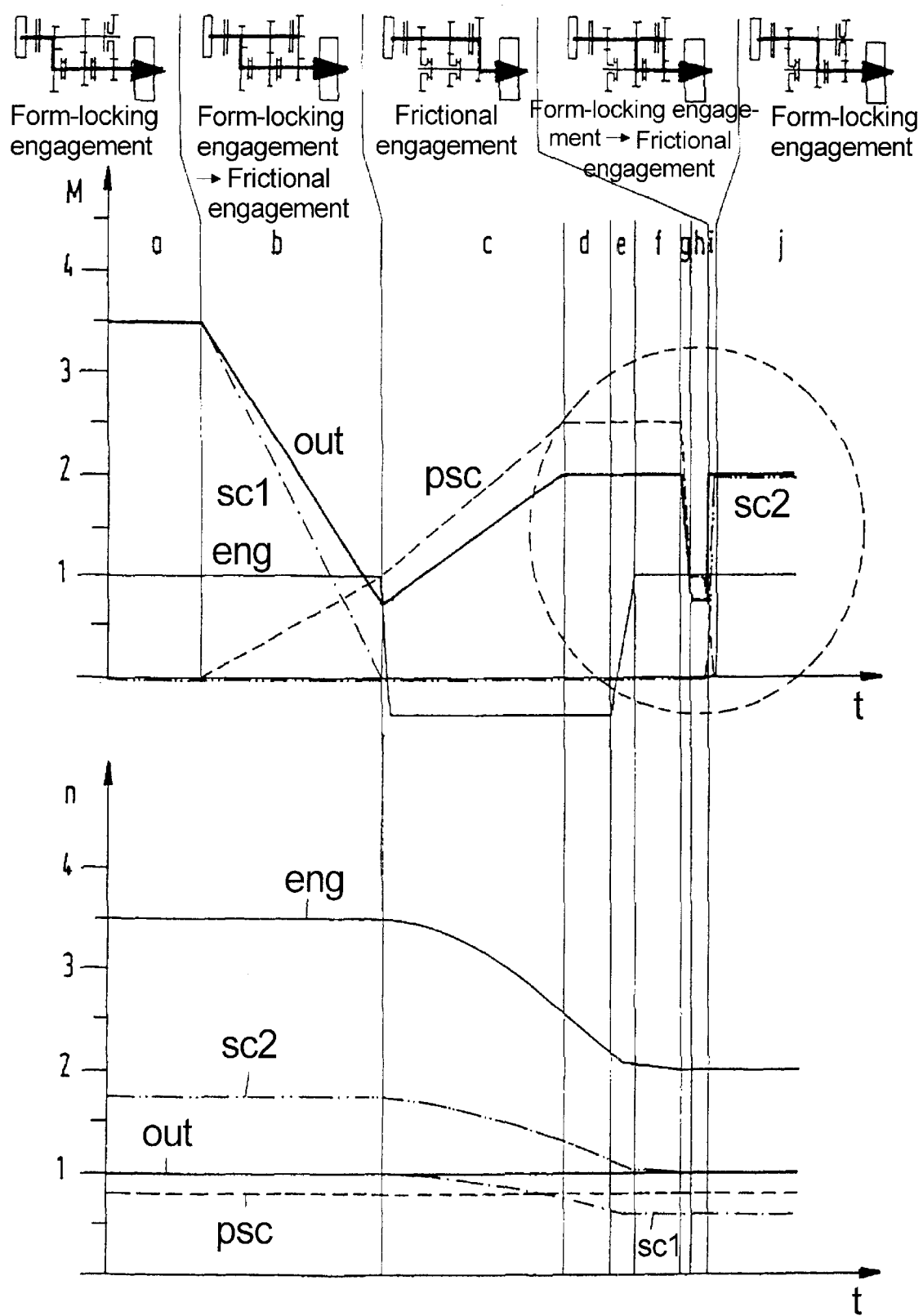

FIG. 20 illustrates the a time profile of a gear-changing process where the engagement of the new gear is performed at an rpm difference at the shift clutch of $\Delta_{sc}=0$, an angular engine acceleration $\alpha_{eng}=0$ and an engine torque $M_{eng}=M_{engmax}$. The phases or time segments of FIG. 20 that are not described here correspond essentially to the analogous phases or time segments of FIG. 19.

The diagram of FIG. 20 illustrates the engagement of the shift clutch in the case where the rpm rates or the acceleration rates at the shift clutch are equalized and the engine is not being accelerated. In this case, the maximum engine torque and a torque of equal magnitude from the power-shift clutch are acting on the engine. Before engaging the new gear, the torque-transmitting capacity of the power-shift clutch is not maintained at the same level, but is cut back to an extent where the engine torque equals the torque of the power-shift clutch. In this state, the engine is no longer being accelerated, or it is accelerated at the same rate as the transmission output shaft, so that the new gear can be brought into engagement. Subsequently, the power-shift clutch can be disengaged.

During the time segment e of the controlled gear-changing process, the engine torque is raised in order to decrease the amount of engine acceleration.

During the subsequent time segment f, the engine torque is maintained at the same level until the rpm rate of the engine or the rpm rates of the input and output of the shift clutch sc2 have reached a range that is suitable for the engagement of the new gear level.

In a further step of the controlled gear-changing process during the time segment g and shortly before reaching synchronism of the rpm rates, the power-shift clutch is taken partially out of engagement to an extent where the torque of the power-shift clutch is similar to the engine torque or cancels the engine torque. In this condition, the new gear can be engaged without causing a jump in the output torque.

Next, in the time segment h, the engine is not accelerated anymore, and the new gear is brought into engagement. This procedure for engaging the new gear has the advantage that it does not cause a jolt in the torque. The transition from the friction based system of the power-shift clutch to the combination of frictional and form-locking engagement of the power-shift clutch psc and the shift clutch sc2 occurs smoothly, i.e., without a jump in the system.

In the subsequent step in the time interval i, the power-shift clutch is taken entirely out of engagement to the point where only the shift clutch sc2 is transmitting the engine torque, thereby causing the torque at the shift clutch to rise to the level of the output torque.

In the time segment j, the gear-changing process is completed. At this point, the magnitude of the output torque $M_{out}$ is determined by the engine torque $M_{eng}$.

Figure 21:
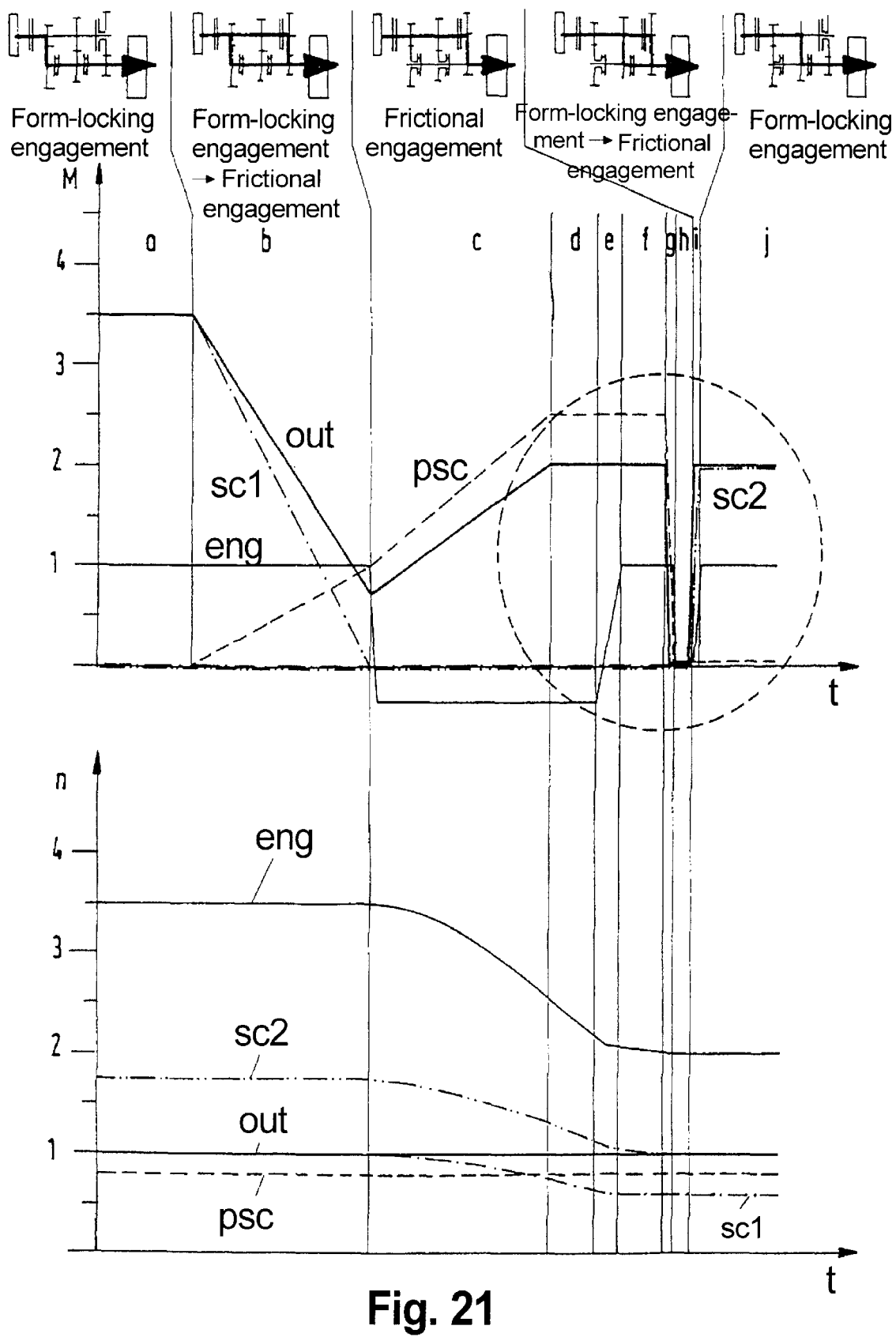

FIG. 21 illustrates a time profile of a gear-changing process where the engagement of the new gear is performed at an rpm difference or torque difference at the shift clutch of $\Delta_{sc}=0$, an angular engine acceleration $\alpha_{eng}=0$ and an engine torque $M_{eng}=M_{engmax}$. The phases or time segments of FIG. 21 that are not described here correspond essentially to the analogous phases or time segments of FIG. 19. In this embodiment, the power-shift clutch is taken completely out of engagement before engaging the new gear.

If the engine torque is cut back to a small amount or to zero, the engine is no longer accelerated, and the new gear can be engaged. At the end, the engine torque is raised to the desired level of output torque.

In the time segment e, the engine torque is raised in order to reduce the rate of acceleration of the engine.

In the subsequent time segment f, the engine torque is maintained until the appropriate rpm range has been attained for engaging the new gear.

In a further step of the controlled gear-changing process during the time segment g and shortly before reaching synchronism of the rpm rates between the input and output of the shift clutch sc2, the power-shift clutch is taken out of engagement. At the same time, the engine torque is cut back to a level where the engine is essentially no longer accelerating. In this condition, the new gear can be engaged without causing a jump in the output torque.

Next, in the time segment h, the engine is not accelerated anymore, and the new gear is brought into engagement. This procedure for engaging the new gear has the advantage that it causes essentially no jolt in the torque.

In the subsequent step in the time interval i, the engine torque is raised to generate the desired amount of output torque.

In the time segment j, the gear-changing process is completed. At this point, the magnitude of the output torque $M_{out}$ is determined by the engine torque $M_{eng}$.

Figure 22:
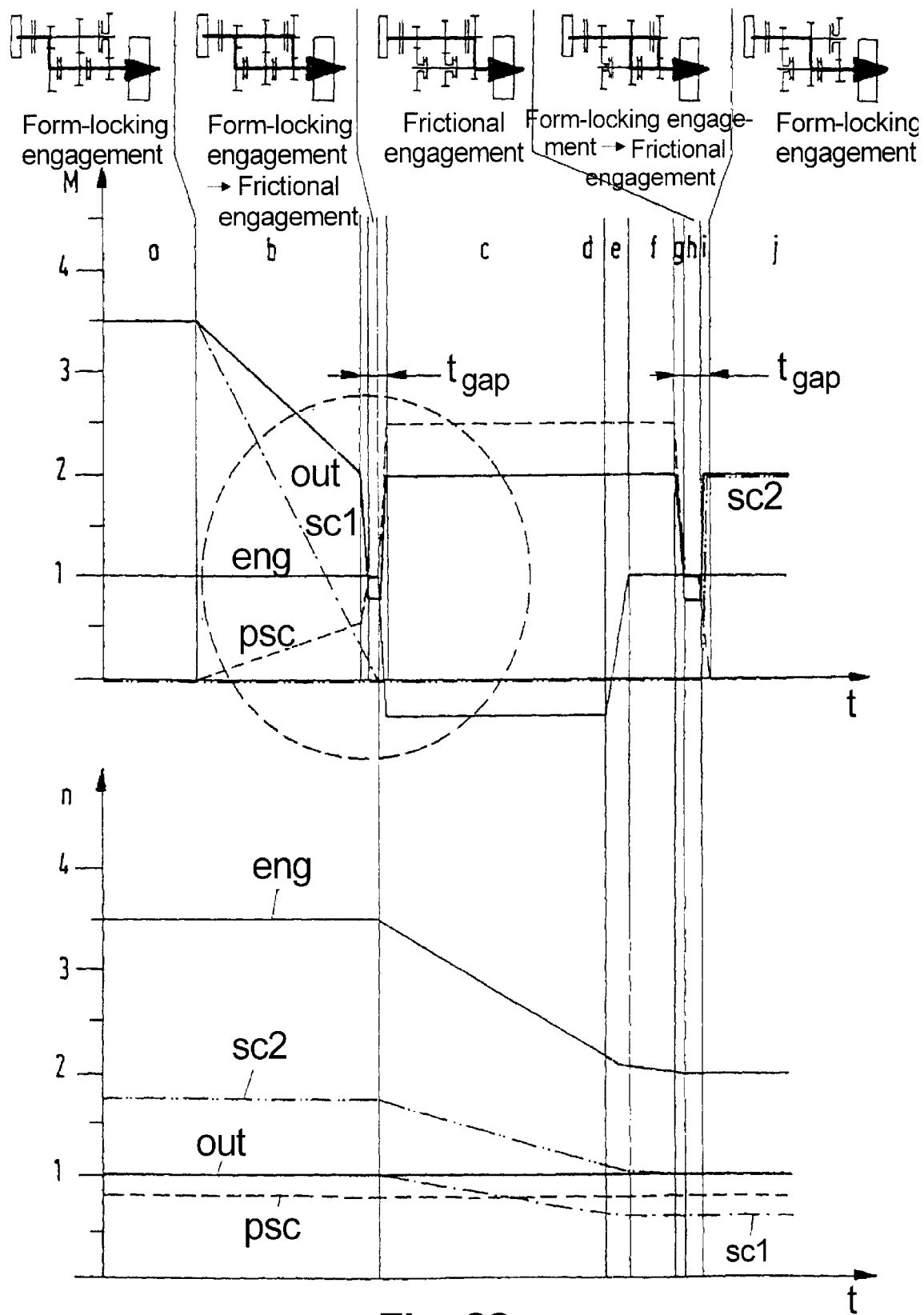

FIG. 22 illustrates the time sequence of a gear-changing process with a fast disengagement of the previously used gear. The phases or time segments of FIG. 22 that are not described here correspond essentially to the analogous phases or time segments of FIG. 19 or of the FIGS. 20 and 21. FIG. 22 shows a variation in the controlled gear-changing process, where a rapid engagement of the power-shift clutch is used to shorten the time interval of the drop in traction that occurs during the disengagement of the gear. If the time interval of the loss in traction is made very short, the driver may not even notice the gap and have the perception that the shift process runs without any interruption in the tractive force.

The time segment a represents the conditions before the shift process is started. At this time, the engine torque is at its maximum level ($M_{eng}=1$). Thus, the output torque for the currently engaged gear is, e.g., $M_{eng} \times i_1 = 3.5$. The output torque is transmitted through the shift clutch sc1.

The time segment b represents the torque vs. time in the beginning phase of the shift process. During this phase, the power-shift clutch psc is engaged at a slow rate. The start-up clutch 1307 (see FIG. 18) remains engaged. The torque is reduced to the level corresponding to the new gear. This can be accomplished in a single step or in several steps or stages. In FIG. 22, the torque is lowered at a constant rate during the time interval b until, at a later point in time, the decrease occurs at a different, greater rate of reduction.

Subsequently, in the time segment c, the torque of the power-shift clutch is raised in a continuous, steady manner to the point where the shift clutch sc1 is no longer transmitting torque, so that the previously used gear can be disengaged.

The time segment d represents the beginning of the synchronization phase. The power-shift clutch is brought into engagement. The torque transmitted by the power-shift clutch is raised to the extent where the output torque is the same as it will be after the gear-changing process. The output torque after the shift under full load or at a smaller load will be, for example $M_{out}=M_{engmax} \times i_{sc2}=2$. In order to obtain this level of output torque, it is necessary to raise the torque of the power-shift clutch or to increase its degree of engagement. In the inventive embodiment, the torque of the power-shift clutch corresponds to 2.5 times the engine torque. The torque of the power-shift clutch decelerates the engine. In order to shorten this phase of the gear-changing process, it is advantageous to cut back the engine torque during the time segment c to the level of maximum drag torque. Thus, the two torques will have an additive effect in braking the engine. The result is a decrease of the rpm rate of the engine, the input shaft, and the gear sets connected to it.

Figure 23:
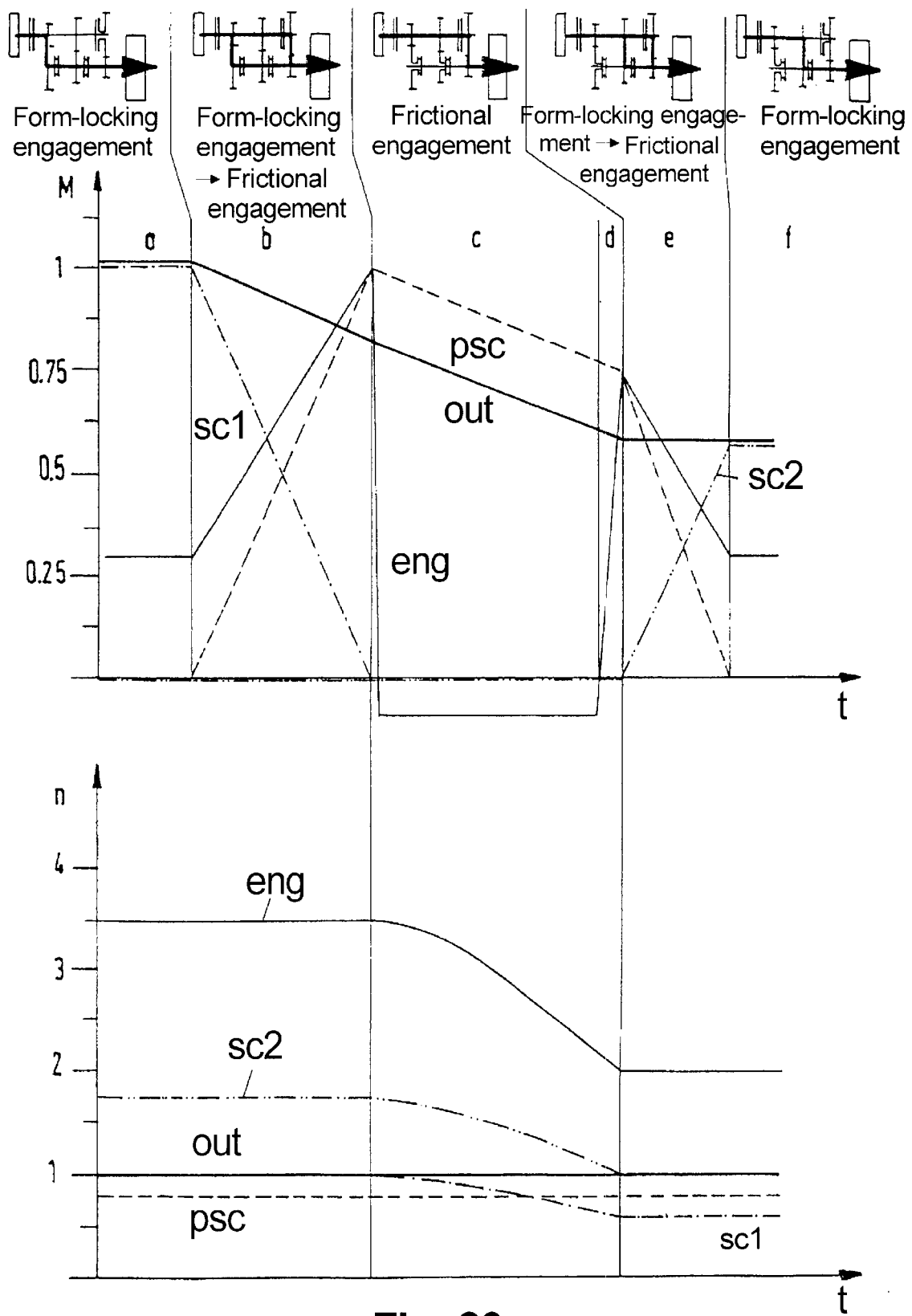

FIG. 23 illustrates the time sequence of an up-shift under traction with a partial load. The phases or time segments of FIG. 23 that are not described here correspond essentially to the analogous phases or time segments of FIG. 19 or of the FIGS. 20 to 22. The purpose of FIG. 23 is to demonstrate the time sequence for up-shifts under traction with a partial load.

Time Segment a represents the conditions prior to the start of the gear-shifting process. The engine torque corresponds to a partial load, e.g., $M_{eng}=0.3$. Accordingly, the output torque with the currently still engaged gear is $M_{out}=M_{eng} \times i_{sc1}=1.05$. This is the torque that is transmitted through the shift clutch sc1.

Time Segment b represents the beginning phase of the gear-shifting process. The torque levels of the power-shift clutch and the engine are increased at the same time.

The synchronization phase begins during the time segment c. The torque of the power-shift clutch is lowered slowly to the point where the output torque is at the level that it will have after the gear-changing process. For example, with a partial load of 30%, the output torque after the shift process will be $M_{out}=M_{eng} \times i_{sc2}=0.6$.

Next, in the time segment d, shortly before reaching the synchronous rpm rate, the engine torque $M_{eng}$ is raised to a level where with equal rpm rates an equilibrium is reached between the engine torque and the torque of the power-shift clutch.

During the time segments d and e, the shift clutch sc2 is brought into engagement. There is essentially no jump in the torque, because the output torque remains essentially constant over the transition from frictional engagement to combined friction/form-locking engagement, due to the equilibrium in the amounts of torque at the engine.

In the time segment e, the power-shift clutch is disengaged and the engine torque is reduced to the desired level, e.g. $M_{eng}=30\%$. After the power-shift clutch has been disengaged, the gear-changing process is completed.

Time Segment f illustrates the conditions after the gear-changing process.

The FIGS. 24 through 49 illustrate in graphs and block diagrams how gear-changing processes are performed in accordance with the invention. The graphs show torques M, rpm rates n and the levels of clutch engagement, all as a function of the time t. The subscript indices correspond to FIG. 18, i.e., the subscript "eng" is used for the torque and rpm rate of the engine, "sc1" and "sc2" designate the shift clutches 1 and 2, respectively, "out" stands for output (i.e., the output shaft of the transmissions and "psc" stands for power-shift clutch.

The strategies for the gear-changing process are realized by controlling the process in accordance with the invention through the combined application of the start-up clutch and the power-shift clutch as well as the control of the engine torque, e.g., by using the engine control to cause the engine to participate in the process. This makes it possible to vary the torque levels during the phases of the shifting process and thus to respond flexibly to changing travel situations. The result is a comfortable gear change.

The drawings will demonstrate that in a transmission according to the invention, e.g., with a power-shift clutch at the highest-level gear, it is possible to perform up-shifts and down-shifts under traction where the time gaps of the tractive power are strongly reduced. With a (second) power-shift clutch at the lowest forward gear of the transmission, it becomes possible to perform up-shifts and down-shifts in a drag mode essentially without a gap in the tractive force.

Shifting strategies that are adapted to the particular travel situation or to the desires of the driver can be realized through a combined control of the engine, power-shift clutch and start-up clutch.

Figure 24:
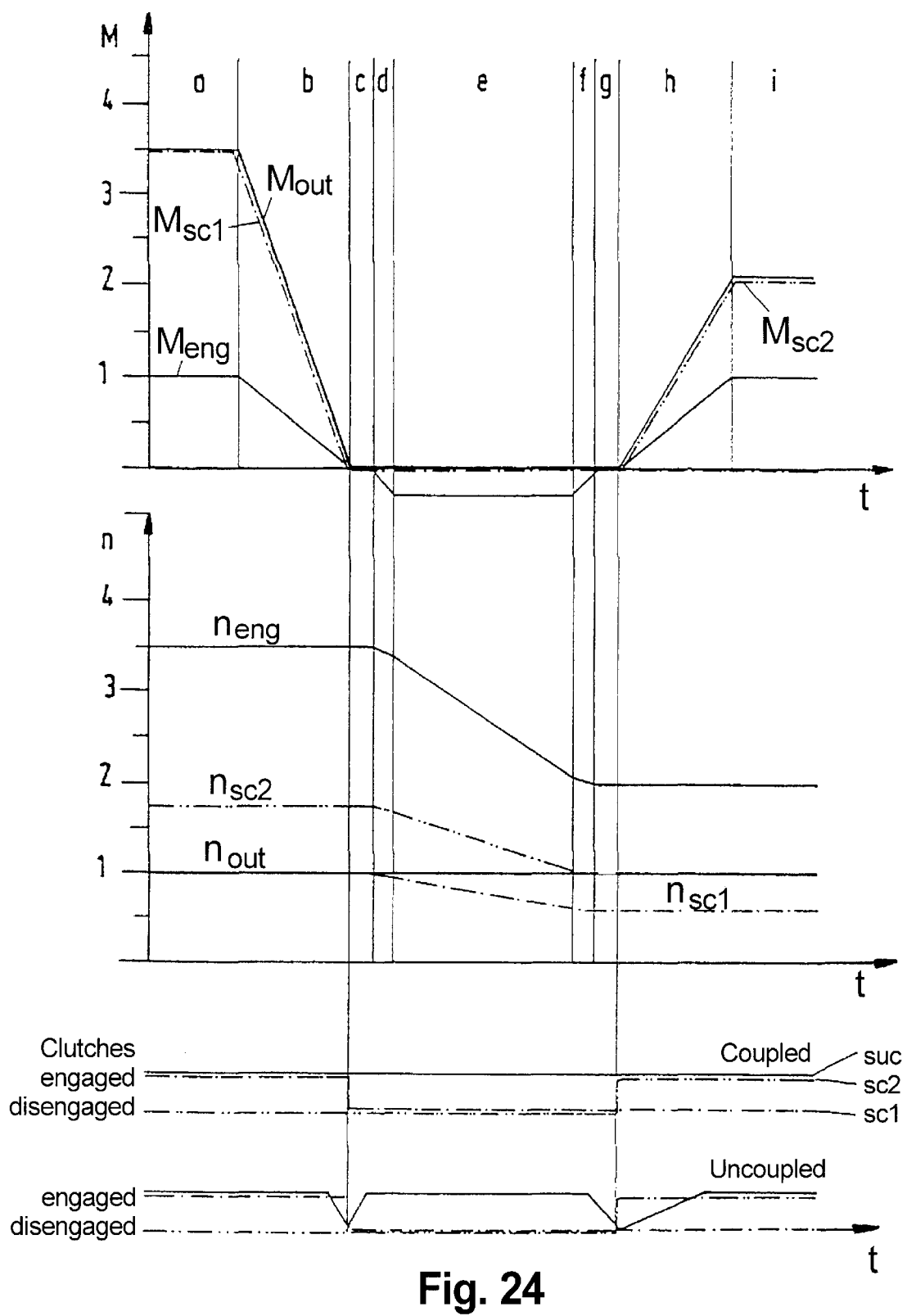

FIG. 24 illustrates the time sequence of an up-shift under full load, more specifically, an up-shift under traction from first to second gear without a power-shift clutch, at maximum engine torque $M_{eng}=max$. Up-shifts under traction can be a critical type of gear change, depending on the travel situation in which they are performed. Especially in connection with passing maneuvers or when traveling uphill, the time gap in traction during the gear-changing process has to be considered as critical. To demonstrate the potential of a power-shift transmission, i.e., a transmission with a power-shift clutch, the following discussion will first go through the process of up-shifting under traction without the use of the power-shift clutch. The torque levels and rpm rates corresponding to this process are shown in the graph of FIG. 24.

Time Segment a represents the conditions prior to the start of the gear-shifting process. The engine torque is, e.g., at its maximum level (shift under full load, $M_{eng}=1$). Accordingly, the output torque with the currently still engaged gear is $M_{out}=M_{eng} \times i_{sc1}=3.5$. This is the torque that is transmitted through the shift clutch sc1. Time segment b represents the beginning phase of the gear-shifting process. The engine torque is reduced to zero to ensure that the current gear can be disengaged in a torque-free condition. The start-up clutch remains engaged while the current gear is being disengaged.

Because of the continuing form-locking engagement between the engine and the output shaft (as long as the shift clutch sc1 remains engaged), the output torque $M_{out}=M_{eng}\times i_{sc1}$ drops to zero. In the time segment c, as the engine torque has dropped to zero, the current gear, e.g., first gear, can be disengaged and the synchronization phase can begin. As there is no longer a form-locking engagement between engine and output shaft, the rpm rate of the engine can be controlled through the engine torque alone by means of the engine control.

Next, in the time segment d, the rpm rate of the transmission input shaft is slowed down. In an up-shift under traction, the synchronous rpm rate is smaller than the rpm rate was prior to the shift. Consequently, the transmission input shaft has to be slowed down. In the present case, only the maximum drag torque of the engine (in the order of 30 Nm, depending on the engine) is available for this purpose. During the time segment e, the engine synchronization continues. As the engine is being used for decelerating the transmission input shaft, there is no output torque available for the traction of the vehicle. The flow of tractive force is interrupted. During the time segment f, i.e., shortly before the point of synchronization, the engine torque is raised to zero from its previously negative drag-torque level. The engine deceleration is reduced to zero, and the rpm range in which the new gear can safely be engaged is reached more quickly and easily.

In the time segment g, the rpm rates of the input and output of the shift clutch sc2 are equal and the shift clutch sc2 is torque-free. The new gear can now safely be brought into engagement. During the time segments h and i, the engine torque is raised to its maximum value corresponding to the torque level desired by the driver in terms of the degree of gas-pedal depression. Since the form-locking engagement between the engine and the output shaft has been reestablished, the output torque will now follow the engine torque, e.g., according to $M_{out}=M_{eng}\times i_{sc2}=2$. The gear-changing process is completed. The foregoing gear-shift strategies describe gear-changing processes where the start-up clutch remains engaged, as illustrated in the next-to-last graph of FIG. 24. To make the gear-shifting more comfortable during the phases of getting out of the old gear and getting into the new gear, respectively, it is advantageous if the respective shift clutch is torque free. In the absence of a power-shift clutch, this condition is met by controlling the engine torque alone. This requires the capability of controlling the engine torque with the appropriate level of precision. Of course, the torque-free condition of the shift clutch during the gear-changing process can also be obtained by actuating the start-up clutch as in conventional transmissions. In this case, the start-up clutch is disengaged briefly during the time intervals when the old gear is taken out of engagement and the new gear is brought into engagement. This procedure is illustrated in the last graph of FIG. 24.

Figure 25:
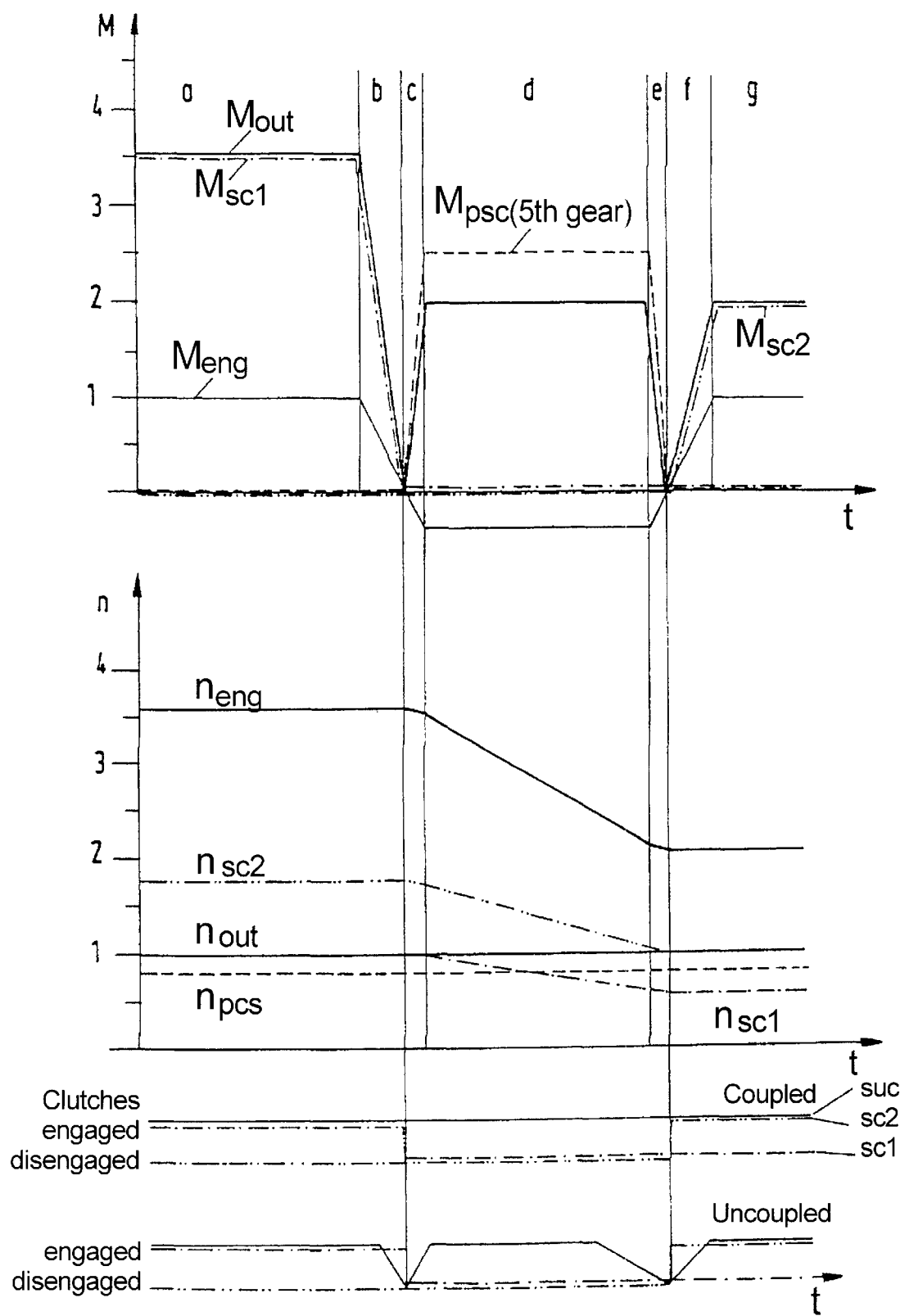

FIG. 25 illustrates the time profile of an up-shift under traction, e.g., from first into second gear with a power-shift clutch psc arranged to work in fifth gear, at maximum engine torque $M_{eng}=1$. The gap in traction during the synchronization phase as described in the context of the gear-changing process of FIG. 24 can be at least reduced by using a power-shift clutch that is connected to the highest forward gear (overdrive) and actively decelerates the transmission input shaft in relation to the output shaft. When up-shifts under traction are performed with full load in extreme traveling situations such as traveling uphill or passing, an extended interruption in vehicle acceleration during the shift must be avoided. The comfort level of the shift process in regard to noise and vibrations are also a factor to consider. By cutting back the engine torque rapidly and then engaging the power-shift clutch, it is possible to minimize the time period during which vehicle traction is totally absent. Time segment a in FIG. 25 represents the conditions prior to the start of the gear-shifting process. The engine torque is at its maximum level $M_{eng}=1$ and accordingly, the output torque with the currently still engaged gear is $M_{out}=M_{eng}\times i_{sc1}=3.5$. This is the torque that is transmitted through the shift clutch sc1. During the time segment b, the engine torque is reduced to zero to ensure that the shift clutch sc1 of the current gear can be disengaged in a torque-free condition. In the time segments c and d, after the shift clutch sc1 has been disengaged and the transmission is not in gear, it is advantageous to brake the transmission input shaft to the new synchronous rpm rate as quickly as possible. This can be effected in two ways. For one, the engine is set to maximum drag condition with the start-up clutch engaged. In addition, the power-shift clutch is engaged to the extent that output torque will correspond to the output torque level that will be present after the gear-changing process. This causes the transmission and the engine to be decelerated at the fastest rate possible and simultaneously allows torque to be transmitted to the output shaft. During this phase, the output torque is determined as $M_{out}=i_{psc}\times M_{psc}$. Shortly before reaching the target rpm rate, it is advantageous to raise the engine torque to zero as rapidly as possible and at the same time to disengage the power-shift clutch completely. This assures on the one hand that the shift-clutch sc2 can be engaged in a torque-free condition and on the other hand, the deceleration rate of the engine is reduced to zero, so that the synchronous rpm rate can it be reached more precisely and easily. In the time segments f and g, the torque-free condition has been attained and the input and output rpm rates of the shift clutch sc2 are matched, so that the shift clutch sc2 can be engaged and the new gear can be activated. Subsequently, the engine torque is raised to the torque level desired by the driver, and the shift process is completed.

Figure 26:
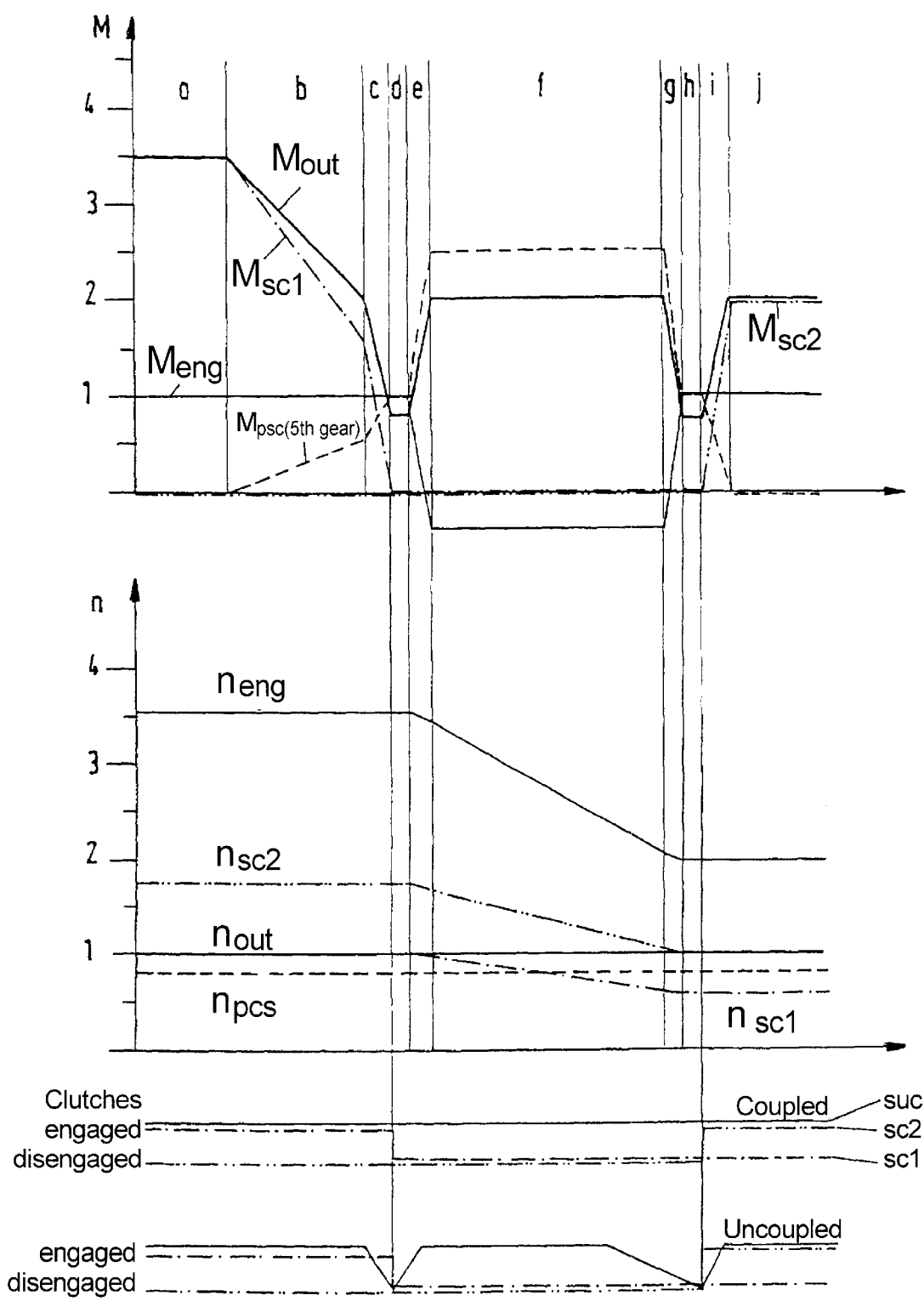

FIG. 26 illustrates another advantageous version of the invention where the interruption in the flow of tractive force is small. By using a combination of controlling the engine torque and the torque flowing through the power-shift clutch, it becomes possible to actively influence the time profile of the output torque as well as the amount of time required for synchronization. Following is a gear-shifting strategy for an up-shift under traction with full load with a small or even minimal interruption in the tractive force.

Time Segment a in FIG. 26 represents the conditions prior to the start of the gear-shifting process. The engine torque is at its maximum level $M_{eng}=1$ and accordingly, the output torque with the currently still engaged gear is $M_{out}=M_{eng}\times i_{sc1}=3.5$. The condition of maximum engine torque is used only as an example and does not restrict the general applicability of the underlying concepts. Other advantageous embodiments incorporate corresponding shift processes at lower levels of engine torque.

The time segment b represents the torque vs time in the beginning phase of the shift process. During this phase, the power-shift clutch is slowly being engaged. The start-up clutch remains engaged. The output torque, controlled by the amount of torque flowing through the power-shift clutch, is lowered to the torque level of the gear that is to be engaged. During the time segment c, the torque flowing through the power-shift clutch is raised to the level of the engine torque, so that the shift clutch sc1 becomes torque-free. With the torque levels matched, the gear can be disengaged during the time segment d. The phase of engine synchronization starts during the time segment e. The engine torque $M_{eng}$ is lowered to maximum drag torque, and the torque $M_{psc}$ of the power-shift clutch is regulated to a level where the resulting output torque takes on the amount that it will have after the completion of the shift. Expressed mathematically, the output torque at this point is $M_{out}=M_{out}^{after}$, and the torque of the power-shift clutch has to be set to $$M_{psc} = \frac{M_{eng} \times i_{sc2}}{i_{psc}}$$

During the time segment f, the power-shift clutch psc transmits to the output shaft an amount of torque that corresponds to the output torque following the shift process. At the same time, the transmission input is decelerated to the new synchronous rpm rate by the sum of the engine torque and the torque of the power-shift clutch. This is an advantageous way of shortening the synchronization time interval. During the time interval g, shortly before reaching the target rpm rate, the engine torque is raised to the torque level desired by the driver (maximum engine torque), and the torque of the power-shift clutch is lowered to the same level. This ensures on the one hand that the shift clutch sc2 of the new gear is torque-free and on the other hand, the engine acceleration rate is reduced to at least near-zero level or the acceleration rates of the two shift clutch halves are nearly matched, so that the synchronous rpm rate can be attained more easily.

In the time segment h, the torque levels are matched and the targeted rpm rate has been attained. The shift clutch sc2 can be engaged, and the new gear is activated. The system makes the transition from frictional engagement with $M_{out}=i_{psc} \times M_{psc}$ to a combination of frictional and form-locking engagement $M_{out}=i_{psc} \times M_{psc}+M_{sc2}$. Because at this stage $M_{sc2}=0$, the transition is smooth. During the time segments i and j, the torque of the power-shift clutch is reduced to zero as rapidly as possible, and the torque transmitted to the output reaches the level of, e.g. $M_{out}=i_{sc2} \times M_{eng}=2$.

The foregoing gear-shift strategies describe up-shifts under traction where the start-up clutch remains engaged, as illustrated in the next-to-last graph of FIG. 26. The level of comfort during the phases of getting out of the old gear and getting into the new gear, respectively, requires a torque-free condition or matched rates of rpm acceleration at the point where the synchronous rpm rate of the respective shift clutch has been reached. If the shift is performed without power-shift clutch, this condition is met by reducing the engine torque.

If a power-shift clutch-is used, a transition takes place where the torque flow is changed over from the shift clutch to the power-shift clutch. With either strategy, the quality of the torque regulation is the deciding factor for the comfort level. The level of comfort can be increased by using the start-up clutch during the phases of getting out of the old and into the new gear, as shown in the last graph of FIG. 26.

Figure 27:
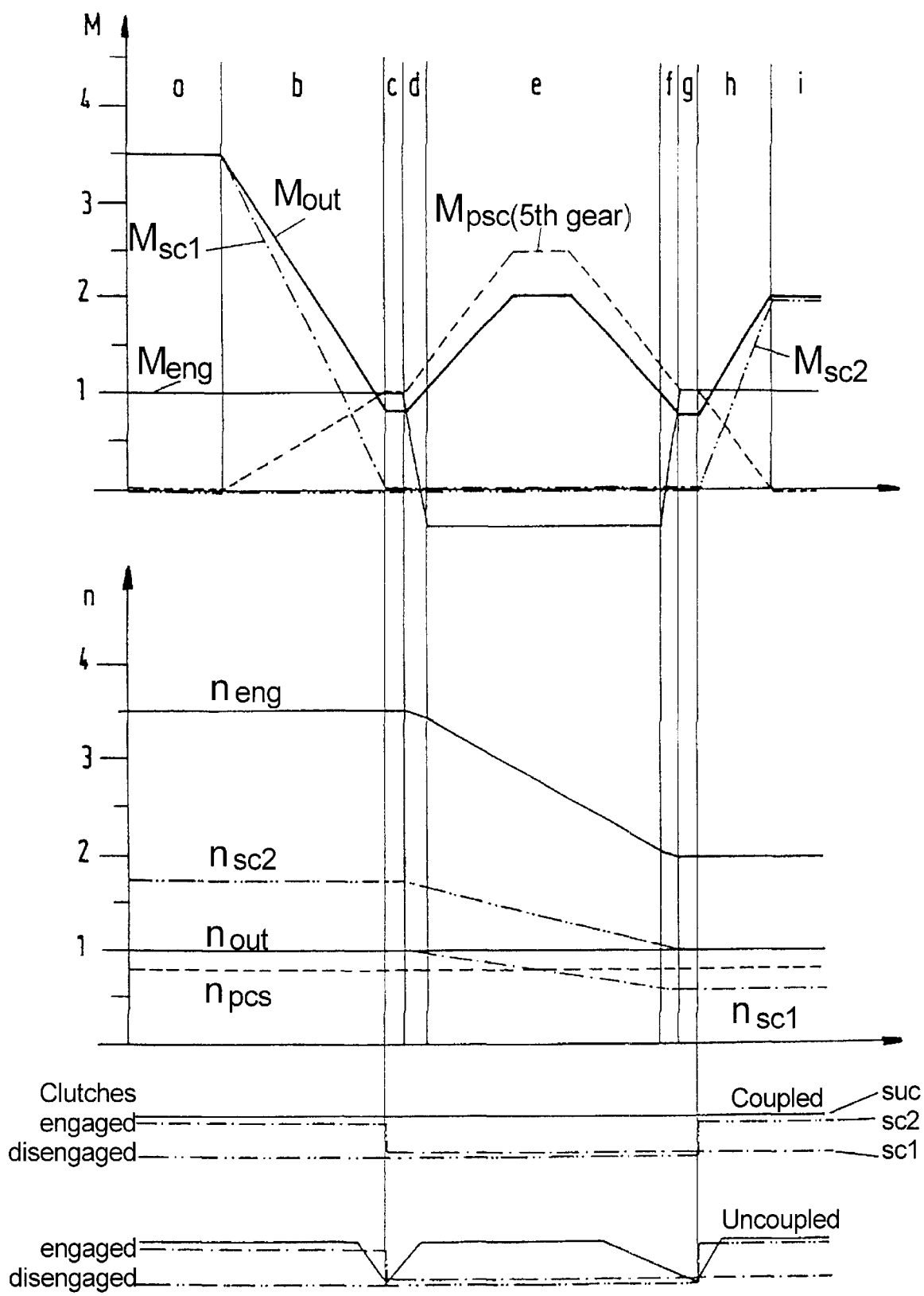

FIG. 27 shows a version of the invention where the torque varies gently over time. The control of the torque during the synchronization phase offers the possibility of actively influencing the comfort level of the shift process. The time profile of the torque levels for an up-shift under traction with full load, as illustrated in FIG. 27, represents an alternative possibility in accordance with the present invention, whereby a comfortable gear-change without abrupt torque changes is accomplished. The time profiles of the individual phases are nearly identical with the strategy described above in the context of FIG. 26. The essential difference lies in the slower and non-abrupt increase of the torque of the power-shift clutch psc which, in the present embodiment, is regulated in two or more steps and, in accordance with FIG. 27, is varied at a linear or other monotonic rate. The increase is spread over a longer time interval, resulting in a more gentle gear-shifting experience.

Figure 28:
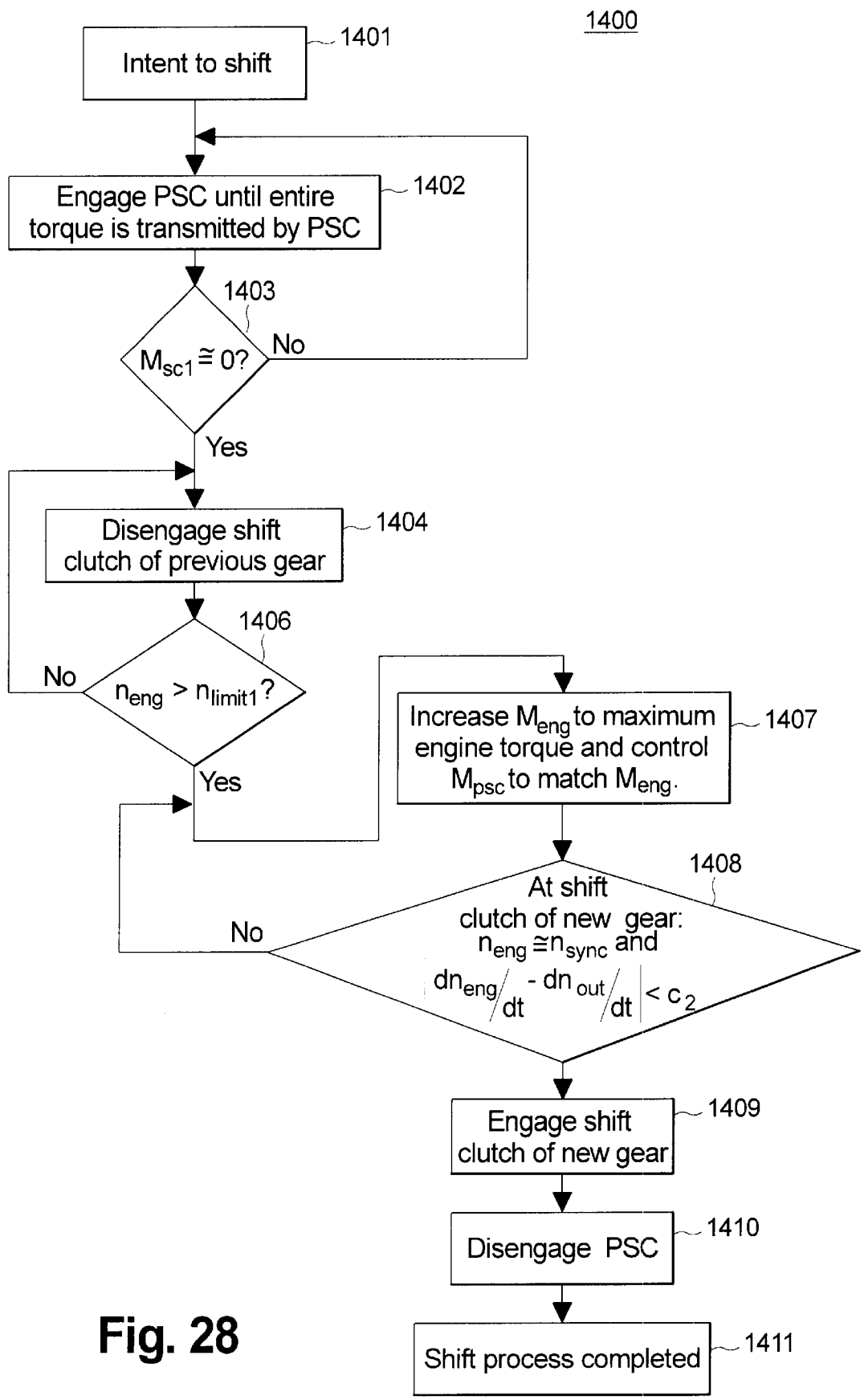
FIG. 28 represents a block diagram.

FIG. 28 represents a block diagram 1400 illustrating an up-shift under traction, e.g., at full load. The shift process is started in block 1401 by a signal that indicates an intent to shift gears. The signal can come, e.g., from an operating element that is actuated by the driver of the vehicle, or from an automated control program. In block 1402, the power-shift clutch psc or its torque-transmitting capacity is engaged to the extent that the currently present amount of engine torque can be transmitted entirely through the power-shift clutch. Block 1403 represents a test whether the torque $M_{sc1}$ of the shift clutch sc1 has fallen to a near-zero level. If this is the case, the program flow continues to block 1404 where the shift clutch sc1 is disengaged. Else, the program flow loops back to block 1402 where the engagement of the power-shift clutch is increased further.

In block 1405, the engine torque is lowered. Preferably, the engine torque is brought down to the maximum drag-torque level, or another reduced level. Likewise, the torque $M_{psc}$ flowing through the power-shift clutch is set according to a gear-shift strategy. Block 1406 represents a test whether the engine rpm rate $n_{eng}$ is greater than a pre-settable limit value. If this condition is not met, then the program flow loops back to block 1405. If the condition is met, the process continues in block 1407 where the engine torque $M_{eng}$ is raised to a higher level, e.g., to the maximum level. Also in block 1407, the torque-transmitting capacity of the power-shift clutch is raised to a higher level, e.g., to the level of the engine torque. Block 1408 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant. If this condition is met, the program flow continues in block 1409 where the shift clutch of the new gear sc2 is engaged, proceeding to 1410 where the power-shift clutch is disengaged, and 1411 where the shift process is completed. If the test at 1408 is negative, the program loops back to block 1407.

Figure 29:
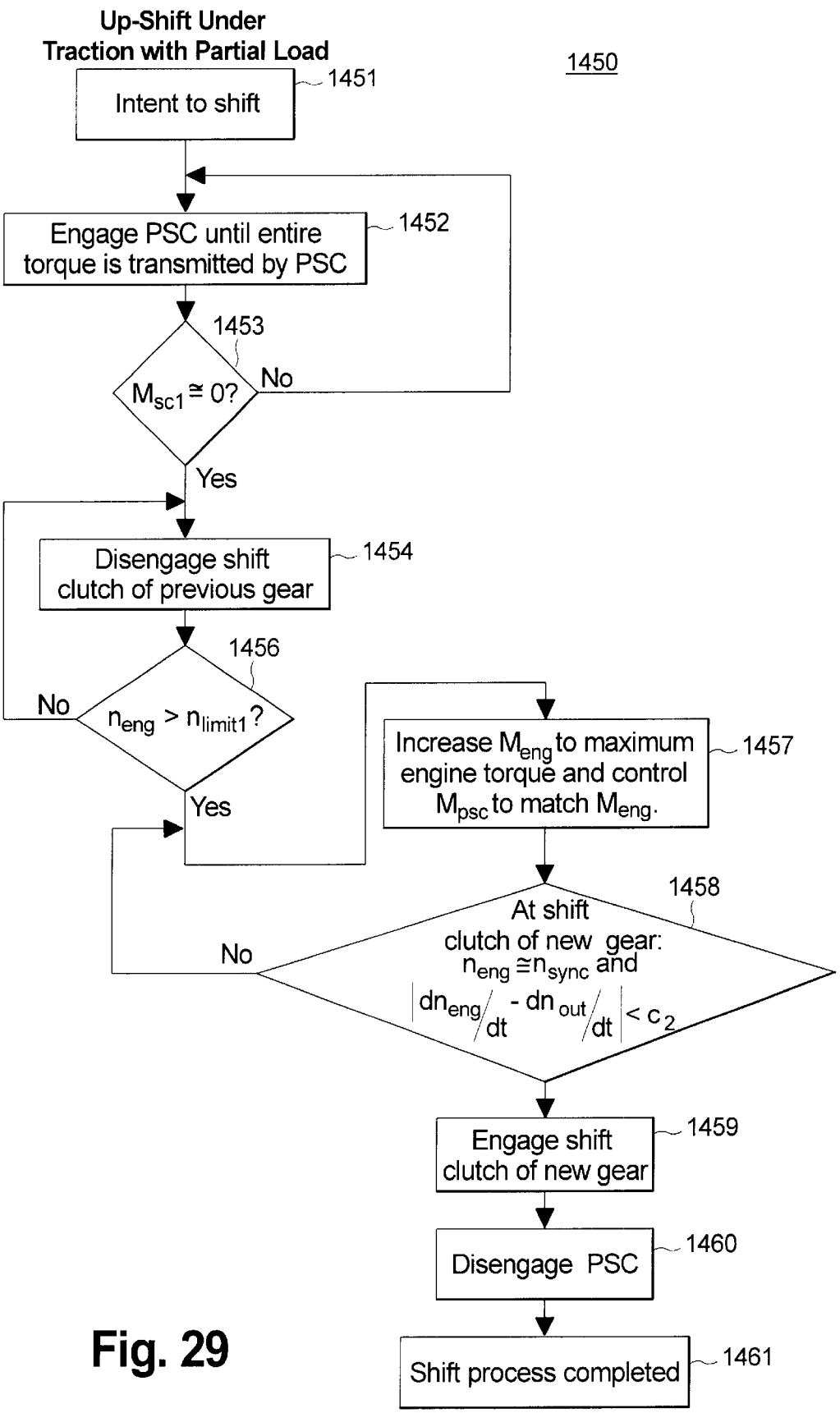
FIG. 29 represents a block diagram.

FIG. 29 represents a block diagram 1450 illustrating an up-shift under traction, e.g., at a partial load. The shift process is started in block 1451 by a signal that indicates an intent to shift gears. The signal can come, e.g., from an operating element that is actuated by the driver of the vehicle, or from an automated control program. In block 1452, the power-shift clutch psc or its torque-transmitting capacity is engaged to the extent that the currently present amount of engine torque can be transmitted entirely through the power-shift clutch. Block 1453 represents a test whether the torque $M_{sc1}$ of the shift clutch sc1 has fallen to a near-zero level. If this is the case, the program flow continues to block 1454 where the shift clutch sc1 is disengaged. Else, the program flow loops back to block 1452 where the engagement of the power-shift clutch is increased further. In block 1455, the engine torque is lowered. Preferably, the engine torque is brought down to the maximum drag-torque level, or another reduced level. Likewise, the torque $M_{psc}$ flowing through the power-shift clutch is set according to a gear-shift strategy. Block 1456 represents a test whether the engine rpm rate $n_{eng}$ is greater than a pre-settable limit value. If this condition is not met, then the program flow loops back to block 1455. If the condition is met, the process continues in block 1457 where the engine torque $M_{eng}$ is raised to a higher level. Also in block 1457, the torque-transmitting capacity of the power-shift clutch is raised to a higher level, e.g., to the level of the engine torque. Block 1458 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant. If this condition is met, the program flow continues in block 1459 where the shift clutch sc2 of the new gear is engaged, proceeding to 1460 where the power-shift clutch is disengaged, and 1461 where the shift process is completed. If the test at 1458 is negative, the program loops back to block 1457.

Following is a comparison of the time profiles of down-shifts under traction with and without the use of a power-shift clutch according to FIG. 18. FIG. 18 gives a simplified representation in that those gear levels and associated elements that are not needed for an understanding of the principles have been omitted. It goes without saying, that this does not restrict the general applicability of the concepts involved. In accordance with the invention, the synchronization can be assisted by an electro-mechanical energy converter such as an electric motor or starter/generator. The synchronization can also be aided by actuating a power-shift clutch in accordance with the invention. In the power-shift clutch, the invention provides a means to significantly shorten the time needed for synchronization and on the other hand to lessen the drop in traction during the synchronization phase. The time interval for synchronization can be controlled by way of the engine torque and the torque of the power-shift clutch.

Figure 30:
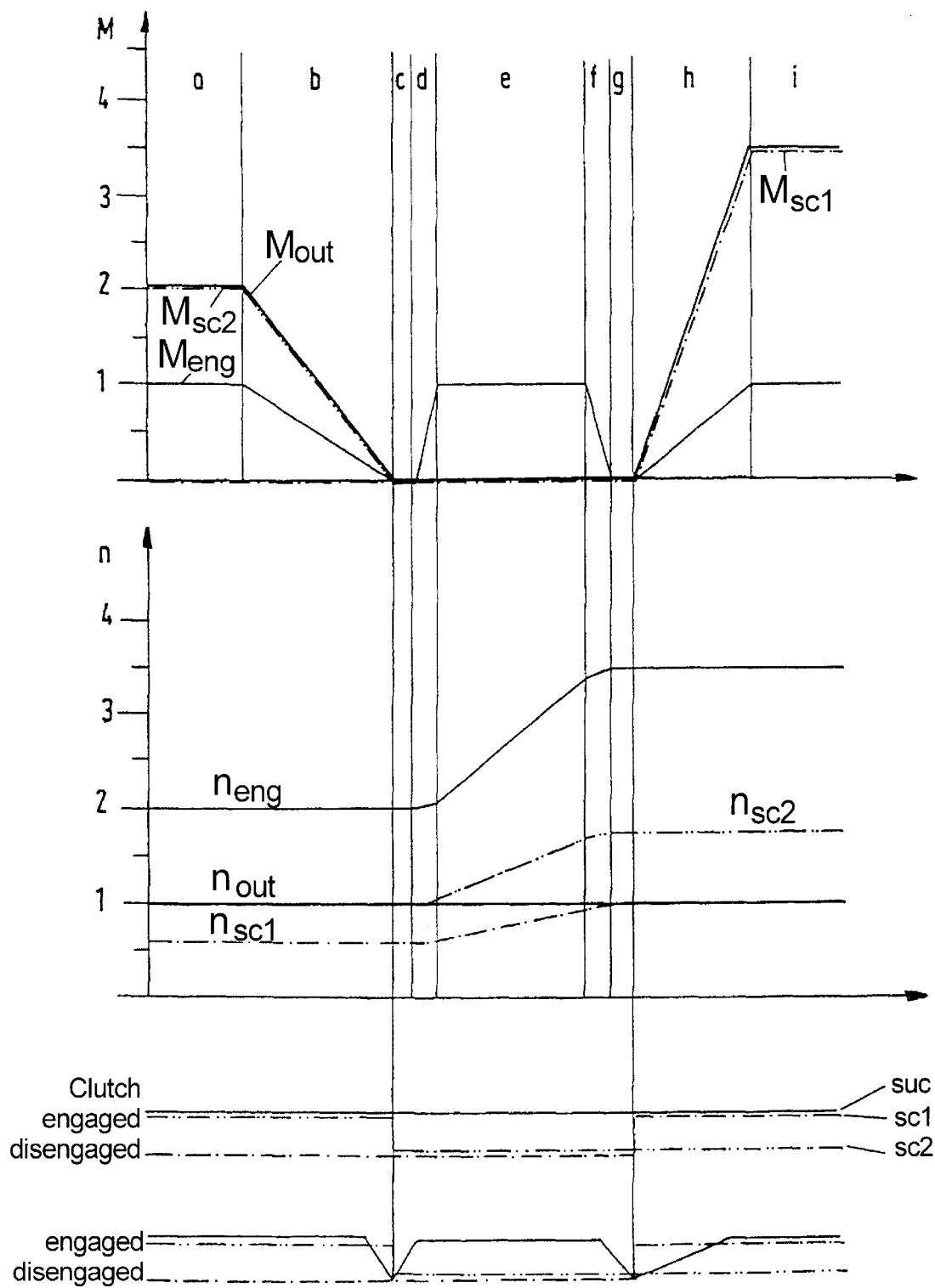
FIGS. 30 through 33 represent diagrams.

Based on the following drawing figures, the time profiles of down-shifts under traction with full load will be discussed. FIG. 30 illustrates the time sequence of a down-shift from second to first gear without the use of a power-shift clutch psc, at maximum engine torque $M_{eng}=1$. The graphs of FIG. 30 illustrate the time profiles of the torque levels, rpm rates and clutch engagement conditions for a down-shift under traction at full load, using the same subscript indices as above. The torque levels are standardized in relation to the maximum engine torque, and the rpm rates are standardized in relation to the output rpm rate.

Time Segment a represents the conditions prior to the start of the gear-shifting process. The engine torque is at its maximum level ($M_{eng}=1$ representing the standard level). Accordingly, the output torque with the currently still engaged gear is $M_{out}=M_{eng} \times i_{sc2}=2$. Time segment b represents the beginning phase of the gear-shifting process. The engine torque is reduced to zero to ensure that the current gear can be disengaged in a torque-free condition. The start-up clutch remains engaged while the current gear is being disengaged. Because of the continuing form-locking engagement between the engine and the output shaft (as long as the shift clutch sc2 remains engaged), the output torque $M_{out}=M_{eng} \times i_{sc2}$ drops together with the engine torque. In the time segment c, as the engine torque has dropped to zero, the current gear, i.e., second gear, can be disengaged and the synchronization phase can begin. As there is no longer a form-locking engagement between engine and output shaft, the rpm rate $n_{eng}$ of the engine can be controlled through the engine torque $M_{eng}$ alone by means of the engine control. In order to achieve a short synchronization time, the engine torque can be raised to its maximum level.

Next, in the time segment e, the engine torque is at maximum level and accelerates the transmission input shaft to the synchronous rpm rate of the new gear that is to be engaged. With this strategy, there is no torque available for accelerating the vehicle during the synchronization phase. Consequently, there will be a time gap in the tractive force. In the time segment f, the engine rpm rate, and thus the transmission input rpm rate, has risen to the target rpm rate of the gear to be engaged. The engine torque is cut back. The lowering of the engine torque can be initiated already before or at the point where the target rpm rate of the transmission input shaft has been reached. This reduces the rotary acceleration of the engine, making it easier to bring the rpm rate within synchronization range in order to engage the new gear.

In the time segment g, as soon as the rpm rates or rotary accelerations of the input and output of the shift clutch sc1 are equal, the shift clutch sc1 is engaged and the form-locking engagement between the engine and the output shaft is thereby reestablished. During the time segments h and i, the engine torque is raised to the torque level desired by the driver in terms of the degree of gas-pedal depression. The output torque will now follow the engine torque according to $M_{out}=M_{eng} \times i_{sc1}$.

Figure 31:
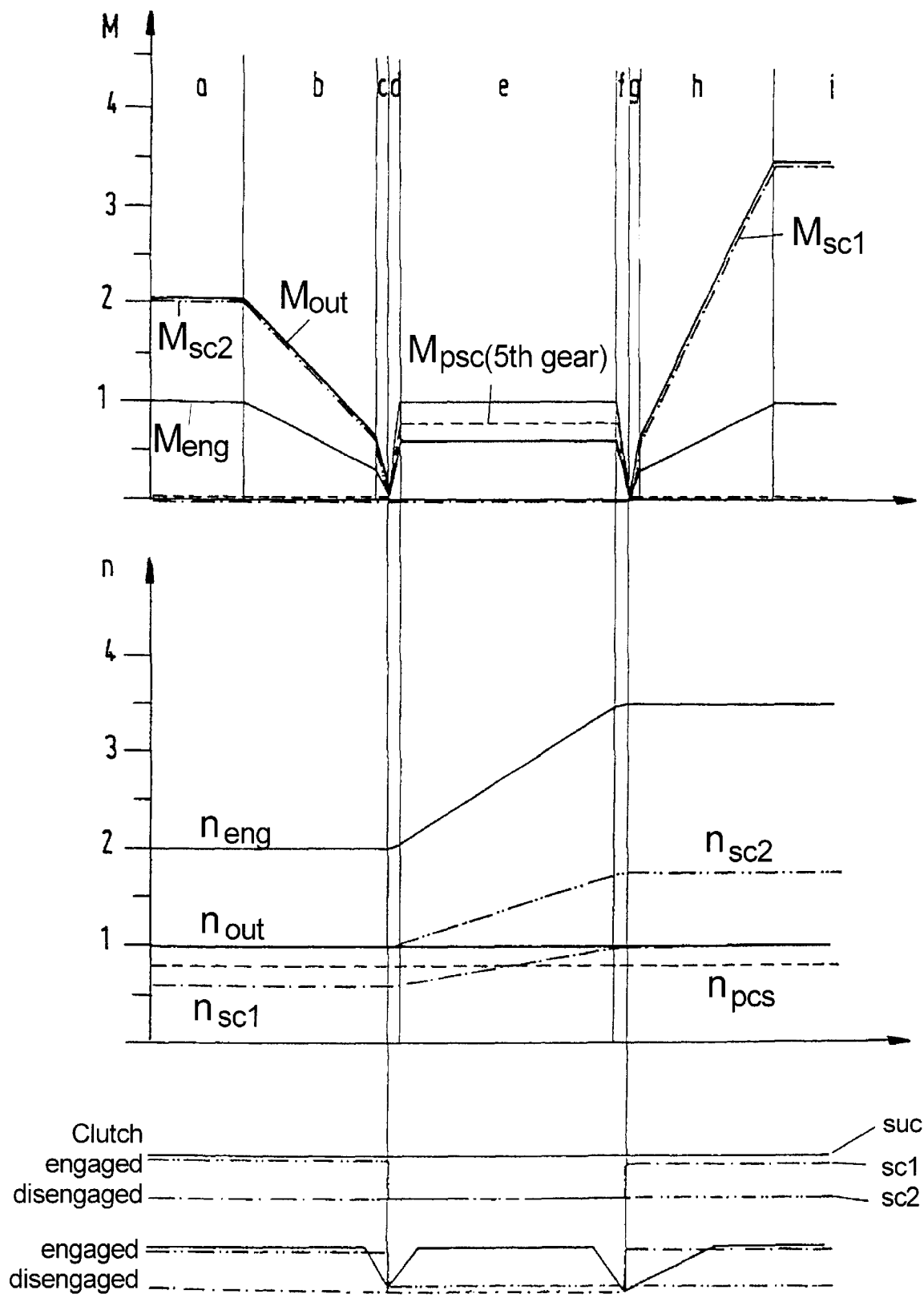

FIG. 31 illustrates the time sequence of a down-shift under traction from second to first gear with a power-shift clutch psc arranged to work in fifth gear, at maximum engine torque $M_{eng}=1$. The diagram illustrates how the transmission behaves in a down-shift if the gap in traction during the synchronization phase is partially reduced by using a power-shift clutch. By regulating the engine torque, e.g. by causing the engine control to increase or reduce the engine torque level or engine rpm rate, combined with a simultaneous control of the amount of torque flowing through the power-shift clutch, it becomes possible to vary the torque in an advantageous manner also in the case of a down-shift under traction with full load. This can be accomplished through different gear-shifting strategies.

FIG. 31 illustrates a strategy or a time profile of a shift process with a short lapse in the tractive force.

Time Segment a in FIG. 31 represents the conditions prior to the start of the gear-shifting process. The engine torque is at its maximum level $M_{eng}=1$. During the time segment b, the shift process is initiated by lowering the engine torque to the level that can be provided by the power-shift clutch during the synchronization phase. The start-up clutch remains engaged as shown in the next-to-last graph of FIG. 31. In the time segment c, the shift clutch sc2 is set torque-free, or the rotary acceleration rates between input and output of sc2 are equalized, in order to enable the disengagement of the current gear. With the strategy illustrated in FIG. 31, this is accomplished by cutting the engine torque back to zero as quickly as possible. As soon as the engine torque is at zero, the shift clutch sc2 can be disengaged. The output torque under this strategy follows the engine torque and thus also passes through a state of zero torque. The synchronization phase of the transmission begins during the time segments d and e. Because the transmission input shaft has to be accelerated to a higher rpm rate, the engine torque is raised to the maximum amount if needed. In order to provide in parallel an amount of torque for accelerating the vehicle, the power-shift clutch psc is partially engaged. Accordingly, the torque provided by the engine is used in part to accelerate the engine itself together with the input shaft of the transmission and in part to accelerate the vehicle. The apportioning of the torque in this process is regulated by way of the amount of torque that is allowed to flow through the power-shift clutch. In the time segments f and g, the engine torque and the torque conducted through the power-shift clutch are cut back to zero at least briefly before the synchronous rpm rate is reached. This causes a lapse in engine acceleration, so that the synchronous rpm range can be matched more easily. Because during the synchronization phase, the output torque follows the torque transmitted by the power-shift clutch, the vehicle acceleration at this point also passes through a state of zero acceleration. When the synchronous rpm rate and the torque-free state of the shift clutch sc1 have been attained, the new gear can be engaged. Subsequently, the engine torque is raised as rapidly as possible, so that the resulting output torque corresponds to the torque level during the synchronization phase. After the new gear is engaged, the engine torque is raised during the time segments h and i according to the torque level desired by the driver, at which point the shift process is completed.

Figure 32:
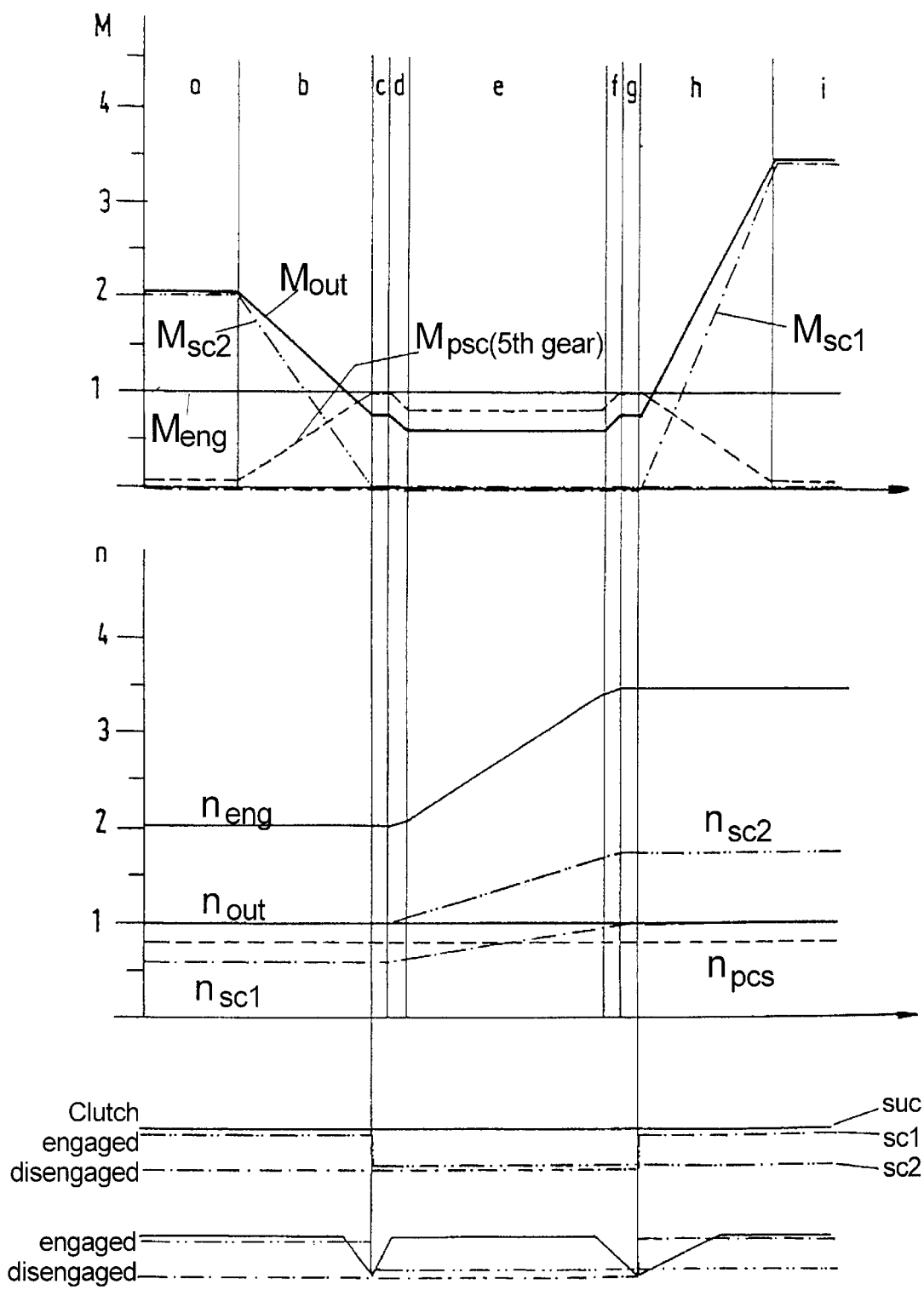

FIG. 32 illustrates the time profile of a down-shift under traction where the engine does not assist in the shifting process. This is a down-shift under traction that can be performed entirely without performing controlled variations of the engine torque. Although the engine torque remains at the maximum level, an unwanted revving up of the engine can be avoided. The time segment a represents the conditions before the shift process is started. At this time, the engine torque is at its maximum level ($M_{eng}=1$). The gear-changing process begins during the time segment b. The power-shift clutch is brought into engagement. The start-up clutch remains engaged during the gear-changing process. As the torque at the power-shift clutch increases, the torque at the shift clutch sc2 is reduced. At the point where the entire torque flows through the power-shift clutch, the shift clutch sc2 is torque-free. This state is reached in the time segment c. Accordingly, the previously used gear can be disengaged. The output torque at this point has dropped to $M_{out}=M_{engine} \times i_{psc}$.

The process continues through the time segments d and e. Because the process is a down-shift under traction, the transmission input shaft has to be accelerated to a higher rpm rate before the new gear can be engaged. The difference between the engine torque and the torque transmitted by the power-shift clutch is available to accelerate the engine to a higher rpm rate. The torque of the power-shift clutch is appropriately reduced to allow the engine to accelerate. The output torque in this phase follows the torque of the power-shift clutch. Thus, the length of the synchronization interval can be controlled by way of the torque level of the power-shift clutch. During the time segments f and g, the torque of the power-shift clutch is raised to the maximum engine torque level at least briefly before the target rpm rate has been reached. This causes the engine acceleration to drop to zero, so that the rpm range where the new gear can be engaged is easier to match. The criterion of matching torque levels is an advantageous feature for engaging the new gear without an abrupt change in the torque. After the target rpm rate has been reached and the torques are matched, the shift clutch sc1 is engaged, and the form-locking connection is reestablished. During the time segment h, the torque of the power-shift clutch is lowered, so that the function of transmitting the output torque is passed in a smooth transition from the power-shift clutch to the shift clutch sc1. The time segment i represents the state after the shift process has been completed. The output torque at this point equals $M_{out}=i_{sc1} \times M_{engine}$.

Figure 33:
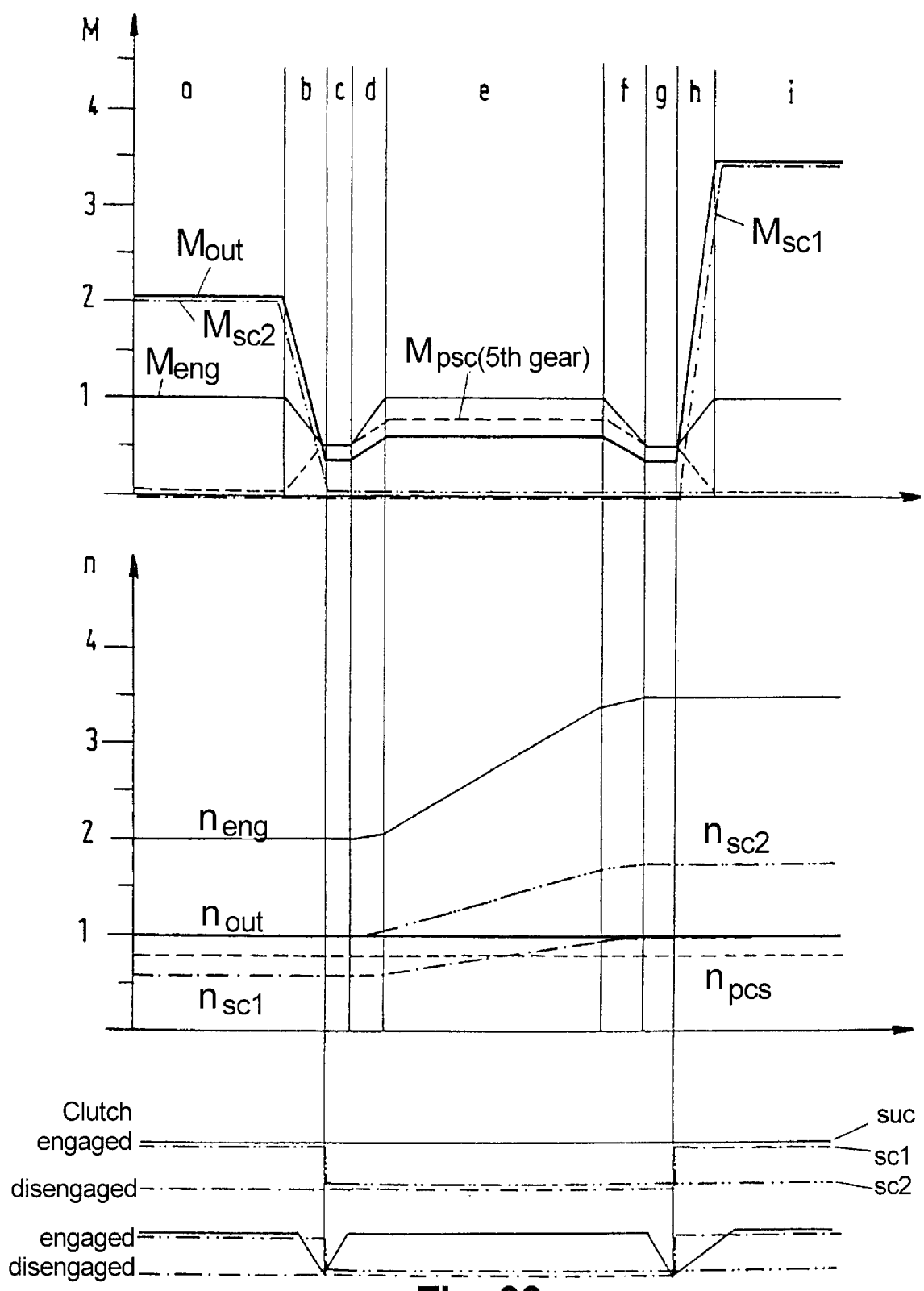

FIG. 33 illustrates the time profile of a shift process where a control of the engine torque is combined with a control of the torque transmitted by the power-shift clutch. The shift phases in the transmission of this embodiment are preferably performed when the respective shift clutches are torque-free for the steps of disengaging the previously used gear and engaging the new gear. The torque-free condition can be assured through procedures in accordance with the invention. The prerequisite for a torque-free state of the shift clutch is that the engine torque and the torque of the power-shift clutch are at the same level. This is also the level that determines the output torque of the vehicle during the respective phases of the shift process.

FIG. 33 shows the time sequence of a down-shift under traction in which the engine torque as well as the torque of the power-shift clutch are controlled with the objective of realizing the torque-free condition. According to the invention, the magnitude of the matching torques is selectable within a wide range. The torque levels in the individual time segments correspond to the previously described versions of a down-shift under traction with the use of the power-shift clutch. The difference lies, among other things, in the fact that the torque of the power-shift clutch in the middle time segment e is raised in comparison to the other time segments, in contrast to FIG. 32 where the torque of the power-shift clutch is lowered slightly during the corresponding time segment. The use of a power-shift clutch in a down-shift under traction can make the shift process more comfortable, because a lapse in the tractive force during the synchronization phase can be at least partially compensated in a full-load condition and completely compensated in a partial-load condition. With the procedure of FIG. 33, because the engine torque is used on the one hand to accelerate the transmission input shaft and on the other hand to accelerate the vehicle, the synchronization time interval is longer. However, the synchronization time can be controlled through the use of the power-shift clutch.

With the additional use of the start-up clutch, as illustrated in the last graph at the bottom of FIG. 33, it is possible to eliminate jolts of the torque which could occur, e.g., due to the width of the tolerance range in the control of the engine torque during the shift process.

Figure 34:
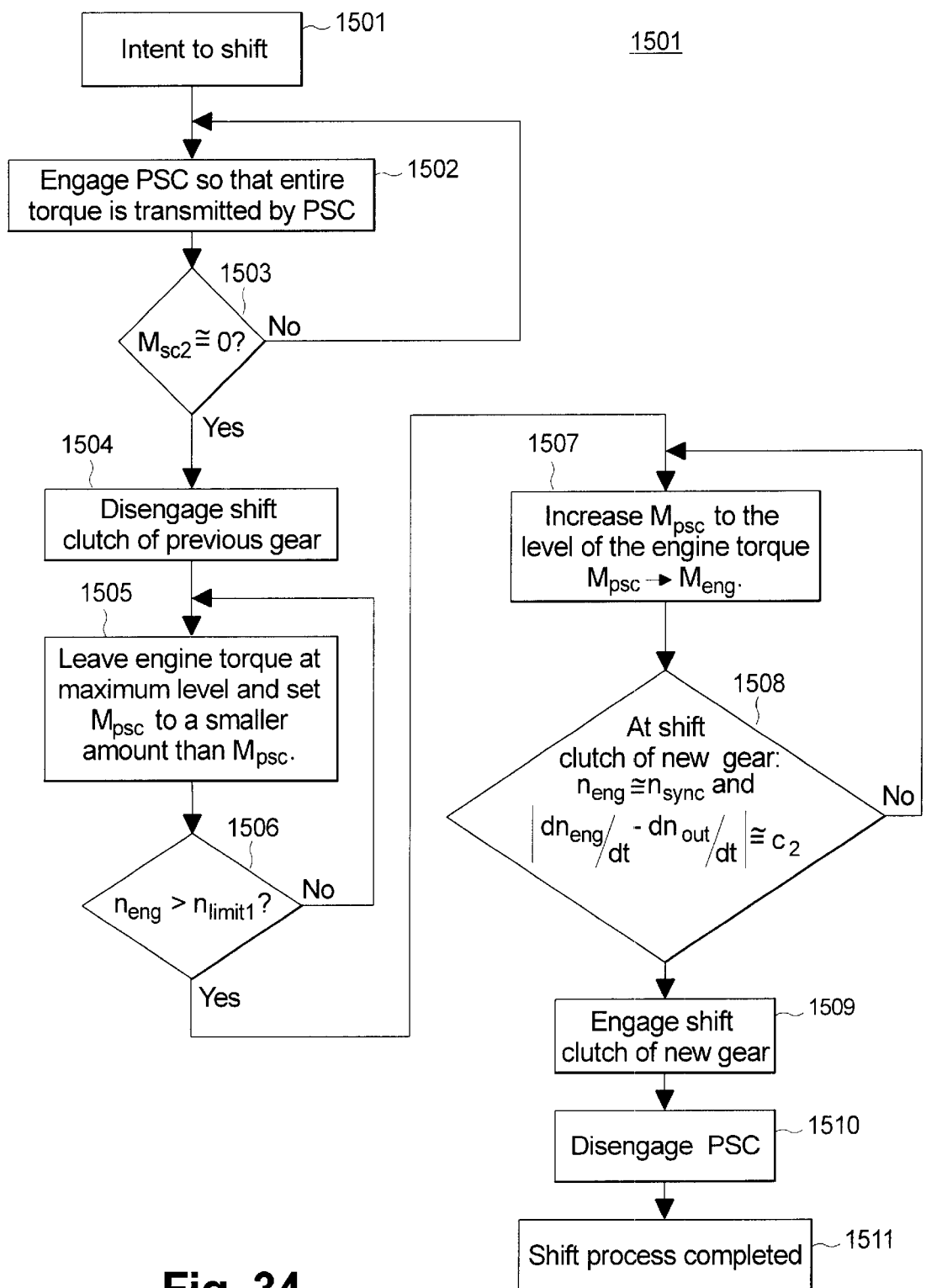
FIG. 34 represents a block diagram.

FIG. 34 represents a block diagram 1500 illustrating a down-shift under traction, e.g., at full load. The shift process is started in block 1501 by a signal that indicates an intent to shift gears. The signal can come, e.g., from an operating element that is actuated by the driver of the vehicle, or from an automated control program. In block 1502, the power-shift clutch psc is engaged far enough, or its torque-transmitting capacity is raised to the extent that the currently present amount of engine torque can be transmitted entirely through the power-shift clutch. Block 1503 represents a test whether the torque $M_{sc2}$ of the shift clutch sc2 has fallen to a near-zero level. If this is the case, the program flow continues to block 1504 where the shift clutch sc2 is disengaged. Else, the program flow loops back to block 1502 where the engagement of the power-shift clutch is increased further.

In block 1505, the engine torque is kept at the maximum level. At the same time, the torque $M_{psc}$ flowing through the power-shift clutch is set to a lower level than the engine torque. Block 1506 represents a test whether the engine rpm rate $n_{eng}$ is greater than a pre-settable limit value. If this condition is not met, then the program flow loops back to block 1505. If the condition is met, the process continues in block 1507 where the torque of the power-shift clutch $M_{psc}$ is raised to a higher level, e.g., to the maximum level. Block 1508 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant $c_2$. If this condition is met, the program flow continues in block 1509 where the shift clutch of the new gear sc1 is engaged, proceeding to 1510 where the power-shift clutch is disengaged, and 1511 where the shift process is completed. If the test at 1508 is negative, the program loops back to block 1507.

Figure 35:
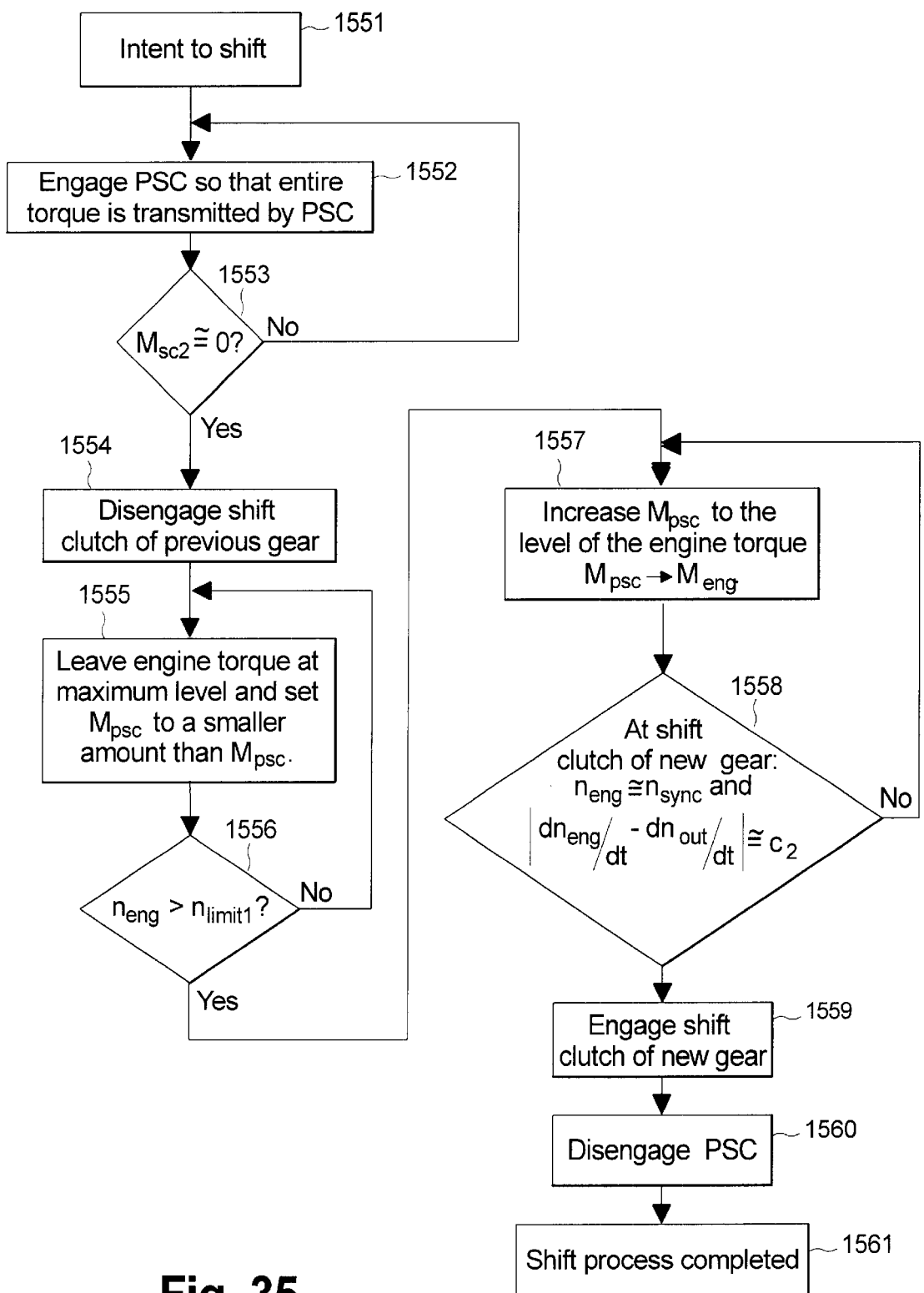
FIG. 35 represents a block diagram.

FIG. 35 represents a block diagram 1550 illustrating a down-shift under traction, e.g., at full load. The shift process is started in block 1551 by a signal that indicates an intent to shift gears. The signal can come, e.g., from an operating element that is actuated by the driver of the vehicle, or from an automated control program. In block 1552, the power-shift clutch psc or its torque-transmitting capacity is engaged to the extent that the currently present amount of engine torque can be transmitted entirely through the power-shift clutch. Block 1553 represents a test whether the torque $M_{sc2}$ of the shift clutch sc2 has fallen to a near-zero level. If this is the case, the program flow continues to block 1554 where the shift clutch sc2 is disengaged. Else, the program flow loops back to block 1552 where the engagement of the power-shift clutch is increased further.

In block 1555, the engine torque is kept at the maximum level. At the same time, the torque $M_{psc}$ flowing through the power-shift clutch is set to a lower level than the engine torque. Block 1556 represents a test whether the engine rpm rate $n_{eng}$ is greater than a pre-settable limit value $n_{limit\ 1}$. If this condition is not met, then the program flow loops back to block 1555. If the condition is met, the process continues in block 1557 where the engine torque $M_{eng}$ is raised to a higher level, e.g., to the maximum level. Block 1558 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant $c_2$. If this condition is met, the program flow continues in block 1559 where the shift clutch of the new gear sc1 is engaged, proceeding to 1560 where the power-shift clutch is disengaged, and 1561 where the shift process is completed. If the test at 1558 is negative, the program loops back to block 1557.

Following is a discussion of the time profiles of down-shifts in a reverse-torque (drag) condition. In this type of shift process, the use of a power-shift clutch only makes sense, if a power-shift clutch (or possibly a second power-shift clutch) is arranged to work at the lowest gear of the transmission. As before, shift processes with and without the use of a power-shift clutch will be compared.

Figure 36:
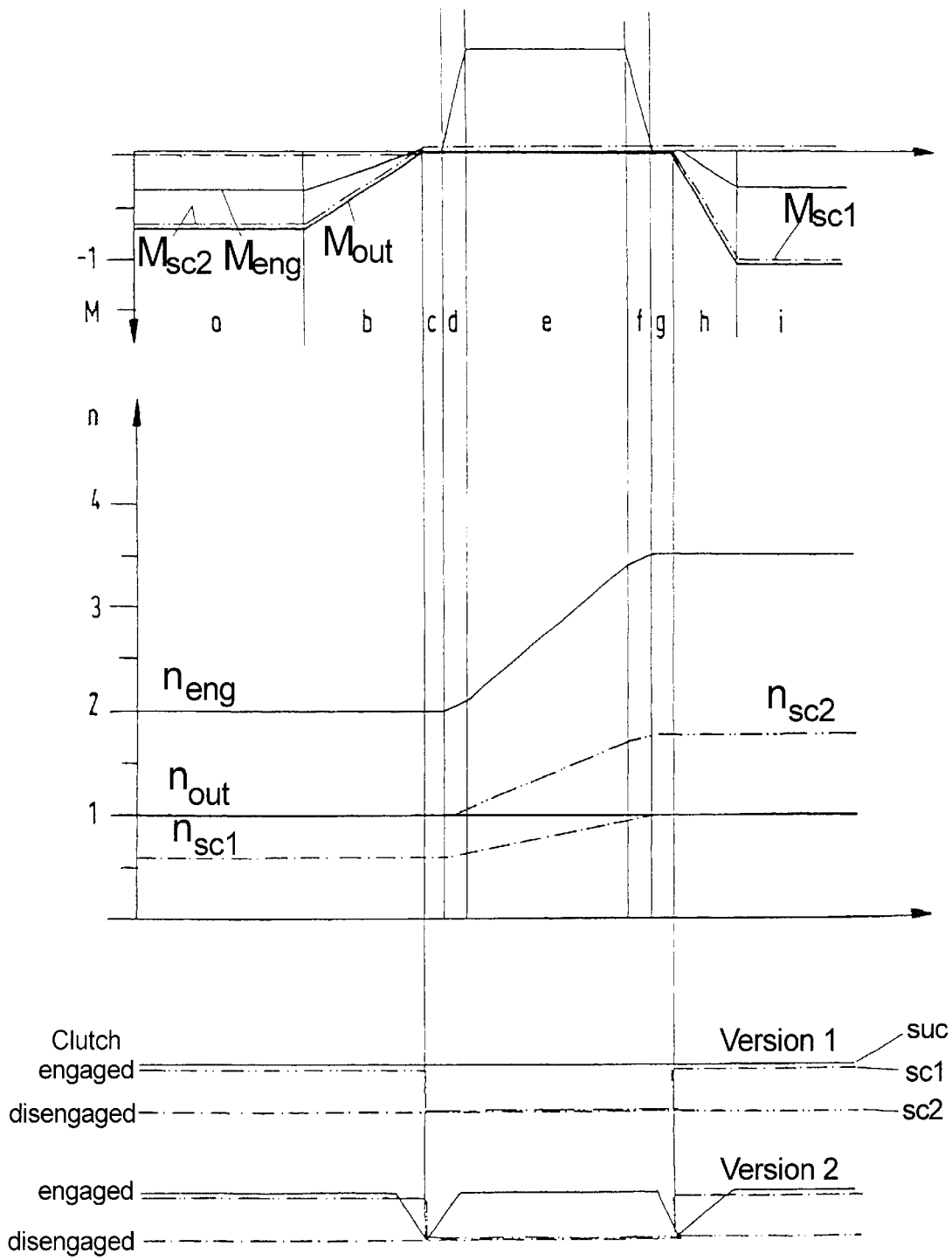
FIGS. 36 through 39 represent diagrams.

FIG. 36 illustrates the time sequence of a down-shift under a drag condition from second to first gear. Time segment a represents the conditions prior to the start of the gear-shifting process. The engine is in drag mode, providing its maximum drag torque in the order of 30 Nm, depending on the vehicle, for the deceleration or braking of the vehicle. The shift clutch sc2 is engaged and transmits the engine torque to the output shaft. Time segment b represents the beginning phase of the gear-shifting process. The engine torque is raised from its negative level to zero to ensure that the current gear can be disengaged in a torque-free condition. Because of the continuing form-locking engagement between the engine and the output shaft (the start-up clutch remains engaged), the output torque follows the engine torque. In the time segment c, the shift clutch of the current gear is torque-free and can thus be taken out of engagement. The time segments d and e represent the beginning of the synchronization phase. The engine torque is raised to its maximum level as rapidly as possible in order to accelerate the transmission input shaft to the new synchronous rpm rate. No engine torque is transmitted to the output shaft during this time period, i.e., there is a lapse in the tractive force.

In the time segment f, shortly before reaching the target rpm rate, the engine torque is cut back to allow a comfortable engagement of the shift clutch sc1 at matched rpm rates and in a torque-free condition or with matched rotary accelerations. In the time segment g, the engine torque is reduced to zero and the rpm rates are matched. The shift clutch sc1 can now be engaged. In the time segments h and i, the engine returns to a reverse-torque condition. The output torque is now determined by the engine torque and the ratio of the newly engaged gear.

By using the start-up clutch, the gear-shifting can be made more comfortable during the phases of getting out of the old gear and getting into the new gear. The clutch is taken out of engagement during the cut-back in engine torque and re-engaged after the previous gear has been uncoupled and the new gear has been engaged. In accordance with the invention, this procedure provides a torque-free condition for actuating the shift clutches and thus prevents abrupt changes of the torque which could make the shift process uncomfortable and could damage the transmission.

Following is a description of a down-shift in drag mode from second to first gear. It will be shown how, with the use of a power-shift clutch and by following the inventive shift strategy, a down-shift in drag mode can be performed comfortably and entirely without a lapse in traction. To achieve this purpose, it is advantageous to provide a power-shift clutch (or, possibly, a second power-shift clutch) at the lowest gear or at a low gear of the transmission. As with the previously described shift processes, down-shifts in drag mode can likewise be actively influenced by controlling the engine torque and the amount of torque flowing through the power-shift clutch, so that different gear-shifting strategies can be implemented.

Figure 37:
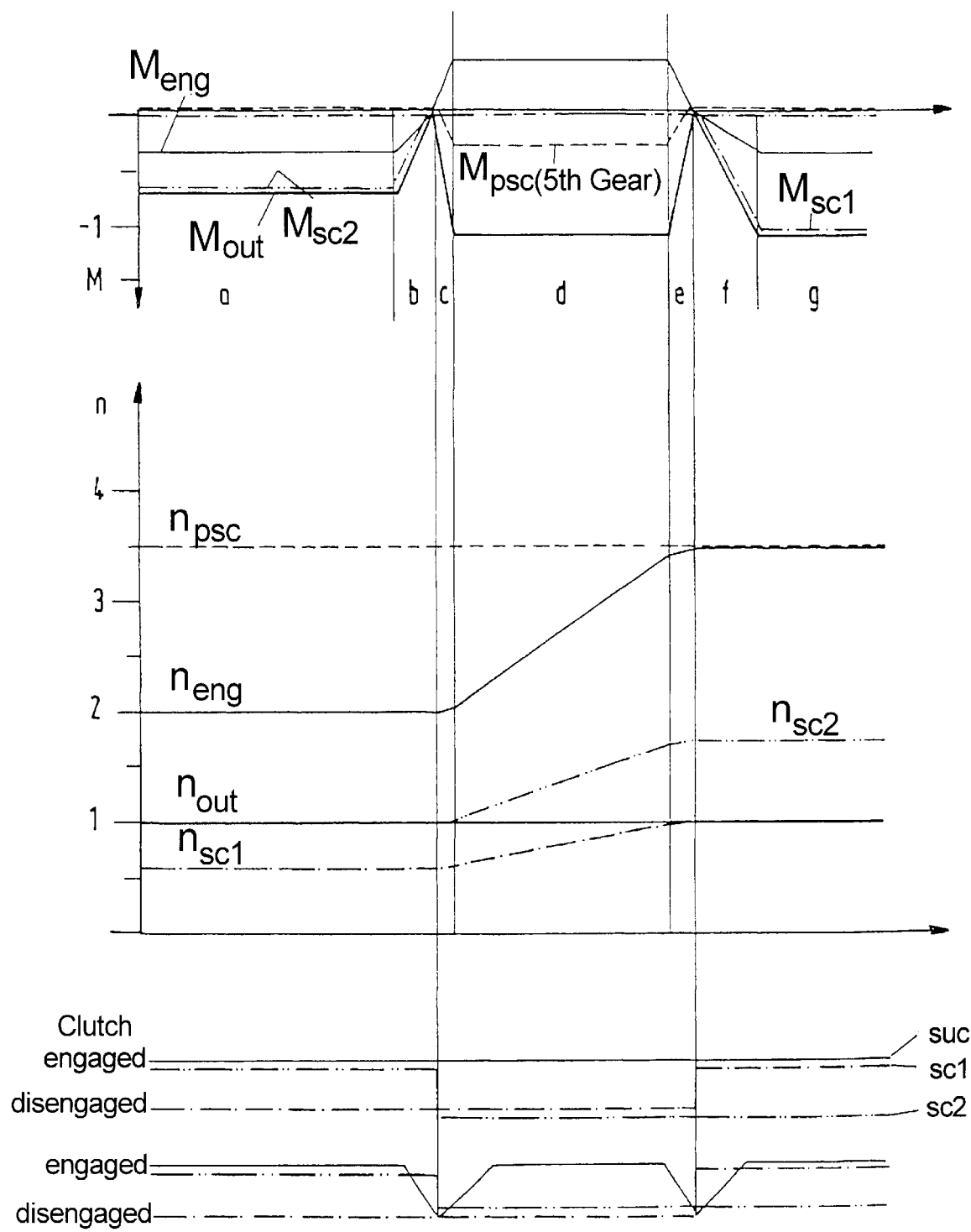

FIG. 37 represents the time profile for a controlled shift with a quick lapse of the load. Time segment a represents the condition prior to the gear-changing process. The engine is in a reverse-torque condition and provides its maximum drag torque for decelerating or braking the vehicle. The shift clutch sc2 is engaged and transmits the engine torque to the output shaft. The gear-shifting process is initiated in time segment b. To enable the currently engaged gear to be uncoupled, the engine torque is raised to zero from its negative level. When the zero-torque condition has been attained, the current gear is disengaged. The output torque follows the engine torque and, likewise, goes to zero. Because the transmission input has to be accelerated to a higher rpm rate, the power-shift clutch is engaged during the time segments c and d, whereby the engine and the transmission input shaft are raised to a higher rpm rate. The torque transmitted by the power-shift clutch is set in accordance with the output torque that will exist after the new gear has been engaged. To accomplish this purpose, the power-shift clutch is brought into complete engagement, because it is arranged at the first forward gear of the transmission.

In the time segments e and f, before reaching the synchronous rpm rate, the power-shift clutch is disengaged, which causes the engine torque as well as the output torque to drop back to zero. Engine acceleration is reduced to zero, or the rotary acceleration rates are matched in order to meet the synchronous rpm range more easily. When synchronism has been attained and the engine torque has dropped to zero, the new gear can be connected by engaging the shift clutch sc1. Subsequently, the engine reverts to a drag state. The magnitude of the output torque is determined by the new gear ratio. At the time segment g, the gear-changing process is completed.

Figure 38:
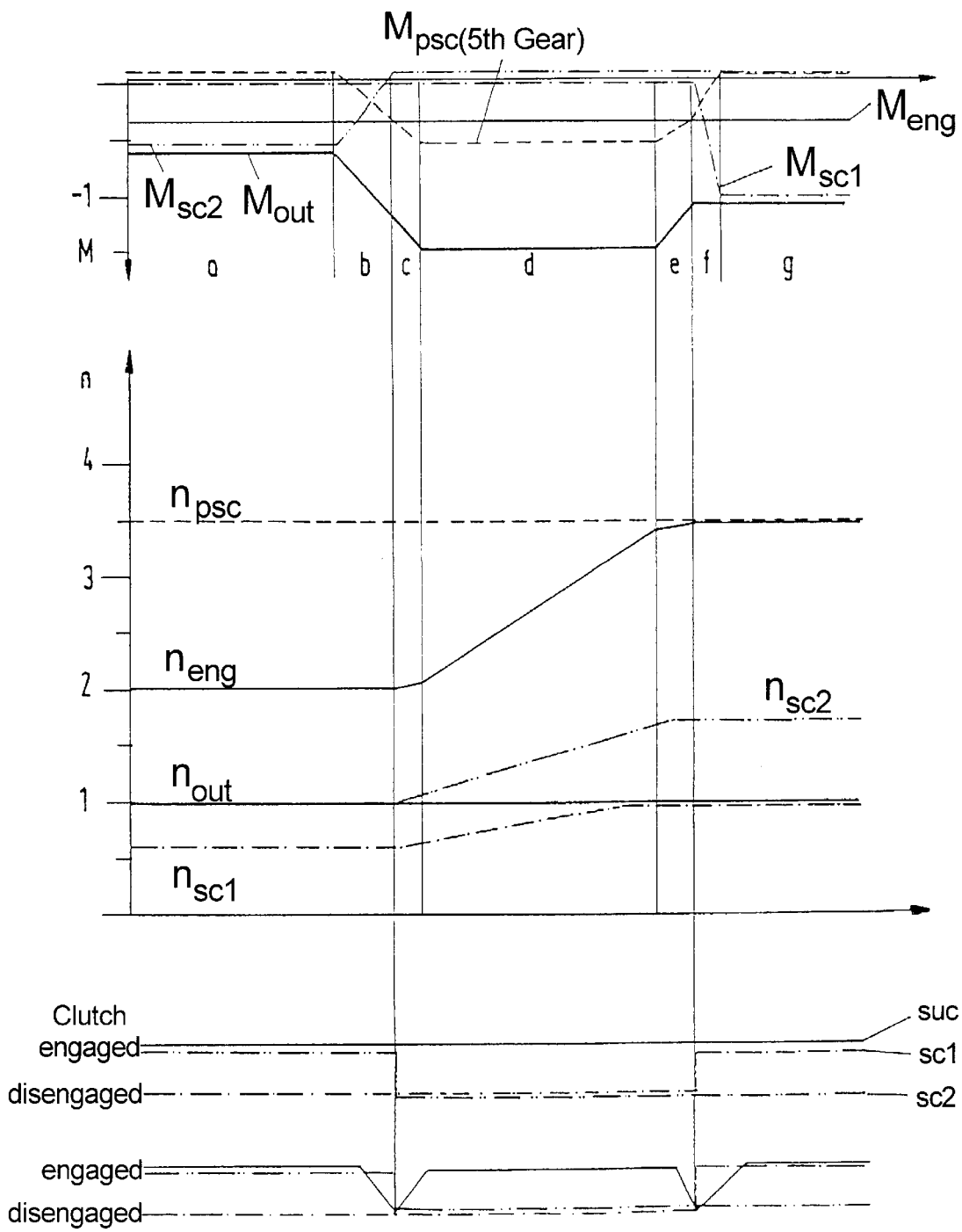

FIG. 38 illustrates a time profile of a gear-shifting process where the gaps in traction are completely closed without assistance by the engine. With an appropriate strategy for down-shifting in drag mode, the lapse in traction during the synchronization phase can be almost completely avoided, if a power-shift clutch is provided at the first gear. If the power-shift clutch is at another gear, the interruption of the tractive force can be at least partially reduced. Following is a discussion of the phases of a gear-changing strategy based on the controlled use of the power-shift clutch. The engine remains at maximum reverse torque.

Time Segment a represents the condition prior to the gear-changing process. The engine is in drag mode and provides its maximum drag torque for decelerating or braking the vehicle. The shift clutch sc2 is engaged and transmits the engine torque to the output shaft. The gear-shifting process is initiated in time segment b. The power-shift clutch that is located at the first gear is brought into engagement. As the amount of torque increases that is transmitted by the power-shift clutch, the torque at the shift clutch sc2 decreases.

At the point where the power-shift clutch transmits 100% of the engine torque, the shift clutch becomes torque-free, allowing the previously engaged gear to be uncoupled. The output torque drops to the level that it will have after the gear-shifting process. During the time segments c and d, the engine is raised to a higher rpm rate to enable the engagement of the new gear. Because this strategy does not use the engine as an active source of acceleration, the kinetic energy of the vehicle is employed to accelerate the engine. The engagement of the power-shift clutch is further increased. As a consequence, the output torque continues to drop. The engine and the transmission input shaft are accelerated by the difference between the engine torque and the torque of the power-shift clutch. In the time segments e and f, the synchronous rpm rate is reached, and the torque of the power-shift clutch is raised to the torque level of the engine. Because the power-shift clutch is arranged at the first gear, which is the gear to be subsequently engaged, the output torque comes to a level corresponding to the output torque following the shift from second to first gear. Subsequently, the power-shift clutch can remain engaged, or the shift clutch of the first gear is engaged, followed by the disengagement of the power-shift clutch. In the latter case, the torque flow is taken over by the shift clutch sc1.

Figure 39:
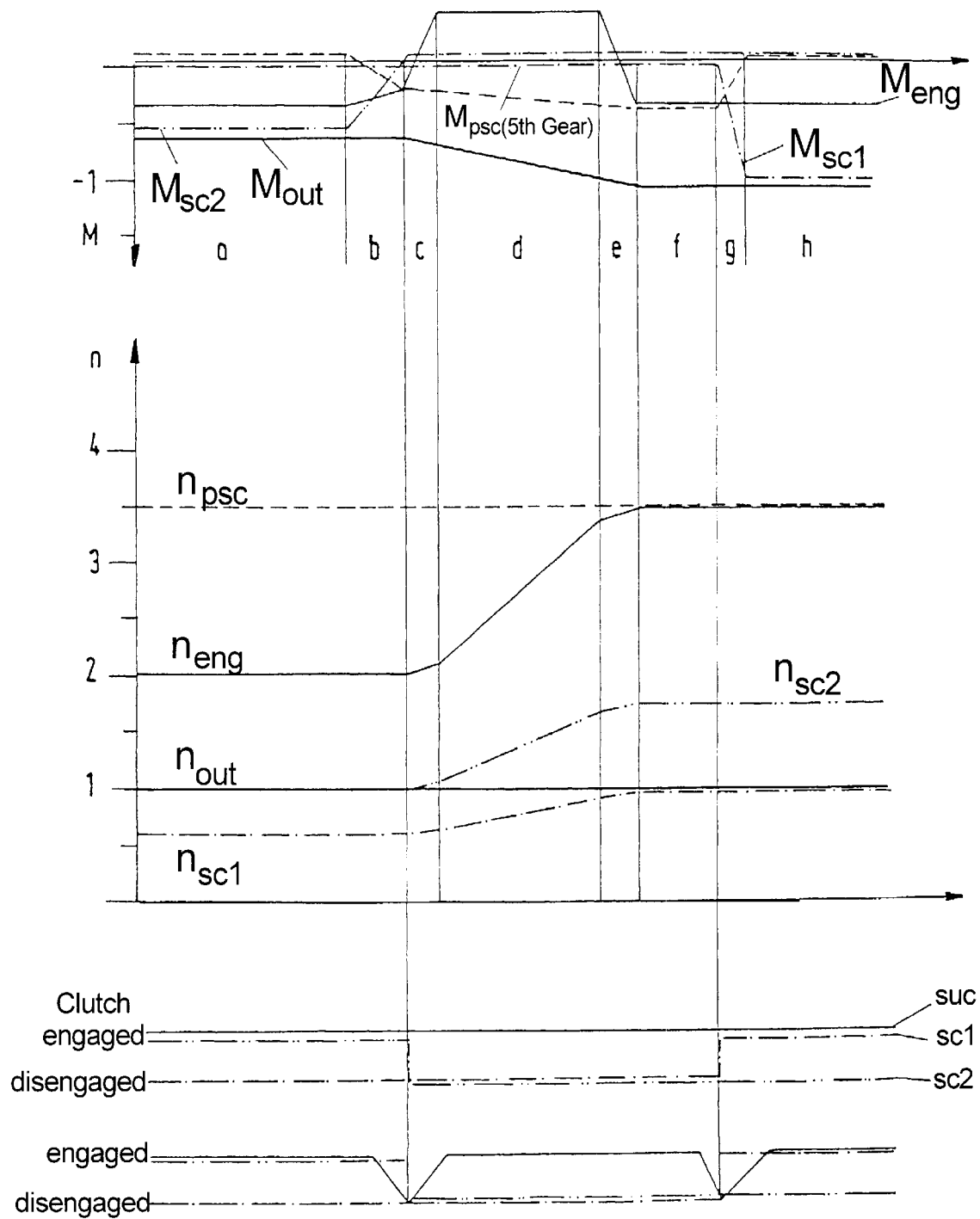

FIG. 39 illustrates a time profile of a gear-shifting process with assistance by the engine, where the gaps in traction are completely closed. As was shown in FIG. 38, a down-shift in a reverse-torque situation can be performed entirely without interrupting the tractive force. With the version presented in FIG. 39, the output torque during the synchronization phase of the engine drops lower than the level that will exist after the shift. By allowing the engine to participate in the down-shifting process, it is possible to reduce the drag on the vehicle during the synchronization. FIG. 39 illustrates the time profiles of the torque and rpm levels in a down-shift with drag, where the engine is actively employed during the middle time segment to generate a torque for raising the rpm rate. It is possible to regulate the output torque during the shift process in such a manner that the output torque flows continuously without reduction or increase in traction.

Figure 40:
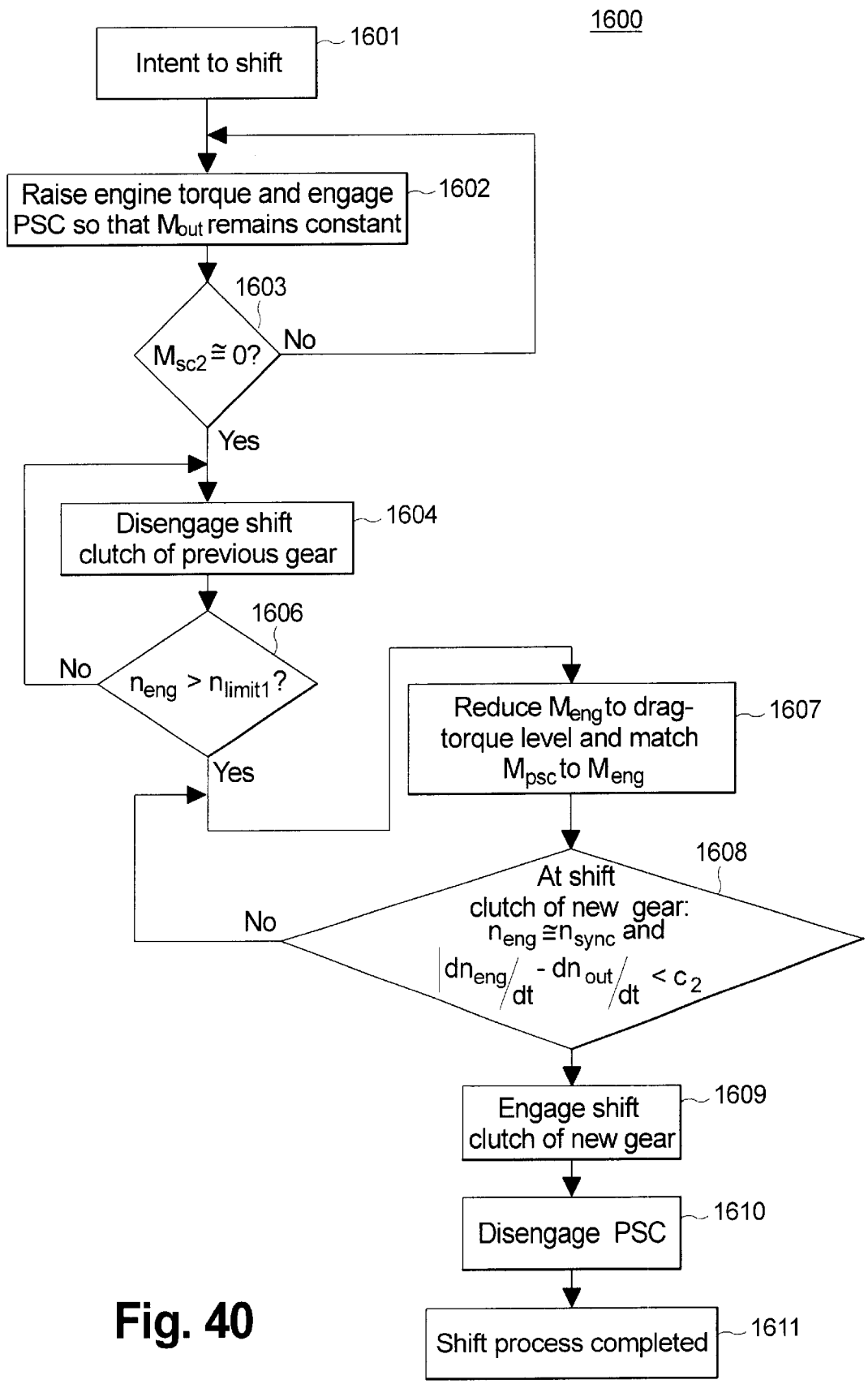
FIG. 40 represents a block diagram.

FIG. 40 represents a block diagram 1600 illustrating a down-shift in drag mode. The shift process is started in block 1601 by a signal that indicates an intent to shift gears. The signal can come, e.g., from an operating element that is actuated by the driver of the vehicle, or from an automated control program. In block 1602, the engine torque is raised and the power-shift clutch psc or its torque-transmitting capacity is engaged to the extent that the output torque remains constant. Block 1603 represents a test whether the torque $M_{sc2}$ of the shift clutch sc2 has fallen to a near-zero level. If this is the case, the program flow continues to block 1604 where the shift clutch sc2 is disengaged. Else, the program flow loops back to block 1602.

In block 1605, the engine torque is increased. At the same time, the torque $M_{psc}$ flowing through the power-shift clutch is set to a higher level. Block 1606 represents a test whether the engine rpm rate $n_{eng}$ is greater than a pre-settable limit value $n_{limit\ 1}$. If this condition is not met, then the program flow loops back to block 1605. If the condition is met, the process continues in block 1607 where the engine torque $M_{eng}$ is matched to the drag torque and the torque $M_{psc}$ of the power-shift clutch is matched to the engine torque. Block 1608 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant $c_2$. If this condition is met, the program flow continues in block 1609 where the shift clutch of the new gear sc1 is engaged, proceeding to 1610 where the power-shift clutch is disengaged, and 1611 where the shift process is completed. If the test at 1608 is negative, the program loops back to block 1607.

Figure 41:
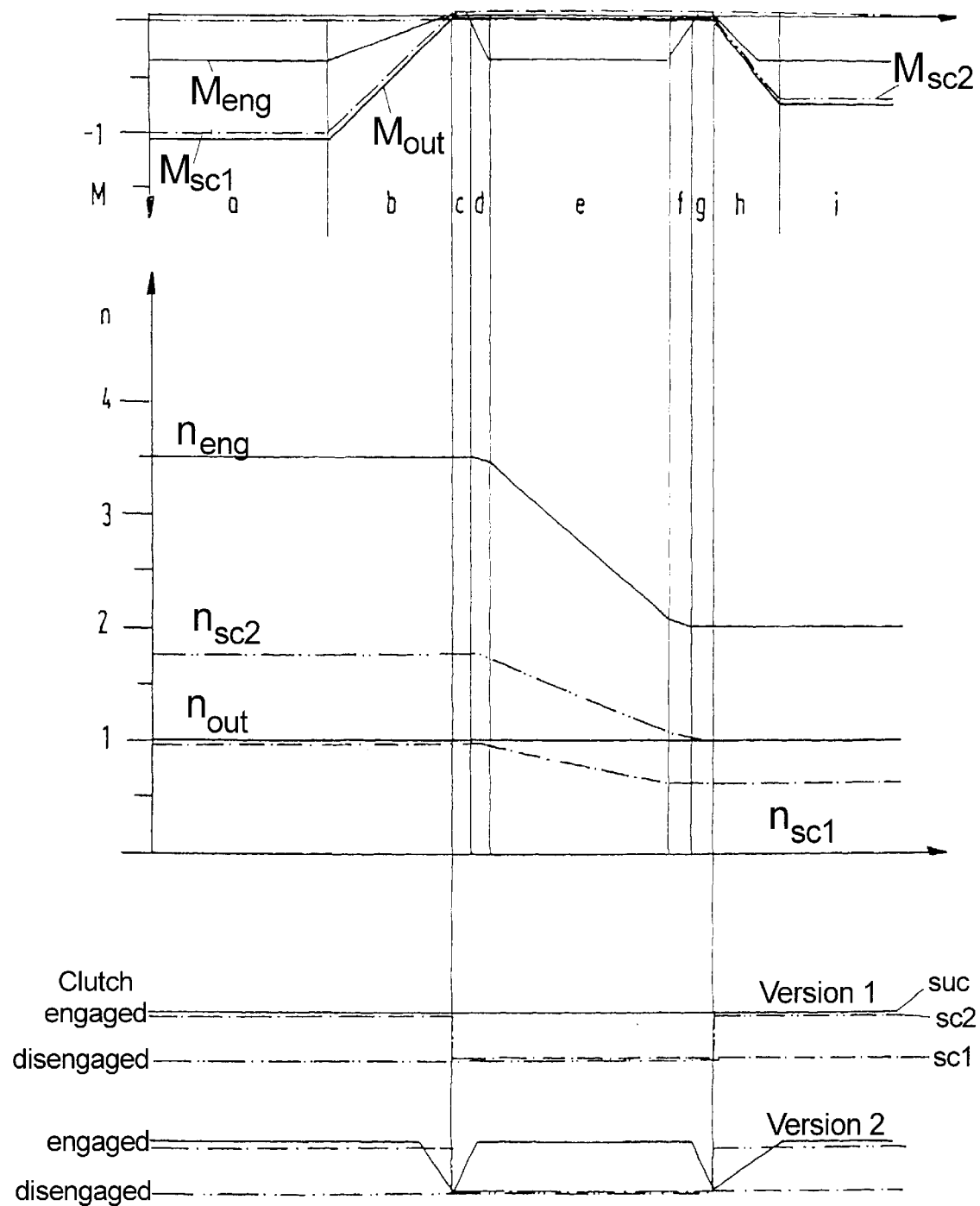
FIGS. 41 through 43 represent diagrams.

FIG. 41 illustrates the time sequence of an up-shift in drag mode from first to second gear without a power-shift clutch. Time segment a represents the conditions prior to the start of the gear-shifting process. The engine is in a drag condition and provides its maximum drag torque for the deceleration or braking of the vehicle. The shift clutch sc1 is engaged and transmits the engine torque to the output. Time segment b represents the beginning phase of the gear-shifting process. The engine torque is raised from its negative level to zero to ensure that the current gear can be disengaged in a torque-free condition. As long as the form-locking engagement continues and with the start-up clutch being engaged, the output torque follows the engine torque. In the time segment c, the shift clutch is torque-free, and the current gear can be disengaged. The synchronization phase begins in time segment d. The engine torque is lowered as rapidly as possible to either a reduced or to the maximum drag-torque level in order to accelerate the transmission input to the new synchronous rpm rate. No torque is transmitted to the output during this time interval, i.e., there is a lapse in traction. During the time segments e and f, the engine torque accelerates the transmission input shaft to the new target rpm rate. Shortly before reaching the target rpm rate, the engine torque is cut back to allow the shift clutch sc2 to be engaged at matched rpm rates and in a torque-free condition. In the time segment g, the engine torque is at zero and the rpm rates and rpm acceleration rates of the input and output of the shift clutch sc2 are equal. The shift clutch sc2 can now be brought into engagement. During the time segments h and i, the engine torque reverts to the state of maximum drag torque. The output torque is now determined by the engine torque and by the ratio of the newly engaged gear.

Following is a description how an up-shift in drag mode, e.g., from first to second gear, can be performed without a lapse in traction with a power-shift clutch at the first forward gear. Again, the discussion will cover gear-shifting strategies with and without controlled assistance by the engine.

Figure 42:
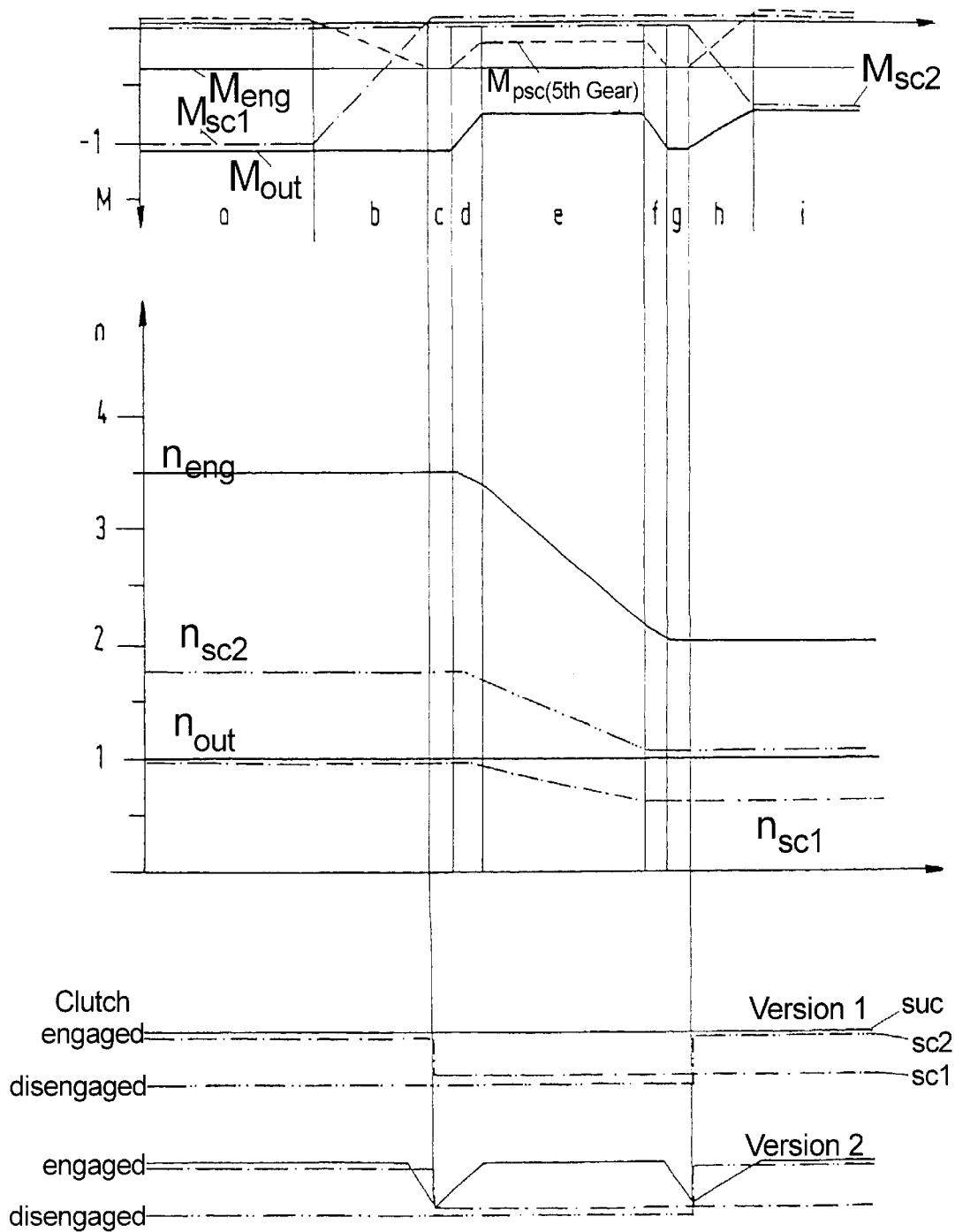

FIG. 42 illustrates the time profile of a shift process without assistance by the engine, where a drop in traction occurs. Time segment a represents the conditions prior to the shift process. The engine is in a drag mode and provides its maximum drag torque for decelerating (braking) the vehicle. The shift clutch sc1 is engaged and transmits the engine torque to the output. Time segments b and c represent the beginning phase of the gear-shifting process. The power-shift clutch, which is located at the first gear, is engaged to work in parallel with the shift clutch sc1. When the power-shift clutch is engaged, the shift clutch sc1 can be disengaged without causing a change in the torque level at the output. The synchronization phase begins in time segments d and e. The engine torque is lowered by reducing the torque of the power-shift clutch gradually to the level where the output torque has the same magnitude as it will after the shift process. This causes the drag torque that is transmitted from the engine to the output to drop at the same time, because a part of the maximum drag torque is used to reduce the rpm rate of the engine. In the time segments f and g the synchronous rpm rate of the new gear level is reached. The torque of the power-shift clutch is raised to the level of the engine torque. Subsequently, the shift clutch of the new gear (sc2) is engaged. The output torque passes through a peak in this phase, because the shift is performed without employing the assistance of the engine torque and, accordingly, the output torque follows the torque of the power-shift clutch. During the time segments h and i, the power-shift clutch is taken out of engagement and the function of transmitting the torque passes from the power-shift clutch to the shift clutch sc2. The shift process is completed.

Figure 43:
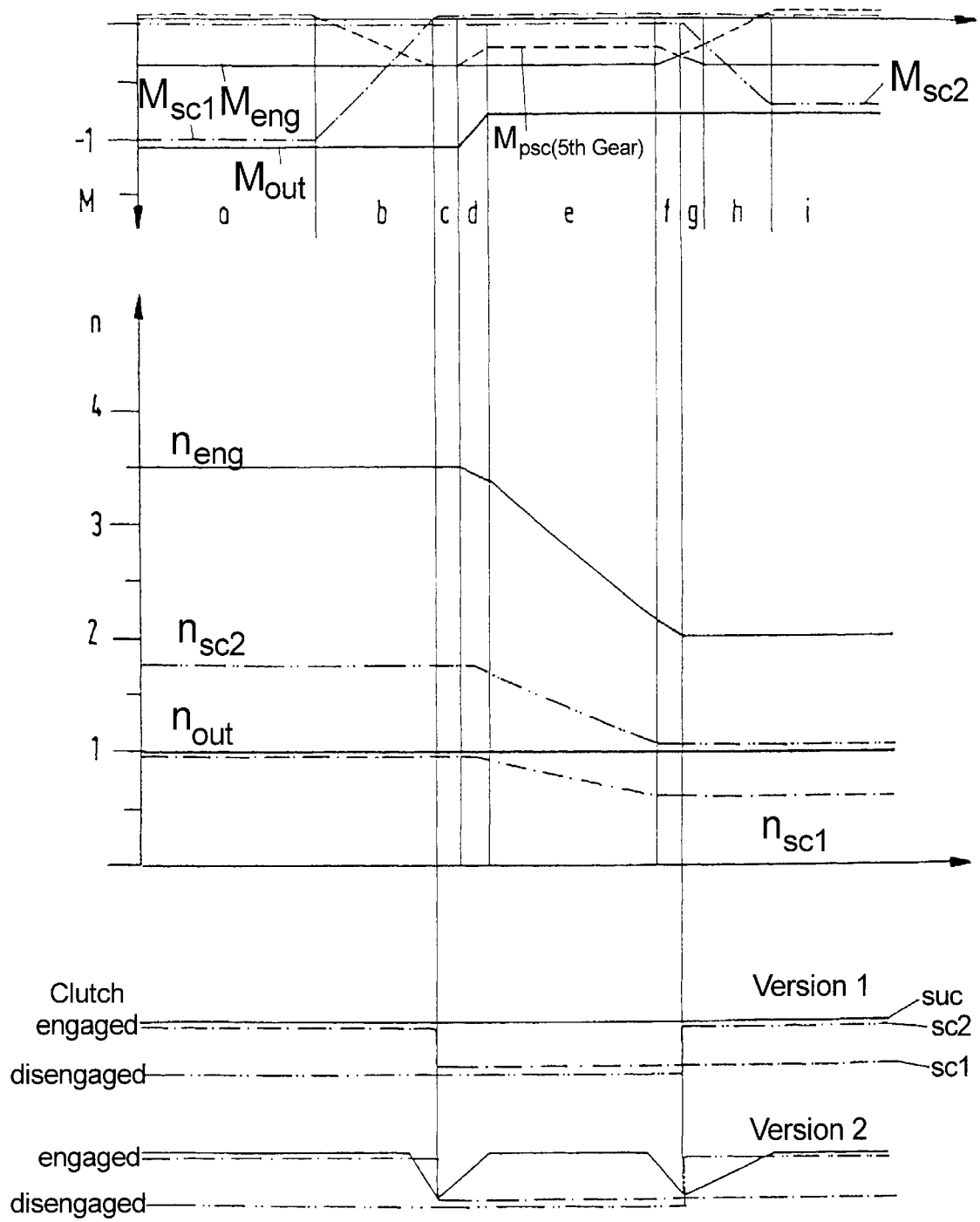

FIG. 43 illustrates the time profile of a shift process with the assistance of the engine. The torque profiles through the individual phases are analogous to the process just described. The version of FIG. 43 differs in that during the phases f and g, the engine torque and the torque of the power-shift clutch are controlled in such a manner that the output torque does not change at all, or not to a significant extent. The result is a smooth transition without a peak in the tractive force.

Figure 44:
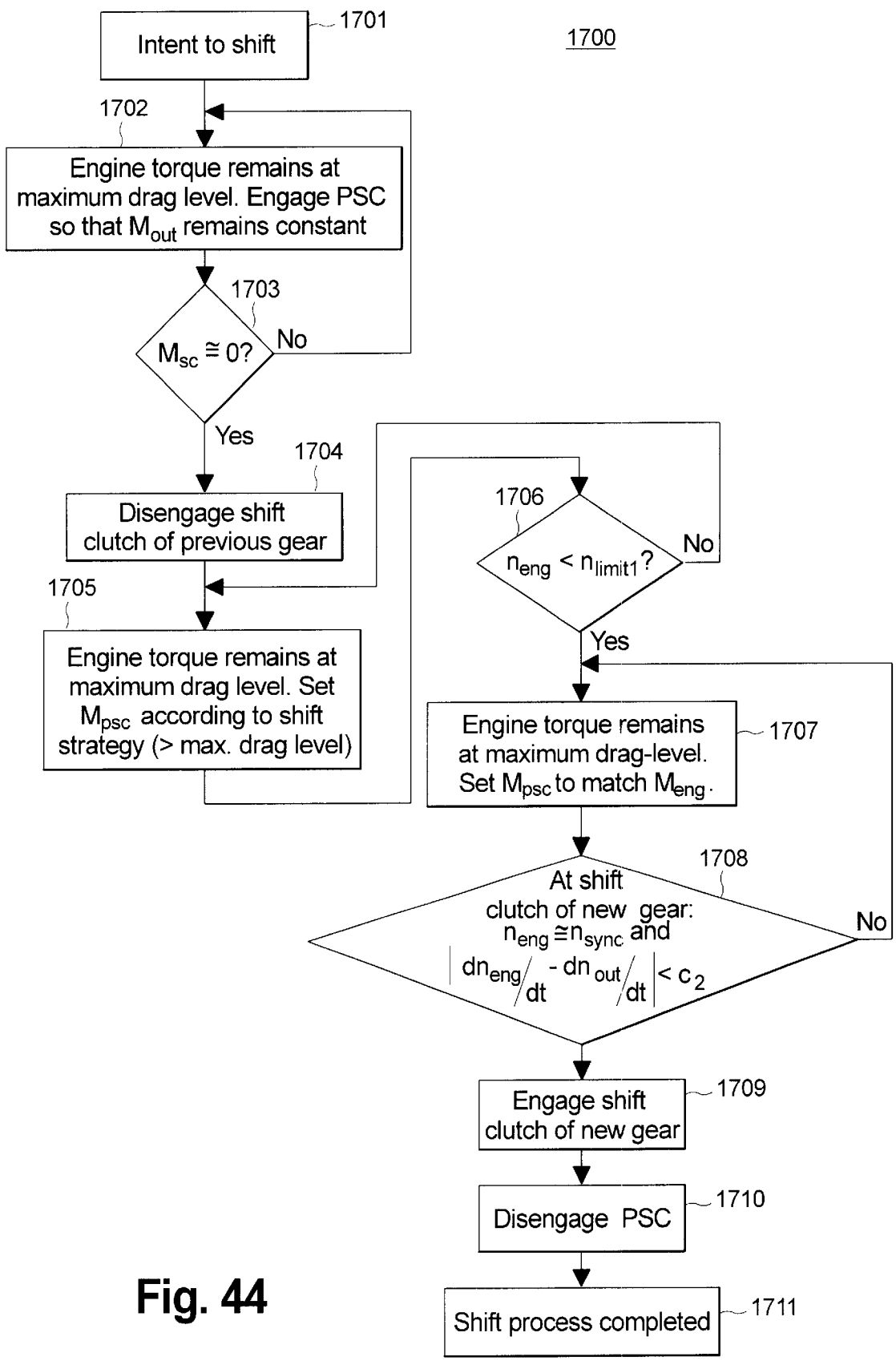
FIG. 44 represents a block diagram.

FIG. 44 represents a block diagram 1700 illustrating an up-shift under reverse-torque conditions. The shift process is started in block 1701 by a signal that indicates an intent to shift gears. The signal can come, e.g., from an operating element that is actuated by the driver of the vehicle, or from an automated control program. In block 1702, the engine torque is kept at the maximum drag level, and the power-shift clutch psc or its torque-transmitting capacity is engaged to the extent that the output torque remains constant. Block 1703 represents a test whether the torque $M_{sc1}$ of the shift clutch sc1 has fallen to a near-zero level. If this is the case, the program flow continues to block 1704 where the shift clutch sc1 is disengaged. Else, the program flow loops back to block 1702.

In block 1705, the engine torque remains at maximum drag level. At the same time, the torque $M_{psc}$ flowing through the power-shift clutch is set to a higher level. Block 1706 represents a test whether the engine rpm rate $n_{eng}$ is smaller than a pre-settable limit value $n_{limit\ 1}$. If this condition is not met, then the program flow loops back to block 1705. If the condition is met, the process continues in block 1707 where the engine torque $M_{eng}$ is set to the maximum drag-torque level and the torque $M_{psc}$ of the power-shift clutch is matched to the engine torque. Block 1708 indicates a test whether the engine rpm rate $n_{eng}$ has reached the synchronous target rate $n_{sync}$ and whether the difference between the time derivatives of the rpm rates on the input and output side of the new gear has a smaller absolute magnitude than a pre-settable constant $c_2$. If this condition is met, the program flow continues in block 1709 where the shift clutch of the new gear sc2 is engaged, proceeding to 1710 where the power-shift clutch is disengaged, and 1711 where the shift process is completed. If the test at 1708 is negative, the program loops back to block 1707.

Figure 45:
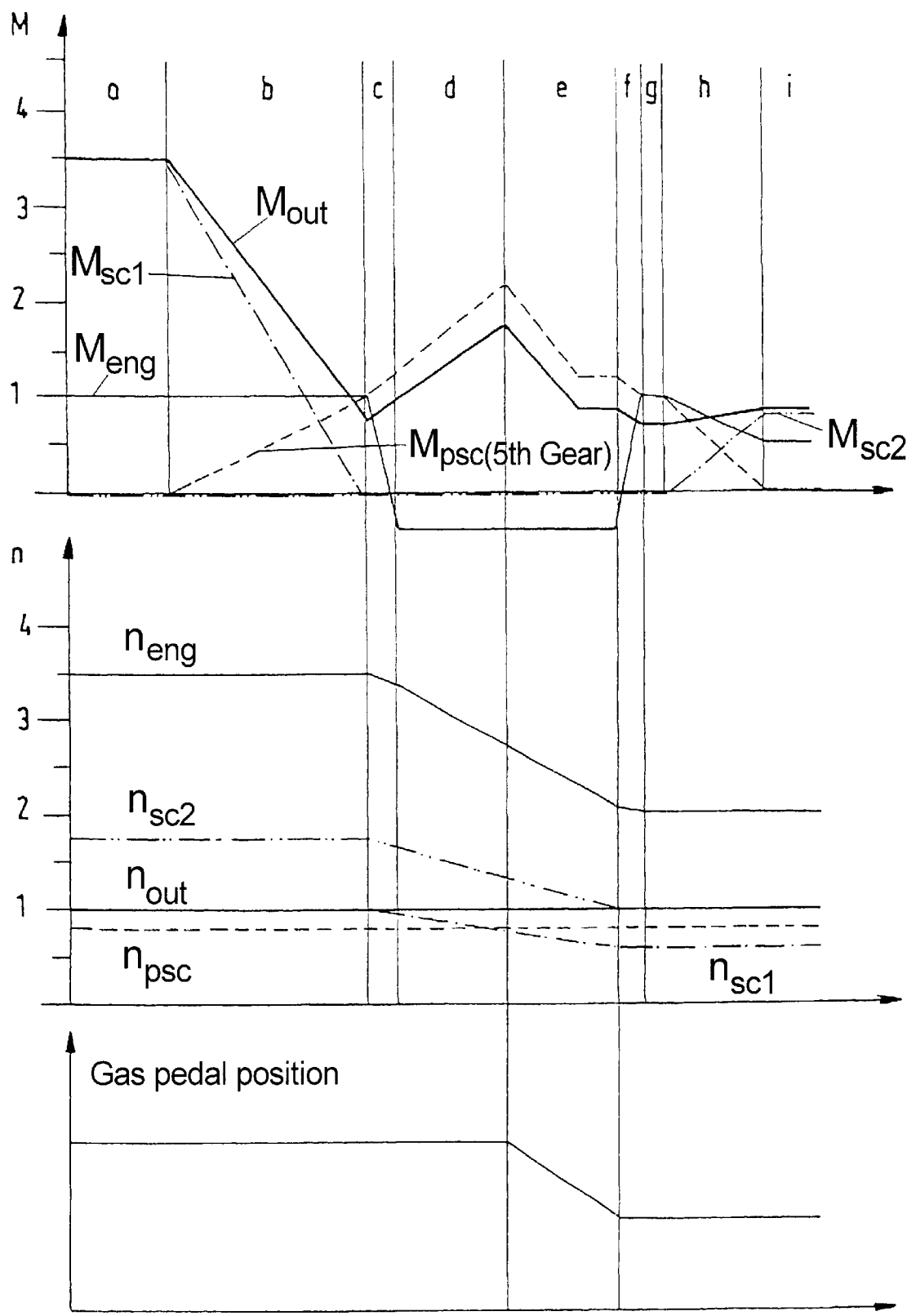
FIGS. 45 through 49 represent diagrams.

FIG. 45 illustrates the time sequence of an up-shift under traction from first to second gear with the use of a power-shift clutch and accommodation to the torque level desired by the driver according to the degree of actuation of the accelerator pedal. Time segment a represents the conditions prior to the start of the gear-shifting process. The engine torque is at maximum level ($M_{eng}=1$) and determines the output torque that is transmitted through the shift clutch sc1 to the output shaft of the transmission. Time segment b represents the beginning phase of the gear-shifting process. The power-shift clutch is slowly engaged in order to reduce the torque of the shift clutch sc1 to zero. When the shift clutch sc1 is torque-free, the current gear can be disengaged. In the time segments c and d, the engine torque is taken back to the maximum drag level in order to decelerate the transmission input shaft towards the synchronous rpm rate. The torque of the power-shift clutch is raised according to the current input from the driver to the level where the output torque becomes the same as it will be after the shift process. The synchronization process is continued during the time segment e. In the meantime, according to the illustrated example, the driver takes action and takes the gas pedal back to a position calling for an output torque corresponding to half the maximum amount of the engine torque. In response to the action of the driver, the power-shift clutch is brought to the newly determined torque level, resulting in an output torque as desired by the driver. The engine torque continues at the maximum drag level during this phase, so that the transmission input continues to be decelerated. In the time segment f, shortly before reaching the target rpm rate, the engine torque is raised to match the new level desired by the driver, and the torque of the power-shift clutch is lowered to that same level. This assures on the one hand that the shift clutch sc2 of the new gear is torque-free and on the other hand, it causes engine acceleration to drop near zero, which makes it easier to match the synchronous rpm rate. In the time segment g, the torque levels are matched and the new target rpm rate has been reached. The shift clutch sc2 can now be brought into engagement, so that the new gear is coupled into the torque flow. The system changes from frictional engagement to frictional and form-locking engagement. During the time segments h and i, the torque transmitted through the power-shift clutch is rapidly reduced to zero.

Figure 46:
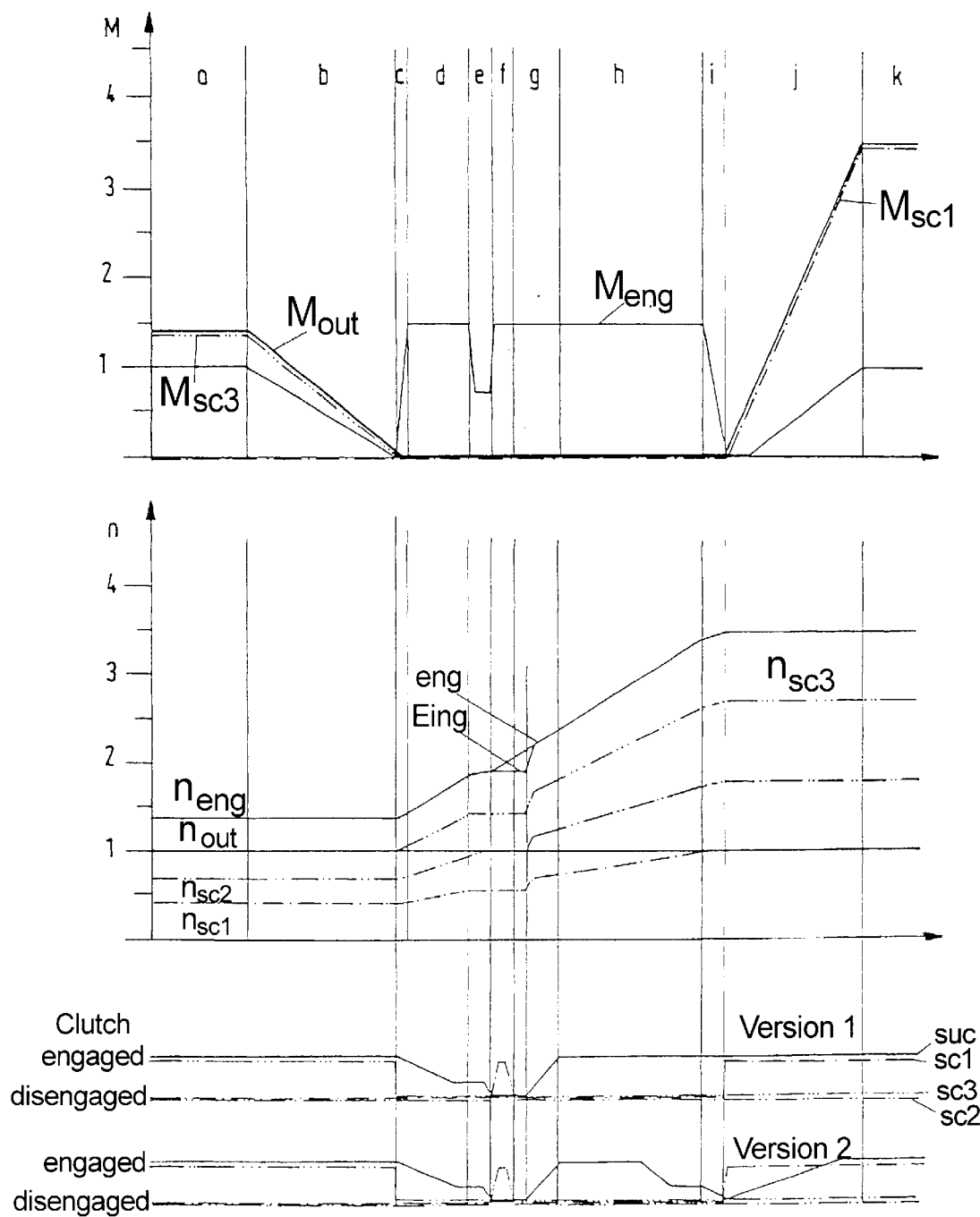
Figure 47:
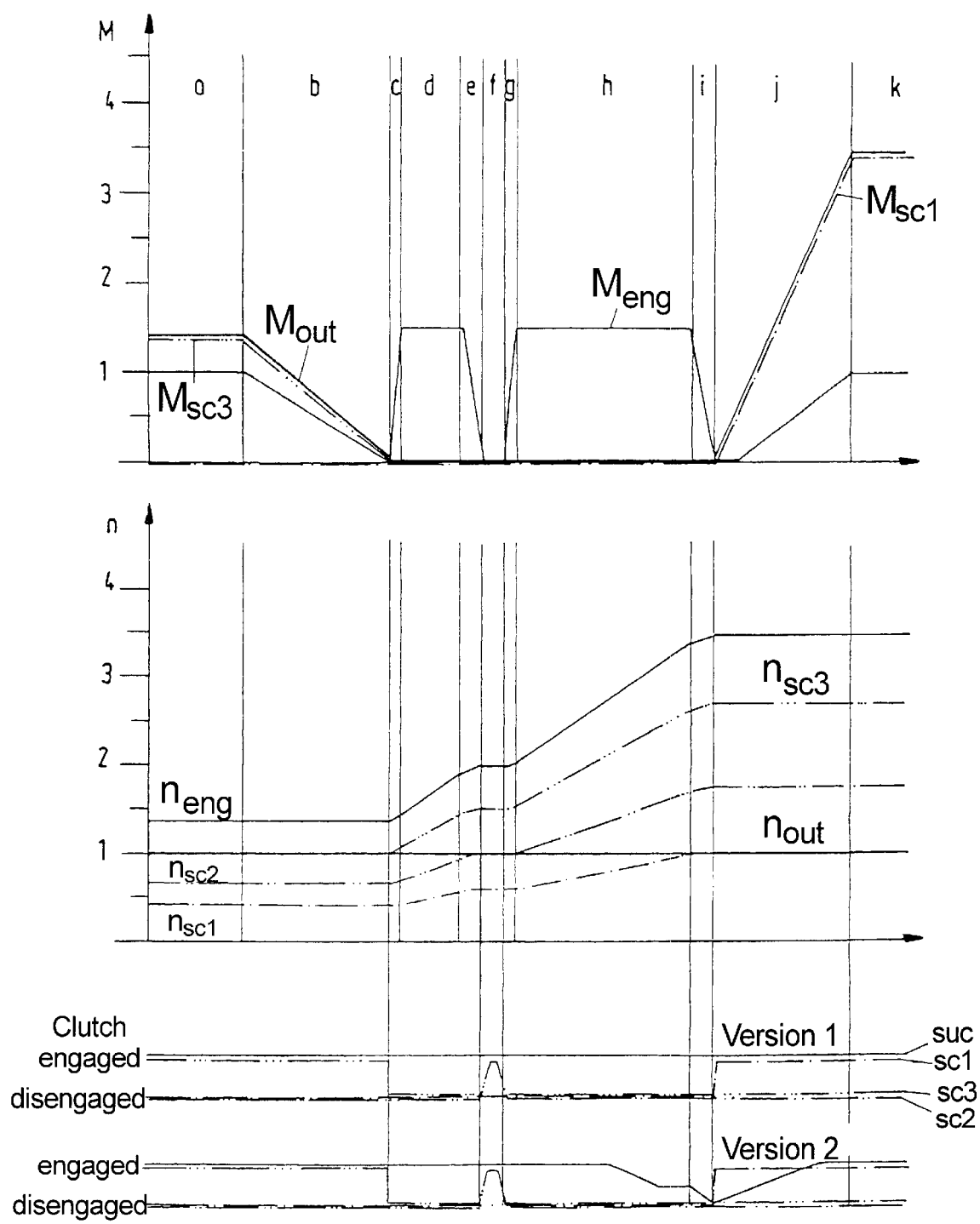

The FIGS. 46 and 47 illustrate down-shifts under traction as sequential shift processes, e.g., from third into first gear, without the use of a power-shift clutch. In certain travel situations it is desirable not to go through the individual levels of the transmission sequentially, but to shift gears in defined jumps, such as in extreme down-shifts in traction mode as well as in drag mode. The process of shifting down from third to first gear, skipping over the second gear, will be discussed as a representative example.

In the time segment a, the vehicle is in third gear, and the shift clutch sc3 of the third gear transmits the engine torque to the output shaft. In the time segment b, the shift process is started and the engine torque is reduced to zero. At the point where the shift clutch sc3 is torque-free, the third gear can be disengaged. During the time segment c, the transmission input is accelerated to a higher rpm rate. Depending on the travel situation and the desire of the driver, a decision has to be made whether to perform the synchronization as rapidly as possible (with a complete gap in traction during the synchronization) or in a longer time interval (with a partial lapse in traction during the synchronization). The example shown here is based on a synchronization taking place as rapidly as possible. The engine torque is raised to the maximum level, and the power-shift clutch remains disengaged during the entire shift process. The synchronization process is continued during the time segments d through h. Depending on the design of the power-shift clutch it may be necessary to engage the second gear briefly even in a third-to-first down-shift. The invention has strategies to deal with this case, too. One possibility is to reduce the engine torque to zero before the target rpm rate of the second gear is reached, then to engage and disengage the shift clutch sc2 in quick succession, and subsequently raise the engine torque again to the maximum level.

The latter strategy would lengthen the synchronization process because of the time required to reduce the engine torque to zero and then accelerate the engine. In another strategy according to the invention, the start-up clutch is taken out of engagement shortly before reaching the target rpm rate of the second gear. This likewise assures the required torque free condition for temporarily engaging the shift clutch sc2. At the same time, the engine can remain in an accelerating mode and efficiently accelerate the transmission input shaft after the start-up clutch is re-engaged. In the time segments i through k, as the target rpm rate of the first gear is closely approached, the invention again offers strategies to engage the first gear comfortably and rapidly. In one version, the engine torque is reduced to zero prior to reaching the target rpm rate in order to avoid a jolt in the torque when the shift clutch sc1 is engaged and to match the synchronous rpm range safely. After the new gear has been engaged, the engine torque is raised in accordance with the level desired by the driver.

A further version uses a controlled regulation of the start-up clutch. The start-up clutch allows a smooth control over the amount of torque transmitted from the engine to the input of the transmission. The start-up clutch can be taken out of engagement before reaching the target rpm rate of the first gear in order to reduce the acceleration of the transmission input and to find the rpm range for the engagement of the new gear more easily. It is not necessary to cut back the engine torque in this phase. At the point where the synchronous rpm rate has been attained, the start-up clutch is disengaged completely, so that the shift clutch sc1 can be engaged comfortably. After the gear is set, the start-up clutch is re-engaged, and the engine torque is transmitted to the transmission output shaft.

Figure 48:
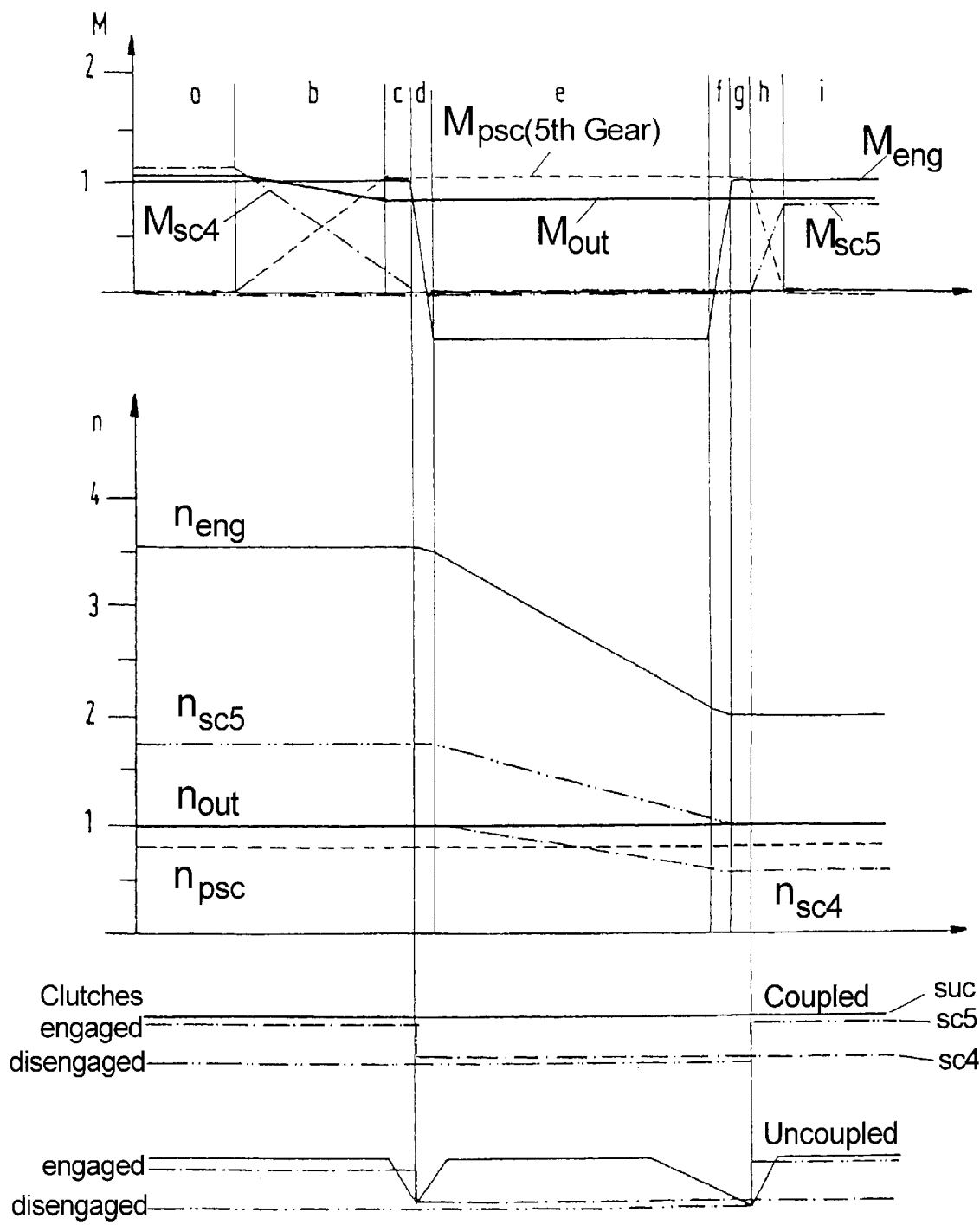

FIG. 48 represents the time profile of an up-shift under traction from fourth to fifth gear in which a power-shift clutch connected with the fifth gear is being used. With a power-shift transmission, a shift process of this kind can be performed with almost no reduction in the tractive force. The individual phases of the shift process are analogous to the previously described up-shifts under traction with a power-shift clutch at the fifth gear. It should be noted that, after the synchronous target rpm rate of the fifth gear has been reached, the vehicle can be operated with the power-shift clutch completely engaged. Alternatively, a shift clutch arranged in parallel with the power-shift clutch can be engaged while the power-shift clutch is disengaged and the function of transmitting the torque flow is passed from the power-shift clutch to the shift clutch.

Figure 49:
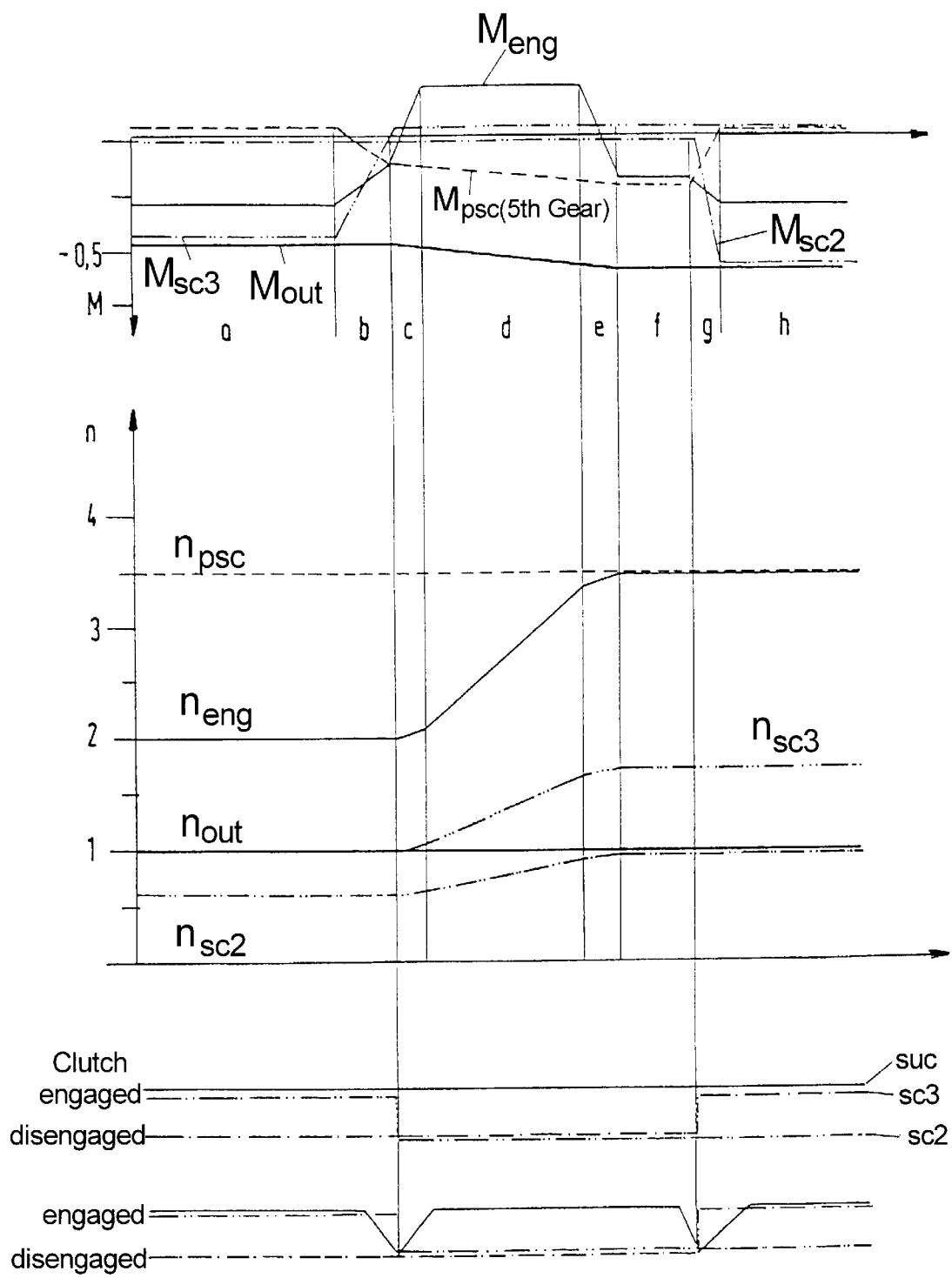

FIG. 49 represents a down-shift in drag mode from third to second gear with a power-shift clutch at the first gear. The shift strategy shown includes a controlled regulation of the engine torque and the torque flowing through the power-shift clutch, so that a smooth transition of the output torque can be realized. The description of the individual phases is analogous to the previously described down-shifts in drag mode with a power-shift clutch at the first gear.

FIGS. 50a through 50f illustrate possibilities of arranging an electro-mechanical energy converter. In FIG. 50a, the electro-mechanical energy converter 2000 is connected to the shaft 2003 by means of a gear set 2001, 2002.

In FIG. 50b, the electro-mechanical energy converter 2010 is connected to the shaft 2015 by means of a dual-stage gear set 2011, 2012, 2013, 2014.

In FIG. 50c, the electro-mechanical energy converter 2020 has an arrangement where the rotor is mounted immediately and coaxially on the shaft 2021.

In FIG. 50d, the electro-mechanical energy converter 2030 has an arrangement where the output shaft of the electro-mechanical energy converter is connected to a sun gear 2031, an internal gear 2032 of a planetary gear set is connected to a housing, and the planet-gear carrier 2033 is connected to the shaft 2034.

The electro-mechanical energy converter 2040 of FIG. 50e can be connected to the shaft 2042 by means of a continuously variable transmission 2041. In FIG. 50f, the electro-mechanical energy converter 2050 can be connected to the shaft 2052 by means of a shiftable gear box 2051.

Figure 51:
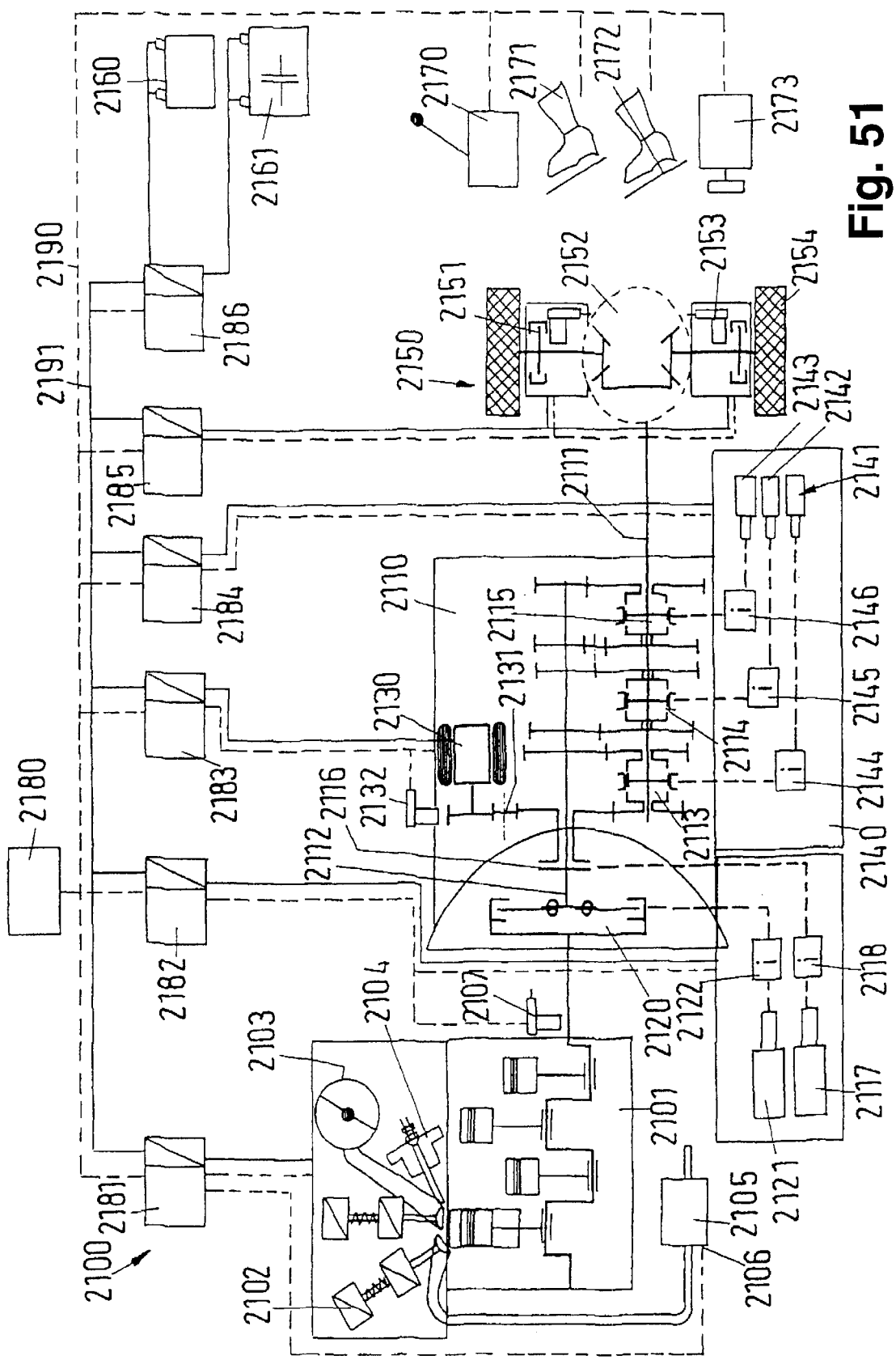
FIG. 51 represents a schematic view of a motor vehicle.

FIG. 51 gives a schematic representation of a drive train of a motor vehicle 2100. The vehicle 2100 has an engine 2101, such as an internal combustion engine with controllable valves 2102, a throttle valve 2103 with a throttle-valve actuator system, an injection system 2104, a catalytic converter 2105 with a lambda sensor 2106, and an rpm sensor 2107.

A start-up clutch 2120 is arranged between the engine 2101 and the transmission 2110. The clutch 2120 has a clutch actuator 2121 with a transmitting mechanism 2122. The transmission 2110 has an input shaft 2112 and an output shaft 2111. In addition, the transmission 2110 has shift clutches 2113, 2114, and 2115 for shifting the forward gears and the reverse gear. The arrangement also includes a power-shift clutch 2116 of the kind described above. The power-shift clutch is actuated by means of the actuator 2117 with a transmitting mechanism 2118 being provided between the actuator and the clutch.

There is further an electro-mechanical energy converter 2130 that is connected to the.transmission input shaft 2112 through a gear set 2131. The rpm sensor 2132 measures the rpm rate of the electro-mechanical energy converter.

To operate the transmission, there is a transmission actuator system 2140 with actuators 2141, 2142, 2143, each of which can have an associated transmitting mechanism 2144 to 2146, respectively.

The vehicle has furthermore the drive train 2150 including brakes 2151, differential 2152, and wheels 2154.

To store and supply electric power, there is a battery 2160 and an electrical, e.g. capacitative, storage device 2161. For the control of the vehicle by the driver, there is a hand-brake lever 2170, a gas pedal 2171, and a foot-brake pedal 2172. There is also an air-conditioning compressor 2173.

The control is performed through a master control unit 2180 by way of the engine control 2181, clutch control 2182, control 2183 of the electro-mechanical energy converter, transmission control 2184, the control 2185 of the brake systems including ABS (anti-lock brake system), and the control 2186 of the battery and power electronics.

The reference number 2190 designates the signal-transmitting conductors such as a data bus (CAN), and 2191 designates the power conductors.

Figure 52:
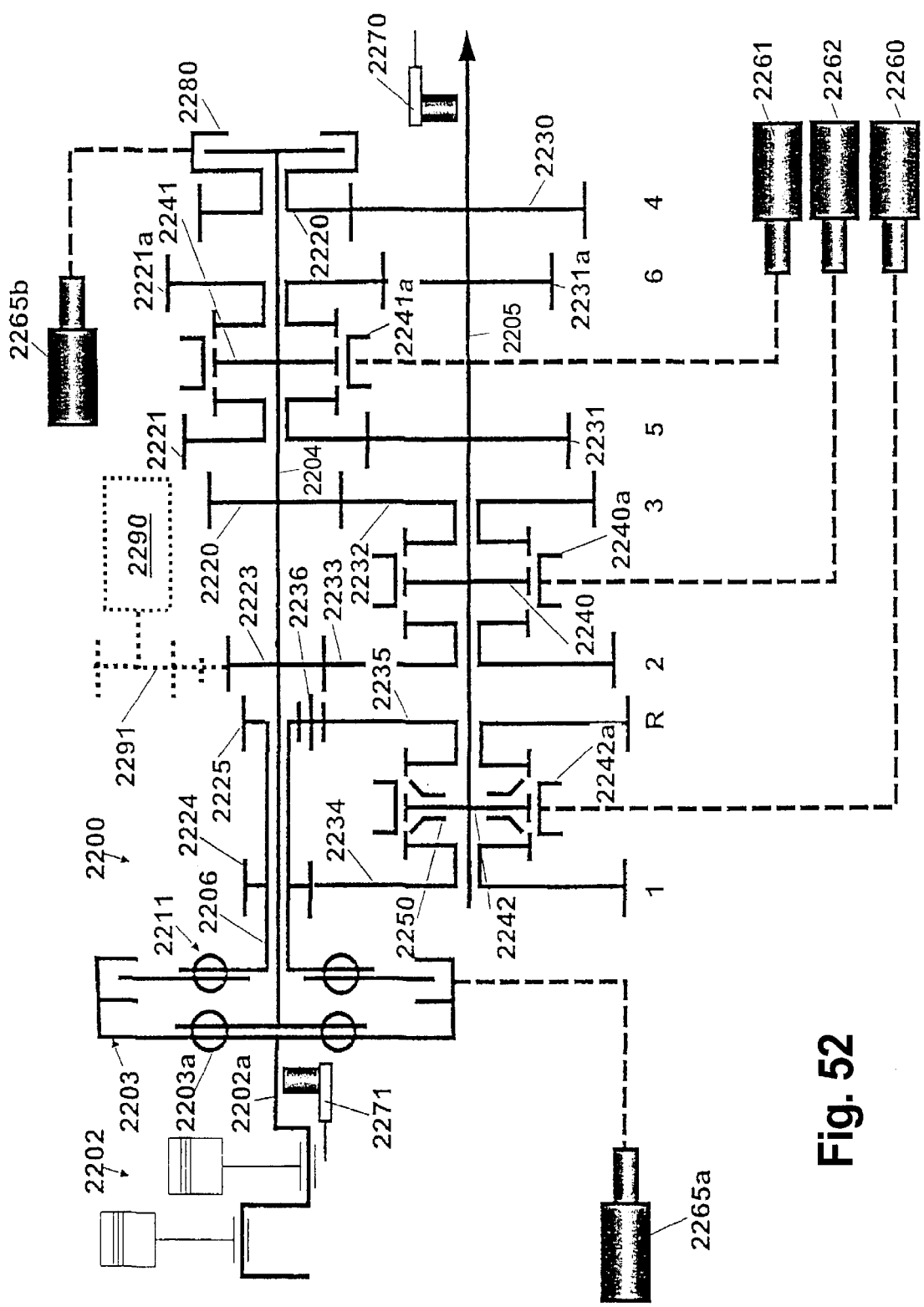

FIG. 52 illustrates a further embodiment of a transmission 2200, a six-speed transmission with a reverse gear and a power-shift clutch 2280 energized by an actuator 2265b. The power-shift clutch in the illustrated embodiment connects, when engaged, the fourth gear pair, i.e., the free gear 2220 and the fixed gear 2230 to the input shaft 2204. The higher-level gears, i.e., fifth and sixth, cannot be shifted under load in the illustrated embodiment. It is to be understood that alternative embodiments are possible within the scope of the invention, where either the fifth or the sixth gear is connected to the power-shift clutch, so that the fifth and sixth gear can likewise be shifted under load, albeit with the concessions that have to be made with respect to the power-shifting performance in the lower gears as was discussed above.

The crankshaft 2202a of the engine 2202, whose rpm rate is monitored by means of the rpm sensor 2271, has a rotationally fixed connection to the input shaft 2204 of the transmission 2200, preferably by means of screw bolts. To attenuate non-uniformities in the rotation and/or to make up for a possible offset between the shaft axes, a torsional-vibrations damper 2203a of an essentially known kind is arranged in the torque flow between the two shafts 2202a and 2204. It is also possible for the input shaft 2204 to have an increased inertial mass that is rotatable in relation to the inertial mass of the crankshaft 2202a against the effect of circumferentially acting energy-storing elements. In other words, there can be a dual-mass flywheel instead of the torsional vibration damper 2203a.

The start-up clutch 2203 is either combined in a unit together with the torsional vibration damper 2203a or spatially separate from it. The start-up clutch 2203, which can also have its own torsional vibration damper 2211 and is controlled by the actuator 2265a, is arranged in the torque flow between the crankshaft 2202a or transmission input shaft 2204 and a hollow shaft 2206 that is supported by the input shaft 2204. The hollow shaft 2206 carries the fixed gears 2224 for first gear and 2225 for reverse gear, with the corresponding free gears 2234 and 2235, respectively, being arranged on the output shaft 2205, with a reverse idler gear 2236 between the gears 2225 and 2235. The reverse gear can also be arranged rotatably on the input shaft 2204 together with the fourth gear and the corresponding gear-shifting device with a sliding sleeve and an actuator.

Continuing along the axis of the input shaft 2204 from the start-up clutch 2203 at the crank-shaft end to the power-shift clutch 2280 at the (preferably) opposite end of the input shaft, the input shaft 2204 carries the fixed gears 2223, 2222 meshing with free gears 2233, 2232 of second and third gear. Following along the input shaft 2204 are two free gears 2221, 2221a meshing with the fixed gears 2231, 2231a of fifth and sixth gear on the output shaft. A fixed gear 2241 is arranged axially between the free gears 2221, 2221a, so that the sliding sleeve 2241a can make a form-locking engagement from the input shaft 2204 to the output shaft 2205 either by way of the gear pair 2221, 2231 or the pair 2221a, 2231a. The engagement is made by an actuator 2261 moving the sliding sleeve 2241a to one side or the other depending on the desired gear level as directed by the (not pictured) control unit.

In analogous manner, a selective form-locking engagement to the output shaft 2205 is made by the fixed gear 2240 between the free gears 2233, 2232 for second and third gear, respectively, and by the fixed gear 2242 between the free gears 2234, 2235 for first and reverse gear, respectively, with the sliding sleeves 2240a, 2242a being moved to one side or the other as directed by the actuators 2262 and 2260, respectively. A synchronization device 22250 is provided for first and reverse gears.

In addition, the transmission 2200 can have an associated electric motor 2290 with a torque-transmitting mechanism 2291, e.g. as shown in FIGS. 50a through 50f. In the example of FIG. 52, the electric motor 2290 is connected to the gear 2223 of the second speed level of the transmission. It is self-evident that the electric motor can be any suitable kind of electro-mechanical energy converter and that it can be incorporated in any suitable location of the drive train.

The rpm sensors 2270, 2271 transmit the current rpm rate of the transmission input shaft 2204 and output shaft 2205, respectively, to the control unit.

The transmission 2200 of FIG. 52 works as follows:

With the start-up clutch 2203 disengaged, a form-locking engagement is made by means of the actuator 2260 and the sliding sleeve 2242a to one of the free gears 2234, 2235. Thus, a torque-transmitting connection is established from the input shaft 2204 to the output shaft 2205 as soon as the start-up clutch is engaged, and the vehicle is put either into first or reverse gear. The vehicle is set into motion by engaging the start-up clutch 2203.

With the vehicle in first gear, if there is a desire to shift to second, the power-shift clutch 2280 is engaged, and when the torque levels of the start-up clutch 2203 and the power-shift clutch 2280 are matched, the start-up clutch 2203 can be disengaged. As the sliding sleeve 2242a is torque-free, it can be moved into the neutral position, but it could also be left unchanged. Subsequently, the start-up clutch 2203 is engaged, whereby torque from the engine 2202 is directed by way of the gear pair 2220, 2230 from the input shaft 2204 to the output shaft 2205, and a lapse in traction during the shift process is avoided. The sliding sleeve 2242a can be moved into a neutral position by the actuator 2260, or it can stay engaged to the fixed gear. By lowering the engine rpm rate, e.g., by reducing the throttle valve opening, the free gear 2233 of the second gear level passes through the synchronous rpm level with acceleration matched to the sliding sleeve 2240a that functions as shift clutch, and the actuator 2262 establishes the form-locking engagement between the free gear 2233 and the fixed gear 2240. Subsequently, the power-shift clutch 2280 is taken out of engagement.

The shift to third gear is made according to the same procedure. To shift from third to fourth gear, the first step is to activate the power-shift clutch 2280. When the synchronous rpm rate has been reached, the actuator 2262 moves the sliding sleeve 2240a into a neutral position, i.e., a position with no form-locking engagement to the gears 2233, 2232, while the power-shift clutch 2280 is engaged. The start-up clutch 2203 remains disengaged.

Fifth and sixth gear are engaged in the essentially known manner with an interruption of the tractive force. To shift from fourth to fifth gear, the power-shift clutch 2280 is disengaged. Next, the engine 2202 is used to synchronize the transmission input shaft 2204 to the new synchronous rpm rate, preferably by reducing the throttle valve aperture. Subsequently, the actuator 2261 moves the sliding sleeve 2241a so that the fixed gear 2241 is form-locked with the free gear 2221. The shift into sixth gear is made by moving the sliding sleeve to the free wheel 2221a, using the engine for synchronization.

The down-shift from fifth to fourth and from sixth to fifth gear is made by reversing the procedure, as is essentially known. In sixth gear, the sliding sleeve 2241a is moved to make a form-locking connection with gear 2221. To engage the fourth gear, the sliding sleeve 2241a is moved to a neutral position, and the power-shift clutch 2280 is engaged.

For continued down-shifting of the transmission 2200 into the lower gears, the control process is different for down-shifts in drag mode compared to traction mode, with the down-shifts under traction running in precisely reverse sequence from the up-shifts described above. For down-shifts in drag mode, the third gear is engaged while the first gear is used to increase the drag force by engaging the start-up clutch 2203. The power-shift clutch 2280 is disengaged, and when the synchronous rpm rate has been reached and the acceleration rates matched at the sliding sleeve 2240a, the latter is moved by the actuator 2262 to make a form-locking engagement between the gears 2240 and 2232. Subsequently, the start-up clutch 2203 is disengaged again. The down-shift in drag mode from third to second gear is made analogously. With the start-up clutch 2203 in a slipping condition, the sliding sleeve 2240a is moved axially from the gear 2232 to the gear 2233 at the appropriate synchronization rpm rate. The down-shift into first gear is made by engaging the start-up clutch and moving the sliding sleeve 2240 into the neutral position.

Figure 53:
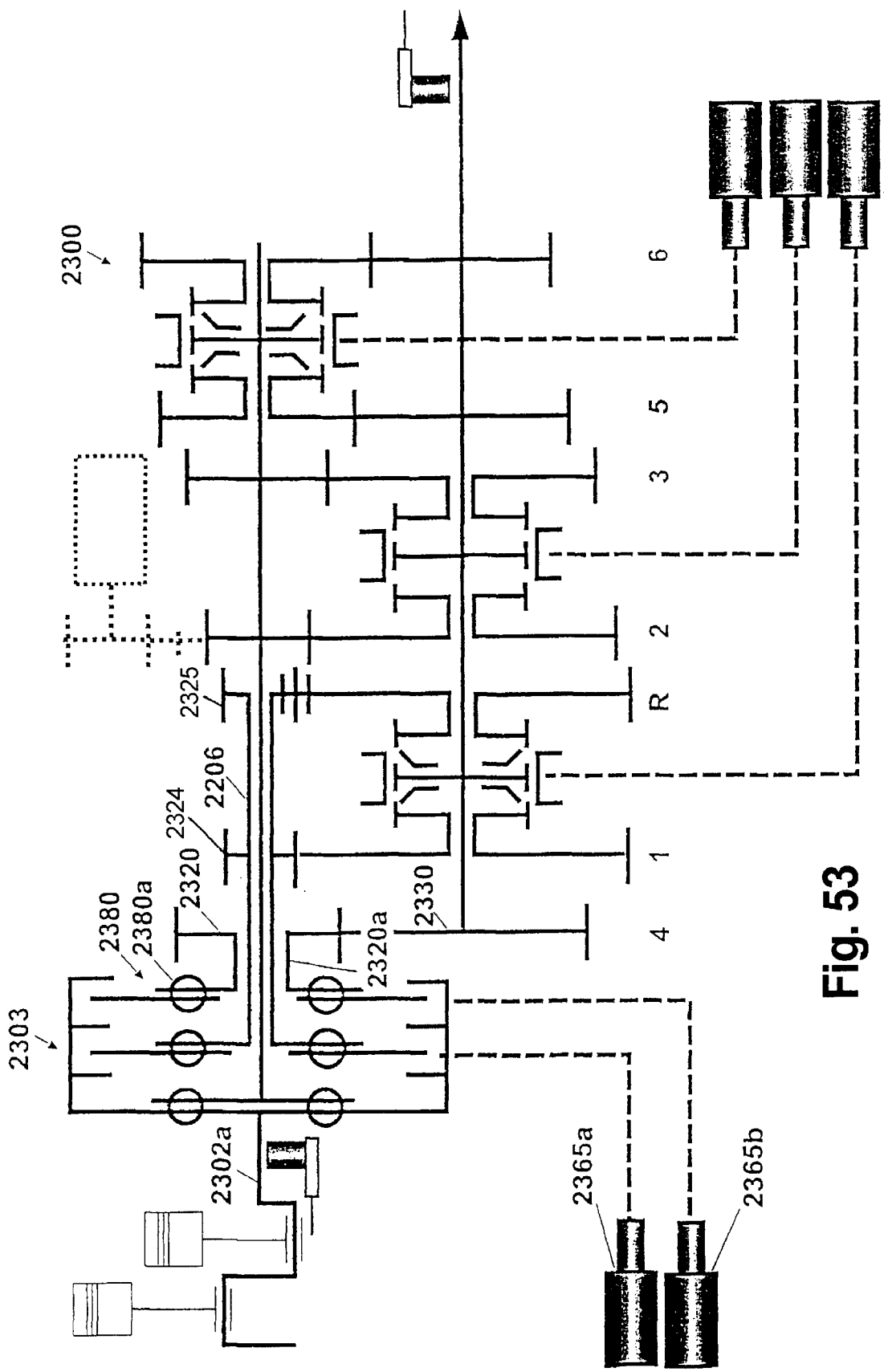

FIG. 53 shows an embodiment of a transmission 2300 that is similar to the transmission 2200 of FIG. 52, except that the power-shift clutch 2380, in contrast to the power-shift clutch 2280 of FIG. 52, is not configured as an oil-immersed clutch in the preferred laminar-clutch configuration, but as a dry clutch, preferably with friction linings. Under this concept, the power-shift clutch 2380 is spatially rearranged from the (not pictured) transmission housing to the clutch bell cover (likewise not shown), without changing the principal functional arrangement of the transmission 2300. In this layout, the power-shift clutch can be incorporated in the housing of the start-up clutch 2303 and configured as a dual clutch with two disks that are engaged and disengaged by means of two actuators 2365a, 2365b working against axial tensioning devices such as, e.g., diaphragm springs. Furthermore, the power-shift clutch 2380 can be equipped with a damper device 2380a arranged in the torque flow between the crank shaft 2302a and the gear pair 2320, 2330 for fourth gear, as would also be possible with the oil-immersed power-shift clutch. In contrast to the arrangement of FIG. 52, both the fourth gear and the power-shift clutch 2380 are relocated axially towards the crankshaft 2302a. The fixed gear 2320 of the fourth gear level is rotationally fixed to the power-shift clutch 2380 by way of a hollow-collar shaft 2320a passing through the housing wall into the transmission 2300 while surrounding the hollow shaft 2306 that carries the fixed gears 2324 and 2325 of first and reverse gear. With the combined arrangement of the clutches 2303 and 2380, the transmission 2300 can be made more compact, i.e., with an axially shorter configuration, so that it is more suitable for transverse installation in the front part of a vehicle.

Figures 54, 54A:
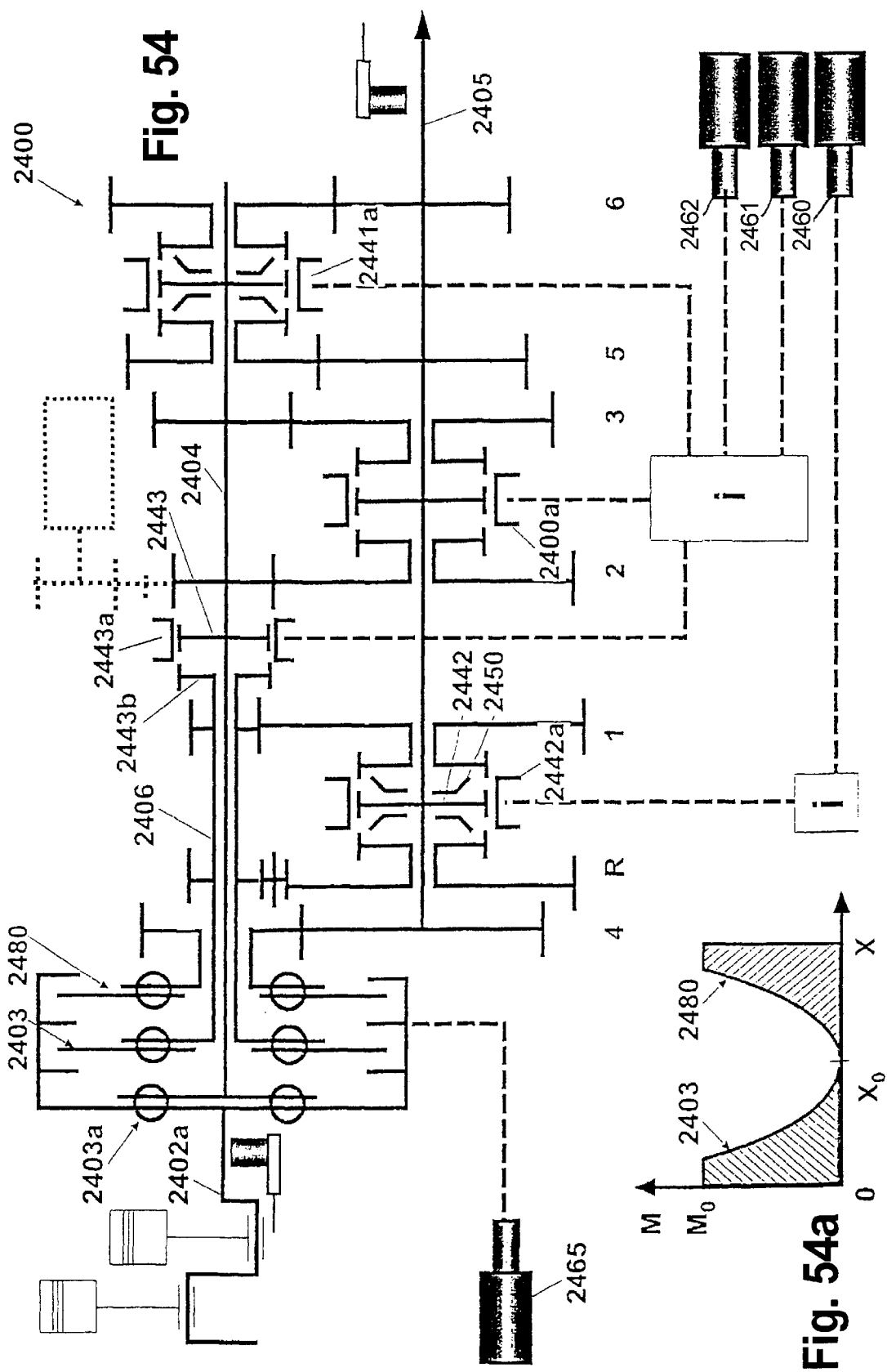

FIG. 54 illustrates an embodiment of a transmission 2400 that is similar to the embodiments of FIGS. 52 and 53. The features and properties described in the context of FIGS. 52 and 53 are also applicable to the transmission 2400, except for the differences that will now be described.

The transmission 2400 is equipped with two clutches 2403 and 2480, respectively, which are advantageously arranged in the bell of a single clutch housing as dry, pressure-engaged clutches.

The clutches 2403 and 2480 are controlled by an actuator 2465. FIG. 54a shows the control function in diagram form, where the torque M transmitted by the clutches 2403 and 2480 is shown as a function of the displacement travel x of the actuator. With x=0, the clutch 2403 is completely engaged and transmits the maximum-level torque $M_o$. With increasing actuator displacement x, the engagement is released and slips, up to the point $x_o$ where the clutch is totally disengaged. At this point, the clutch 2480 is likewise fully disengaged. With a further increase in actuator displacement x, the clutch is gradually brought to engagement up to a completely friction-locked condition. Thus, the two clutches 2403 and 2480 are controlled separately, depending on the direction of actuator travel x out of the neutral position $x_o$.

The first clutch 2403 acts on first and reverse gears which can be selectively engaged to the output shaft 2405 by means of the fixed gear 2442 that is rotationally fixed on the output shaft 2405, the sliding sleeve 2442a and the synchronizer device 2450. The sliding sleeve 2442a is moved axially by the actuator 2460, either directly, or through a motion-transmitting mechanism i that can be interposed between the actuator 2460 and the sliding sleeve 2442a. Furthermore, the hollow shaft 2406 can be coupled to the input shaft 2404 by means of the sliding sleeve 2443a. The latter can connect a gear 2443b that is rotationally fixed on the hollow shaft 2406 to a gear 2443 that is rotationally fixed on the transmission input shaft 2404. The transmission input shaft 2404 is rotationally coupled to the crankshaft 2402a through the damper device 2403a. First and third as well as fifth and sixth gear can be selected by means of their associated sliding sleeves on the input shaft 2404 and the output shaft 2405, respectively, as described above in the context of FIGS. 52 and 53.

Based on FIG. 54, the procedure for shifting this transmission is as follows:

The first gear or the reverse gear is selected by moving the sliding sleeve 2442a into the respective position, and the vehicle is set in motion by engaging the first clutch 2403.

When the synchronous rpm rate has been reached between the clutch 2403 and the input shaft 2404, the input shaft 2404 is brought into form-locking engagement with the clutch 2403 by way of the sliding sleeve 2443a. Thus, in an up-shift under traction in second gear, the clutch 2403 can be disengaged without interrupting the torque flow through first gear. Subsequently, a power-shift torque is built up by engaging the clutch 2480 at fourth gear, and the sliding sleeve 2443a can be moved to its neutral position after the torque flowing through the form-locking connection has decreased to zero. Subsequently, the sliding sleeve 2440 is brought into form-locking engagement with the output shaft 2405 when the synchronous rpm rate with the input shaft 2404 has been reached. The rpm rate of the input shaft 2404 can be varied by way of the engine rpm rate. At this point, the actuator 2465 is retracted to its middle position $x_o$ and the clutch 2480 is thereby disengaged.

To shift under traction from second into third gear, the clutch 2480 is engaged. At the appropriately synchronized rpm rates, the sliding sleeve 2440a is moved to make the form-locking third-gear connection between 2404 and 2405. Then the clutch 2480 is disengaged again.

To shift into fourth gear, the sliding sleeve 2440a is moved to the neutral position, where there is no form-locking connection to second or third gear. Then, the clutch 2480 is engaged.

Fifth and sixth gear are shifted in the essentially known way with an interruption in the tractive force and synchronization by way of the engine rpm rate, after the hollow shaft 2406 and the input shaft 2404 have been connected by means of the sliding sleeve 2443a.

Following is the sequence for down-shifts in drag mode:

After the connection between the input shaft 2403 and the hollow shaft 2406 has been interrupted, the shift into fourth gear can be made by engaging the clutch 2480 after the sliding sleeve 2441a has been retracted to the neutral position.

In the next down-shift in the drag mode, from fourth to third gear, the clutch 2480 is disengaged and by engaging the clutch 2403, first gear is used to assist the drag torque while third gear is engaged after reaching synchronism, and subsequently the first clutch 2403 is disengaged. The shift into second gear is made analogously by using first gear as a drag-assist to brake the vehicle during the shift process. To shift into first gear, the actuator 2465 moves from maximum to minimum displacement while the sliding sleeve 2440a is brought to its neutral position. Preferably, the sliding sleeves 2443a, 2440a and 2441a can be controlled by two actuators 2461, 2462 by way of a motion-transmitting device i.

The embodiment of a transmission 2500 of FIG. 55, likewise, has two clutches 2503, 2580 controlled by an actuator 2565, albeit with a control function M(x) (see FIG. 55a) that is different from the transmission 2400 of FIG. 54. The clutches 2503 and 2580 are brought into engagement sequentially with increasing displacement travel x. The clutch 2503 is already completely engaged and transmits the full amount of frictional torque at the point where the clutch 2580 begins to engage. Thus, there are three states of engagement: both clutches disengaged; clutch 2580 disengaged and 2503 engaged; and both clutches engaged.

In its engaged state, the clutch 2580 connects the crankshaft 2502a to the hollow shaft 2506 that leads from the clutch bell housing into the transmission, rotatably supported on the input shaft 2504. The hollow shaft 2506 is connectable to the input shaft 2504 by way of the sliding sleeve 2543a and to the output shaft 2505 by way of the gear pair 2520, 2530 of fourth gear, where the fourth gear can be coupled to the hollow shaft 2506 by way of the sliding sleeve 2544a through a synchronizer device 2554. The hollow shaft can also be rotationally coupled to reverse gear by way of the sliding sleeve 2546a. The sliding.sleeves are controlled by associated actuators that can work directly or through interposed motion-transmitting devices as described above. First gear can be coupled to the output shaft 2505 by means of the sliding sleeve 2547a. Second and third gear can be selectively coupled to the output shaft 2505 by means of the sliding sleeve 2540a, and fifth and sixth gear can be selectively coupled to the input shaft by means of the sliding sleeve 2541a, to establish the respective gear ratios between the input and the output of the transmission.

With the preceding embodiment, again, the vehicle is set in motion in first or reverse gear by means of the first clutch 2503, i.e., by moving the respective sliding sleeve 2546a or 2547a and then engaging the clutch 2503.

To shift into second gear under traction, the actuator 2565 moves farther, thereby engaging the second clutch 2580, and the sliding sleeve 2544a of fourth gear is also engaged to assist vehicle traction and synchronization. The torque flow is shifted from first to second gear by moving the sliding sleeve 2547a out of engagement and then coupling the input shaft 2504 to the output shaft 2505 through second gear by shifting the sliding sleeve 2540a. Subsequently, the clutch 2580 is taken out of engagement again, so that no torque flows through fourth gear. The same procedure is repeated in the next up-shift to third gear. To shift into fourth gear, the clutch 2580 is brought to engagement, and the sliding sleeve 2540a is moved into the neutral position. Fifth and sixth gear are shifted without traction, by means of engaging the sliding sleeve 2541a to the free gear of the desired gear set.

To shift down into fourth gear, the sliding sleeve 2541a is moved to the neutral position, and the sliding sleeve 2544a is connected to fourth gear.

Using an analogous procedure as described for the embodiments of FIGS. 52 to 54, the first gear is used again to provide an additional drag torque during the down-shift. The following description of a down-shift from fourth to third gear will stand as an example to explain how the procedure works in the case of the present embodiment. First, the fourth gear is coupled to the input shaft 2504 through the sliding sleeve 2543a, and both of the clutches 2503 and 2580 are disengaged. Next, first gear is engaged by means of the sliding sleeve 2547a. Third gear is brought to engagement by means of the sliding sleeve 2540a at the point where the rpm rates are synchronized and the rotary accelerations are matched. The last step is to disconnect the input shaft 2504 from the hollow shaft 2506 by means of the sliding sleeve and to disengage the clutch 2503.

Figure 56:
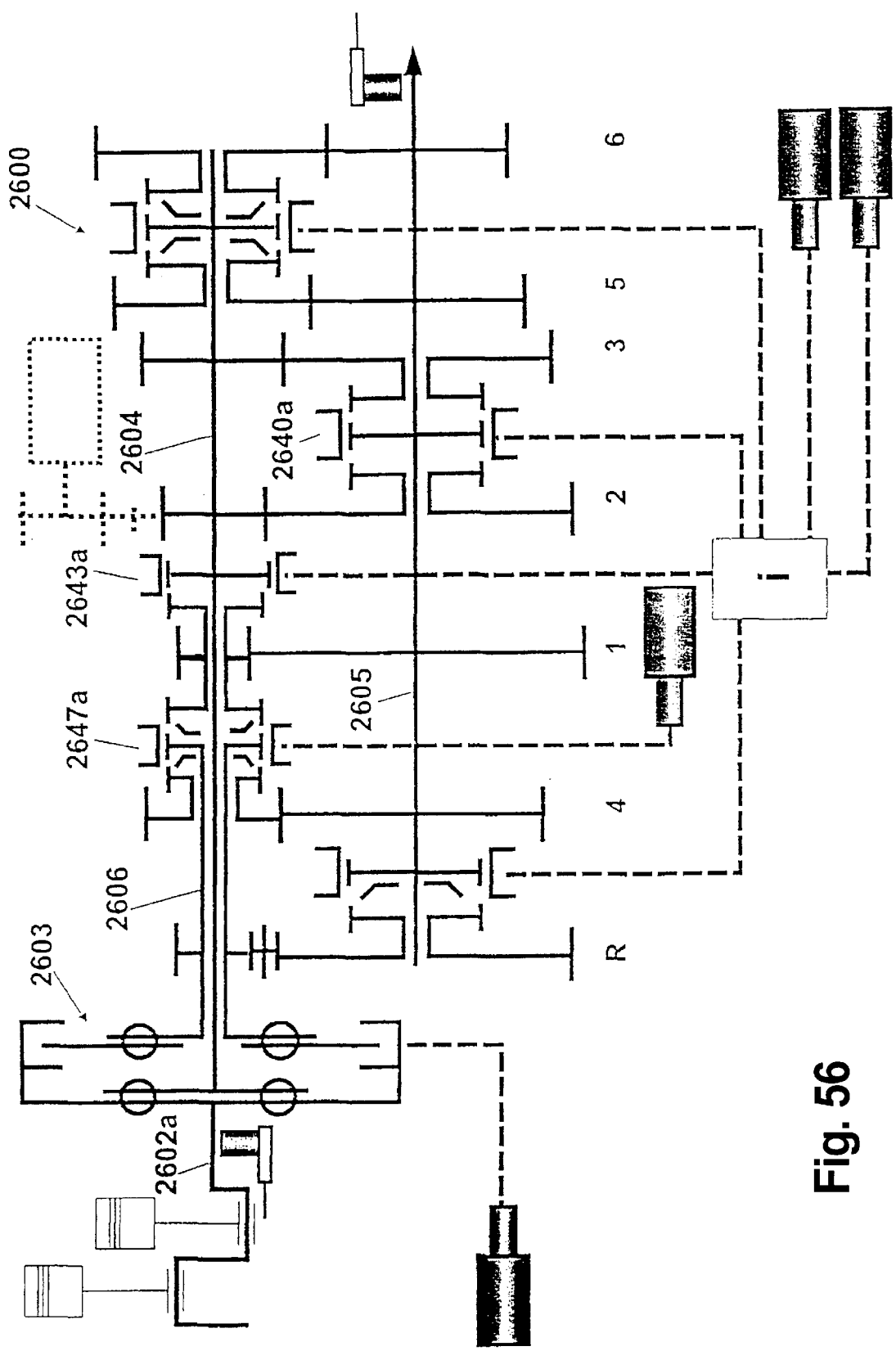

FIG. 56 illustrates an embodiment of a transmission 2600 that works without a second friction clutch but nevertheless has traction and drag torque assistance. The friction clutch 2603 serves both as start-up clutch and as power-shift clutch. As in the previous examples, a high gear such as fourth gear in the present example is used to assist traction, and a small gear such as first gear in the present example is used to assist drag during the shift process.

The vehicle is set in motion in first gear by engaging the clutch 2603 with the sliding sleeve 2647a making a form-locking connection to the clutch 2603 by way of the hollow shaft 2606. To shift into second gear, the input shaft 2604, which is connected directly to the crankshaft 2602a, is coupled to the first-gear set by way of the sliding sleeve 2643a with the clutch 2603 remaining engaged. The engine torque now takes the new path through first gear to the output shaft 2605, and the sliding sleeve 2647a can be brought into form-locking engagement with the fourth-gear set that transmits torque through the engaged clutch 2603 to the output shaft 2605. When the engine rotation has synchronized the second gear level and the latter has been engaged by means of the sliding sleeve 2640a, the fourth gear can be deactivated again by using the clutch 2603. An analogous procedure is used to shift from second to third gear. The shift to fourth gear is made by engaging the clutch 2603 and simultaneously moving the sliding sleeve 2640a into the neutral position. Fifth and sixth gear are engaged and disengaged by first taking the clutch 2603 out of engagement and using the engine to synchronize rpm rates.

The down-shift from third to second will serve as an example to explain how down-shifts are performed with the use of first gear. With the clutch 2603 disengaged, the first gear is activated by way of the sliding sleeve 2647a. Clutch 2603 is moved into engagement, whereby the torque is built up at the output shaft through first gear. At the synchronous rpm rate, the sliding sleeve 2640a is actuated and second gear is brought into engagement. Subsequently, the clutch 2603 is taken out of engagement again to uncouple the first-gear set.

Without further analysis, the foregoing will so fully reveal the gist of the present invention that others can, by applying current knowledge, readily adapt it for various applications without omitting features that, from the standpoint of prior art, fairly constitute essential characteristics of, the generic and specific aspects of the aforedescribed contribution to the art and, therefore, such adaptations should and are intended to be comprehended within the meaning and range of equivalence of the appended claims.

What is claimed is:

1. A transmission, shiftable between a plurality of gear ratios and comprising a plurality of shafts, free gears that can be brought to a rotation-locked engagement with one of said plurality of shafts by means of shift clutches, fixed gears that are permanently rotation-locked to one of said plurality of shafts, and a single start-up clutch arranged at an input side of the transmission to couple and uncouple a total flow of torque between a combustion engine and the transmission, wherein each of the gear ratios is formed by one of the free gears cooperating with one of the fixed gears, and wherein one of the shift clutches comprises a power-shift clutch with the ability to transmit a greater amount of torque than the other shift clutches, said power shift clutch comprising a friction clutch and being assigned to one of the gear ratios, wherein the power-shift clutch is arranged so that it is always brought into engagement when the transmission is shifted from one ratio to another and the start-up clutch is at least partially engaged during shifting such that a previously engaged gear is shifted out of engagement and a new gear is synchronized and brought into engagement, the power-shift clutch being arranged at a gear with a higher ratio than a ratio of at least one gear that is shiftable in a power/shift mode in which a torque bypass is established by the power-shift clutch.

2. The transmission of claim 1, wherein the power-shift clutch can be engaged when the start-up clutch is in an at least partially engaged condition.

3. The transmission of claim 1, wherein the power-shift clutch can be engaged while the start-up clutch is in a fully engaged condition.

4. The transmission of claim 1, wherein the plurality of gear ratios includes a highest ratio, and wherein among the free gears the one of the highest ratio has the power-shift clutch provided to couple said highest-ratio free gear to one of said plurality of shafts by engaging the power-shift clutch.

5. The transmission of claim 1, wherein a clutch by which at least one of said free gears is coupled to one of said plurality of shafts is a form-locking clutch.

6. The transmission of claim 1, wherein a clutch by which at least one of said free gears is coupled to one of said plurality of shafts is a friction clutch.

7. The transmission of claim 1, wherein a clutch by which at one of said free gears is coupled to a shaft has a synchronizing device.

8. The transmission of claim 1, wherein the start-up clutch is arranged in a space within a bell housing.

9. The transmission of claim 1, wherein the power-shift clutch is arranged in a space within a bell housing.

10. The transmission of claim 1, wherein the start-up clutch and the power-shift clutch are dry-friction clutches.

11. The transmission of claim 1, wherein the start-up clutch is arranged inside the transmission housing.

12. The transmission of claim 1, wherein the power-shift clutch is arranged inside the transmission housing.

13. The transmission of claim 1, wherein the start-up clutch is a friction clutch.

14. The transmission of claim 1, further comprising an electro-mechanical energy converter serving at least one of the functions of starting the engine of the vehicle and of generating electrical energy from kinetic energy.

15. The transmission of claim 14, wherein the electro-mechanical energy converter interacts with the transmission by way of a fixed gear.

16. The transmission of claim 14, wherein the electro-mechanical energy converter is mechanically interfaced with an input shaft of the transmission.

\* \* \* \* \*